(12) United States Patent
Roberts et al.

(10) Patent No.: US 8,648,681 B2
(45) Date of Patent: Feb. 11, 2014

(54) MAGNETIC STRUCTURE PRODUCTION

(75) Inventors: Mark D. Roberts, Huntsville, AL (US); Larry W. Fullerton, New Hope, AL (US); David P. Machado, Harvest, AL (US); Dillon Mize, Huntsville, AL (US); Kelly Loum, Athens, AL (US)

(73) Assignee: Correlated Magnetics Research, LLC., New Hope, AL (US)

( * ) Notice: Subject to any disclaimer, the term of this patent is extended or adjusted under 35 U.S.C. 154(b) by 47 days.

(21) Appl. No.: 13/240,335

(22) Filed: Sep. 22, 2011

(65) Prior Publication Data

US 2012/0038440 A1 Feb. 16, 2012

Related U.S. Application Data

(63) Continuation-in-part of application No. 12/476,952, filed on Jun. 2, 2009, now Pat. No. 8,179,219, and a continuation-in-part of application No. 12/895,589, filed on Sep. 30, 2010, and a continuation-in-part of application No. 12/885,450, filed on Sep. 18, 2010, now Pat. No. 7,982,568, and a continuation-in-part of application No. 12/476,952.

(60) Provisional application No. 61/403,814, filed on Sep. 22, 2010, provisional application No. 61/462,715, filed on Feb. 7, 2011, provisional application No. 61/277,900, filed on Sep. 30, 2009, provisional application No. 61/278,767, filed on Oct. 9, 2009, provisional application No. 61/289,094, filed on Dec. 22, 2009, provisional application No. 61/281,160, filed on Nov. 13, 2009, provisional application No. 61/283,780, filed on Dec. 9, 2009, provisional application No. 61/284,385, filed on Dec. 17, 2009, provisional application No. 61/342,988, filed on Apr. 22, 2010, provisional application No. 61/277,214, filed on Sep. 22, 2009.

(51) Int. Cl.
*H01F 13/00* (2006.01)

(52) U.S. Cl.
USPC .......................................... 335/284

(58) Field of Classification Search
USPC .................................. 335/284; 361/147–148
See application file for complete search history.

(56) References Cited

U.S. PATENT DOCUMENTS

| 381,968 A | 5/1888 | Tesla |
| 493,858 A | 3/1893 | Edison |

(Continued)

FOREIGN PATENT DOCUMENTS

| DE | 2938782 A1 | 4/1981 |
| DE | 2938782 A1 | 4/1981 |

(Continued)

OTHER PUBLICATIONS

Series BNS, Compatible Series AES Safety Controllers, http://www.schmersalusa.com/safety_controllers/drawings/aes.pdf, pp. 159-175, date unknown.

(Continued)

*Primary Examiner* — Ramon Barrera
(74) *Attorney, Agent, or Firm* — Keith W. Saunders; William J. Tucker

(57) ABSTRACT

Magnetic structure production may relate, by way of example but not limitation, to methods, systems, etc. for producing magnetic structures by printing magnetic pixels (aka maxels) into a magnetizable material. Disclosed herein is production of magnetic structures having, for example: maxels of varying shapes, maxels with different positioning, individual maxels with different properties, maxel patterns having different magnetic field characteristics, combinations thereof, and so forth. In certain example implementations disclosed herein, a second maxel may be printed such that it partially overwrites a first maxel to produce a magnetic structure having overlapping maxels. In certain example implementations disclosed herein, a magnetic printer may include a print head comprising multiple parts and having various properties. In certain example implementations disclosed herein, various techniques for using a magnetic printer may be employed to produce different magnetic structures. Furthermore, description of additional magnet-related technology and example implementations thereof is included herein.

21 Claims, 37 Drawing Sheets

(56) References Cited

U.S. PATENT DOCUMENTS

| | | | |
|---|---|---|---|
| 996,933 A | 7/1911 | Lindquist | |
| 1,236,234 A | 8/1917 | Troje | |
| 2,389,298 A | 11/1945 | Ellis | |
| 2,438,231 A | 3/1948 | Shultz | |
| 2,471,634 A | 5/1949 | Vennice | |
| 2,570,625 A | 10/1951 | Zimmerman et al. | |
| 2,722,617 A | 11/1955 | Cluwen et al. | |
| 3,102,314 A | 9/1963 | Alderfer | |
| 3,208,296 A | 9/1965 | Baermann | |
| 3,238,399 A | 3/1966 | Johanees et al. | |
| 3,288,511 A | 11/1966 | Tavano | |
| 3,408,104 A | 10/1968 | Raynes | |
| 2,932,545 A | 4/1969 | Foley | |
| 3,468,576 A | 9/1969 | Beyer et al. | |
| 3,474,366 A | 10/1969 | Barney | |
| 3,684,992 A | 8/1972 | Huguet et al. | |
| 3,696,258 A | 10/1972 | Anderson et al. | |
| 3,790,197 A | 2/1974 | Parker | |
| 3,791,309 A | 2/1974 | Baermann | |
| 3,802,034 A | 4/1974 | Bookless | |
| 3,845,430 A | 10/1974 | Petkewicz et al. | |
| 3,893,059 A | 7/1975 | Nowak | |
| 4,079,558 A | 3/1978 | Forham | |
| 4,129,846 A | 12/1978 | Yablochnikov | |
| 4,222,489 A | 9/1980 | Hutter | |
| 4,416,127 A | 11/1983 | Gomez-Olea | |
| 4,453,294 A | 6/1984 | Morita | |
| 4,535,278 A | 8/1985 | Asakawa | |
| 4,547,756 A | 10/1985 | Miller et al. | |
| 4,629,131 A | 12/1986 | Podell | |
| 4,849,749 A | 7/1989 | Fukamachi et al. | |
| 4,912,727 A | 3/1990 | Schubert | |
| 4,941,236 A | 7/1990 | Sherman | |
| 5,020,625 A | 6/1991 | Yamauchi et al. | |
| 5,050,276 A | 9/1991 | Pemberton | |
| 5,345,207 A | 9/1994 | Gebele | |
| 5,367,891 A | 11/1994 | Furuyama | |
| 5,383,049 A | 1/1995 | Carr | |
| 5,838,304 A | 1/1995 | Car | |
| 5,440,997 A | 8/1995 | Crowley | |
| 5,461,386 A | 10/1995 | Knebelkamp | |
| 5,492,572 A * | 2/1996 | Schroeder et al. | 148/103 |
| 5,495,221 A | 2/1996 | Post | |
| 5,512,732 A | 4/1996 | Yagnik et al. | |
| 5,570,084 A | 10/1996 | Ritter et al. | |
| 5,604,960 A | 2/1997 | Good | |
| 5,631,093 A | 5/1997 | Perry et al. | |
| 5,631,618 A | 5/1997 | Trumper et al. | |
| 5,637,972 A | 6/1997 | Randall et al. | |
| 5,852,393 A | 12/1998 | Reznik et al. | |
| 5,956,778 A | 9/1999 | Godoy | |
| 5,983,406 A | 11/1999 | Meyerrose | |
| 6,072,251 A | 6/2000 | Markle | |
| 6,115,849 A | 9/2000 | Meyerrose | |
| 6,118,271 A | 9/2000 | Ely et al. | |
| 6,170,131 B1 | 1/2001 | Shin | |
| 6,205,012 B1 | 3/2001 | Lear | |
| 6,275,778 B1 | 8/2001 | Shimada et al. | |
| 6,285,097 B1 | 9/2001 | Hazelton et al. | |
| 6,387,096 B1 | 5/2002 | Hyde, Jr. | |
| 6,457,179 B1 | 10/2002 | Prendergast | |
| 6,467,326 B1 | 10/2002 | Garrigus | |
| 6,607,304 B1 | 8/2003 | Lake et al. | |
| 6,653,919 B2 | 11/2003 | Shih-Chung et al. | |
| 6,720,698 B2 | 4/2004 | Galbraith | |
| 6,842,332 B1 | 1/2005 | Rubenson et al. | |
| 6,847,134 B2 | 1/2005 | Frissen et al. | |
| 6,850,139 B1 | 2/2005 | Dettmann et al. | |
| 6,862,748 B2 | 3/2005 | Prendergast | |
| 6,927,657 B1 | 8/2005 | Wu | |
| 6,950,279 B2 | 9/2005 | Sasaki et al. | |
| 6,971,147 B2 | 12/2005 | Haltstead | |
| 7,016,492 B2 | 3/2006 | Pan et al. | |
| 7,031,160 B2 | 4/2006 | Tillotson | |
| 7,065,860 B2 | 6/2006 | Aoki et al. | |
| 7,066,778 B2 | 6/2006 | Kretzschmar | |
| 7,362,018 B1 | 4/2008 | Kulogo et al. | |
| 7,444,683 B2 | 11/2008 | Prendergast et al. | |
| 7,498,914 B2 * | 3/2009 | Miyashita et al. | 335/284 |
| 7,583,500 B2 | 9/2009 | Ligtenberg et al. | |
| 7,775,567 B2 | 8/2010 | Ligtenberg et al. | |
| 7,808,349 B2 | 10/2010 | Fullerton et al. | |
| 7,812,697 B2 | 10/2010 | Fullerton et al. | |
| 7,839,246 B2 | 11/2010 | Fullerton et al. | |
| 7,868,721 B2 | 1/2011 | Fullerton et al. | |
| 2004/0003487 A1 | 1/2004 | Reiter | |
| 2004/0155748 A1 | 8/2004 | Steingroever | |
| 2004/0244636 A1 | 12/2004 | Meadow et al. | |
| 2004/0251759 A1 | 12/2004 | Hirzel | |
| 2005/0102802 A1 | 5/2005 | Sitbon et al. | |
| 2005/0231046 A1 | 10/2005 | Aoshima | |
| 2006/0066428 A1 | 3/2006 | McCarthy et al. | |
| 2006/0189259 A1 | 8/2006 | Park et al. | |
| 2006/0214756 A1 | 9/2006 | Elliott et al. | |
| 2006/0290451 A1 | 12/2006 | Prendergast et al. | |
| 2007/0075594 A1 | 4/2007 | Sadler | |
| 2007/0138806 A1 | 6/2007 | Ligtenberg et al. | |
| 2008/0139261 A1 | 6/2008 | Cho et al. | |
| 2008/0181804 A1 | 7/2008 | Tanigawa et al. | |
| 2008/0186683 A1 | 8/2008 | Ligtenberg et al. | |
| 2008/0272868 A1 | 11/2008 | Prendergast et al. | |
| 2008/0282517 A1 | 11/2008 | Claro | |
| 2009/0021333 A1 | 1/2009 | Fiedler | |
| 2010/0033280 A1 | 2/2010 | Bird et al. | |
| 2011/0210636 A1 | 9/2011 | Kuhlmann-Wilsdorf | |

FOREIGN PATENT DOCUMENTS

| | | | | |
|---|---|---|---|---|
| EP | 0 345 554 A1 | 12/1989 | | |
| EP | 0 545 737 A1 | 6/1993 | | |
| FR | 823395 | 1/1938 | | |
| GB | 1 495 677 A | 12/1977 | | |
| JP | 54152200 A * | 11/1979 | | H01F 13/00 |
| JP | 60-091011 U | 5/1985 | | |
| JP | 60091011 | 5/1985 | | |
| JP | 60192307 A * | 9/1985 | | H01F 13/00 |
| WO | WO-02/31945 A2 | 4/2002 | | |
| WO | 2007081830 A2 | 7/2007 | | |
| WO | WO-2007/081830 A2 | 7/2007 | | |
| WO | WO-2009/124030 A1 | 10/2009 | | |

OTHER PUBLICATIONS

BNS 33 Range, Magnetic safety sensors, Rectangular design, http://www.farnell.com/datasheets/36449.pdf, 3 pages, date unknown.

Series BNS-B20, Coded-Magnet Sensor Safety Door Handle, http://www.schmersalusa.com/catalog_pdfs/BNS_B20.pdf, 2 pages, date unknown.

Series BNS333, Coded-Magnet Sensors with Integral Safety Control Module, http://www.schmersalusa.com/machine_guarding/coded_magnet/drawings/bns333.pdf, 2 pages, date unknown.

Wikipedia, "Barker Code", Web article, last modified Aug. 2, 2008, 2 pages.

Wikipedia, "Kasami Code", Web article, last modified Jun. 11, 2008, 1 page.

Wikipedia, "Linear feedback shift register", Web article, last modified Nov. 11, 2008, 6 pages.

Wikipedia, "Golomb Ruler", Web article, last modified Nov. 4, 2008, 3 pages.

Wikipedia, "Costas Array", Web article, last modified Oct. 7, 2008, 4 pages.

Wikipedia, "Walsh Code", Web article, last modified Sep. 17, 2008, 2 pages.

Wikipedia, "Gold Code", Web article, last modified Jul. 27, 2008, 1 page.

Wikipedia, "Bitter Electromagnet", Web article, last modified Aug. 2011, 1 page.

Pill-soo Kim, "A future cost trends of magnetizer systems in Korea", Industrial Electronics, Control, and Instrumentation, 1996, vol. 2, Aug. 5, 1996, pp. 991-996.

United States Office Action, dated Aug. 26, 2011, issued in counterpart U.S. Appl. No. 12/206,270.

(56) References Cited

OTHER PUBLICATIONS

United States Office Action, dated Mar. 12, 2012, issued in counterpart U.S. Appl. No. 12/206,270.
United States Office Action, dated Feb. 22, 2011, issued in counterpart U.S. Appl. No. 12/476,952.
United States Office Action, dated Oct. 12, 2011, issued in counterpart U.S. Appl. No. 12/476,952.
United States Office Action, dated Mar. 9, 2012, issued in counterpart U.S. Appl. No. 13/371,280.
International Search Report and Written Opinion, dated May 14, 2009, issued in related International Application No. PCT/US2009/038925.
International Search Report and Written Opinion, dated Jul. 13, 2010, issued in related International Application No. PCT/US2010/021612.
International Search Report and Written Opinion dated Jun. 1, 2009, issued in related International Application No. PCT/US2009/002027.
International Search Report and Written Opinion, dated Aug. 18, 2010, issued in related International Application No. PCT/US2010/036443.
International Search Report and Written Opinion, dated Apr. 8, 2011 issued in related International Application No. PCT/US2010/049410.
"BNS Series-Compatible Series AES Safety Controllers" pp. 1-17, http://www.schmersalusa.com/safety_controllers/drawings/aes.pdf (downloaded on or before Jan. 23, 2009).
"Magnetic Safety Sensors" pp. 1-3, http://farnell.com/datasheets/6465.pdf (downloaded on or before Jan. 23, 2009).
"Series BNS-B20 Coded-Magnet Sensor Safety Door Handle" pp. 1-2, http://www.schmersalusa.com/catalog_pdfs/BNS_B20.pdf (downloaded on or before Jan. 23, 2009).
"Series BNS333 Coded-Magnet Sensors with Integrated Safety Control Module" pp. 1-2, http://www.schmersalusa.com/machine_guarding/coded_magnet/drawings/bns333.pdf (downloaded on or before Jan. 23, 2009).
Comparison of Invention (US 8179219 B2) with Dettmann (US 6850139) and with Bitter Coil, cited by Examiner in US 8179219, no date.

* cited by examiner

| .2 | -.2 | .2 | -.3 | .8 | -.3 | .6 | -.4 |
|---|---|---|---|---|---|---|---|
| -.2 | .2 | -.2 | .2 | .4 | -.4 | -.3 | -.3 |
| .2 | -.2 | .2 | -1 | -.6 | .8 | -.3 | .6 |
| .5 | .2 | .8 | -1 | .8 | -1 | -.6 | -.4 |
| -.6 | -.3 | .8 | -1 | .2 | -.5 | .6 | -.3 |
| .3 | 1 | .8 | -.7 | -.4 | 1 | .2 | -.3 |
| -.4 | -.3 | -.3 | -.6 | .9 | .2 | -.1 | .2 |
| .4 | .5 | -.3 | .7 | .7 | .2 | .2 | .2 |
FIG. 2E
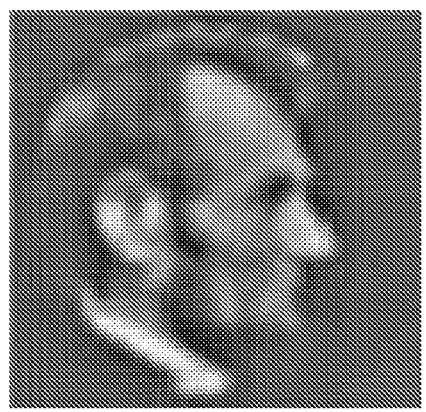
FIG. 2F
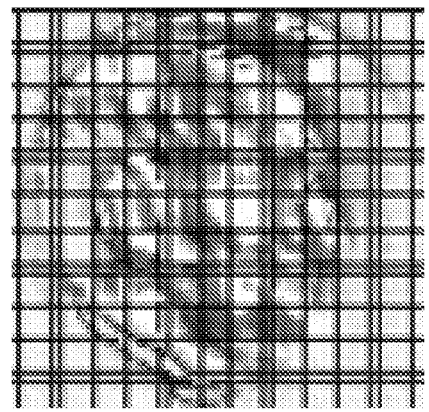
FIG. 2G
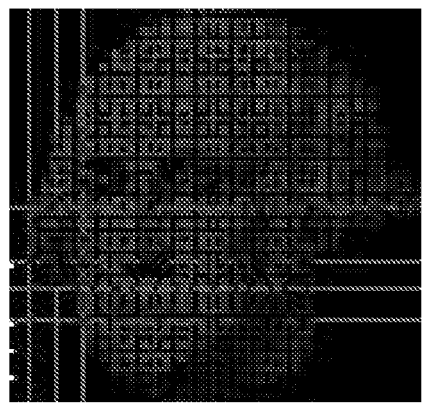
FIG. 2H
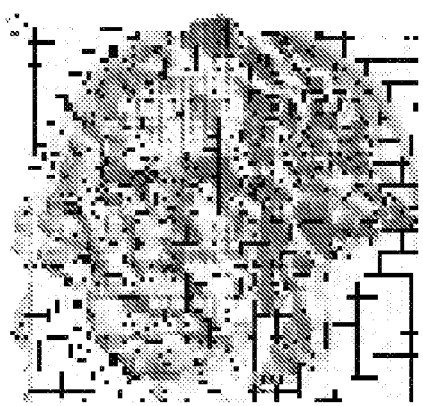
FIG. 2I

FIG. 10

| | INITIAL | | | ITERATION 1 | | | ITERATION 2 | | | FINAL WITH SCALE FACTOR | | |
|---|---|---|---|---|---|---|---|---|---|---|---|---|
| ⊖ | 1 | 1 | 1 | 0.98 | 0.98 | 0.98 | 0.9816 | 0.9816 | 0.9816 | 0.9893 | 0.9893 | 0.9893 |
| ⊖ | 1 | 1 | 1 | 1.00 | 1.00 | 1.00 | 1 | 1 | 1 | 1.0078 | 1.0078 | 1.0078 |
| ⊖ | 1 | 1 | 1 | 1.02 | 1.02 | 1.02 | 1.0798 | 1.0798 | 1.0798 | 1.0882 | 1.0882 | 1.0882 |
| ⦶ | -1 | -1 | -1 | -0.98 | -0.98 | -0.98 | -1.08 | -1.08 | -1.08 | -1.088 | -1.088 | -1.088 |
| ⦶ | -1 | -1 | -1 | -1.00 | -1.00 | -1.00 | -1.104 | -1.104 | -1.104 | -1.113 | -1.113 | -1.113 |
| ⦶ | -1 | -1 | -1 | -1.02 | -1.02 | -1.02 | -1.123 | -1.123 | -1.123 | -1.131 | -1.131 | -1.131 |
| ⊖ | 1 | 1 | 1 | 0.98 | 0.98 | 0.98 | 0.9816 | 0.9816 | 0.9816 | 0.9893 | 0.9893 | 0.9893 |
| ⊖ | 1 | 1 | 1 | 1.00 | 1.00 | 1.00 | 1 | 1 | 1 | 1.0078 | 1.0078 | 1.0078 |
| ⊖ | 1 | 1 | 1 | 1.02 | 1.02 | 1.02 | 1.0307 | 1.0307 | 1.0307 | 1.0387 | 1.0387 | 1.0387 |
| ⦶ | -1 | -1 | -1 | -1.00 | -1.00 | -1.00 | -1.104 | -1.104 | -1.104 | -1.113 | -1.113 | -1.113 |
| ⦶ | -1 | -1 | -1 | -1.00 | -1.00 | -1.00 | -1.104 | -1.104 | -1.104 | -1.113 | -1.113 | -1.113 |
| ⦶ | -1 | -1 | -1 | -1.00 | -1.00 | -1.00 | -1.104 | -1.104 | -1.104 | -1.113 | -1.113 | -1.113 |

(TOP VIEW)

(SIDE VIEW)

(TOP VIEW)

(SIDE VIEW)

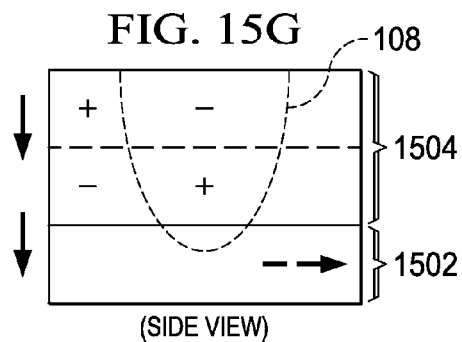
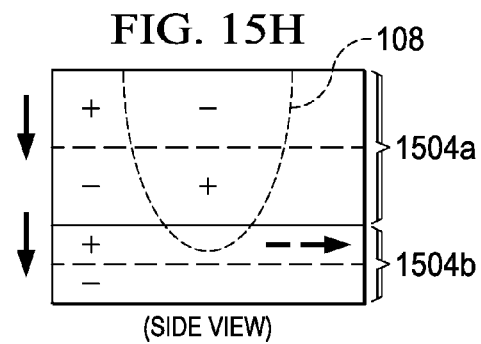
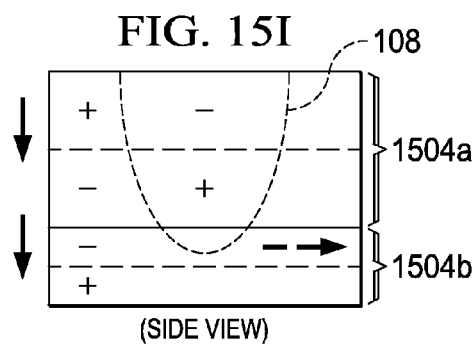
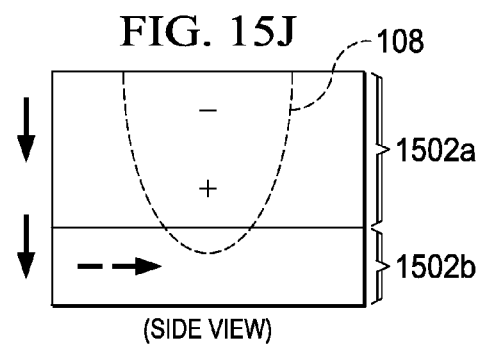
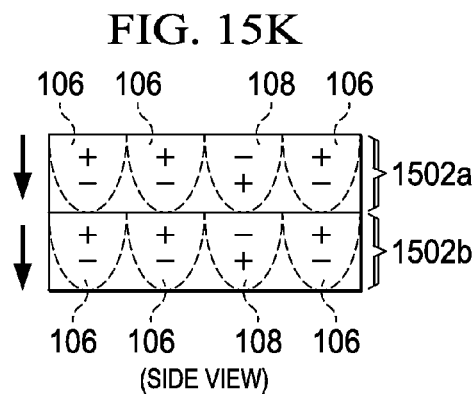
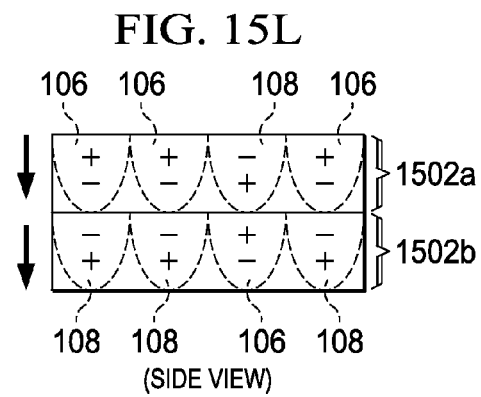

| USING: 1.5" x 0.125" DISC WITH A SINGLE MAXEL IN THE CENTER ||||||
|---|---|---|---|---|---|
| VOLTAGE | PULL FORCE [lb] | MAXEL DIAMETER [mm] | MAXEL AREA [mm^2] | MAXEL AREA [in^2] | FORCE/AREA |
| 150 | 0.10 | 2.93 | 6.73 | 0.01 | 9.59 |
| 200 | 0.49 | 3.42 | 9.17 | 0.01 | 34.71 |
| 250 | 0.82 | 3.91 | 11.99 | 0.02 | 44.12 |
| 300 | 1.15 | 4.40 | 15.19 | 0.02 | 48.86 |
| 350 | 1.78 | 4.89 | 18.76 | 0.03 | 61.22 |
| 400 | 1.70 | 5.38 | 22.71 | 0.04 | 48.30 |
| 450 | 2.03 | 5.87 | 27.04 | 0.04 | 48.52 |
| 500 | 2.65 | 6.36 | 31.74 | 0.05 | 53.86 |

FIG. 17C

| CONSTANT NUMBER OF MAXELS WITH DECREASING AREA ||||| 
|---|---|---|---|---|
| NUMBER OF MAXELS = 25 ||||| 
| AREA [in^2] | PATTERN SIZE [mm] | MAXEL SPACING [mm] | FORCE [lb] | FORCE/AREA [lb/in^2] |
| 3.88 | 50x50mm | 12.50 | 45.00 | 11.61288 |
| 2.48 | 40x40mm | 10.00 | 39.20 | 15.80642 |
| 1.90 | 35x35mm | 8.75 | 40.00 | 21.06644898 |
| 1.40 | 30x30mm | 7.50 | 34.13 | 24.46829037 |
| 0.97 | 25x25mm | 6.25 | 34.50 | 35.612832 |
| 0.62 | 20x20mm | 5.00 | 22.10 | 35.64516129 |
| 0.50 | 18x18mm | 4.50 | 22.23 | 44.27178189 |
| 0.45 | 17x17mm | 4.25 | 24.17 | 53.94936563 |
| 0.40 | 16x16mm | 4.00 | 15.70 | 39.56645313 |
| 0.35 | 15x15mm | 3.75 | 14.67 | 42.05487407 |
| 0.30 | 14x14mm | 3.50 | 13.80 | 45.42453061 |
| 0.26 | 13x13mm | 3.25 | 14.33 | 54.71771203 |
| 0.22 | 12x12mm | 3.00 | 5.90 | 26.43363889 |
| 0.16 | 10x10mm | 2.50 | 4.50 | 29.0322 |
| 0.10 | 8x8mm | 2.00 | 4.27 | 43.01066667 |
| 0.02 | 4x4mm | 1.00 | 0.43 | 17.47308333 |

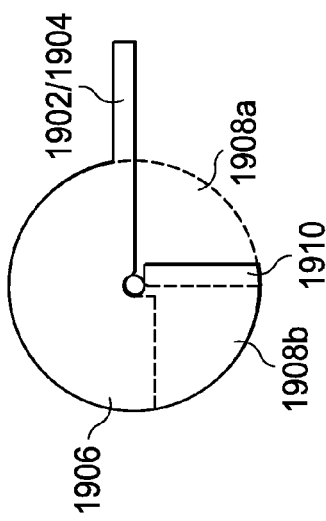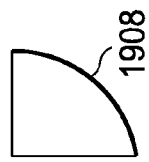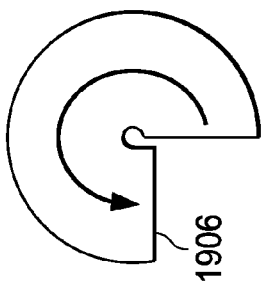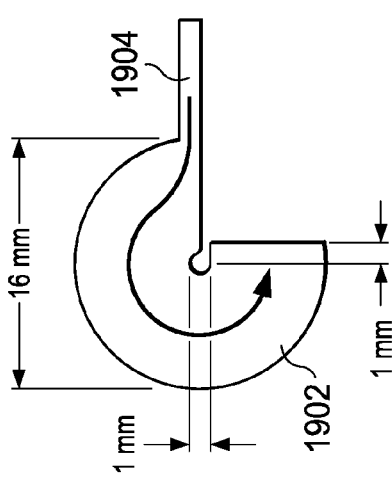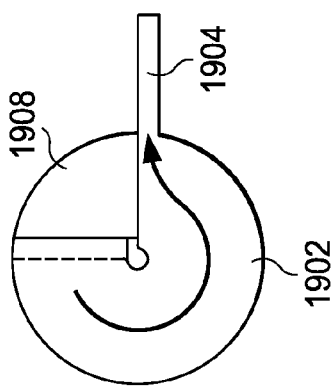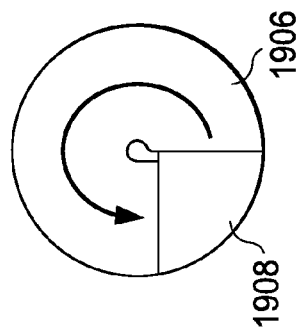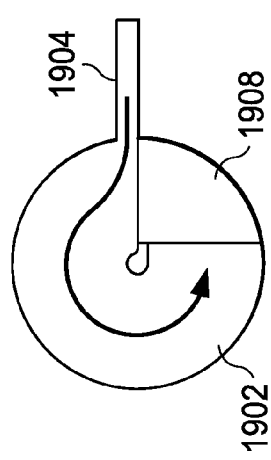

MAGNETIC STRUCTURE PRODUCTION

CLAIMING BENEFIT OF PRIOR FILED U.S. APPLICATIONS

This Nonprovisional patent application claims the benefit of U.S. Provisional Patent Application No. 61/403,814 (filed Sep. 22, 2010) and U.S. Provisional Patent Application No. 61/462,715 (filed Feb. 7, 2011), both of which are entitled "SYSTEM AND METHOD FOR PRODUCING MAGNETIC STRUCTURES"; and this Nonprovisional patent application is a continuation-in-part of U.S. Nonprovisional patent application Ser. No. 12/476,952 (filed Jun. 2, 2009), which is entitled "FIELD EMISSION SYSTEM AND METHOD"; and this Nonprovisional patent application is a continuation-in-part of U.S. Nonprovisional patent application Ser. No. 12/895,589 (filed Sep. 30, 2010), which is entitled "A SYSTEM AND METHOD FOR ENERGY GENERATION", which claims the benefit of Provisional Patent Application Nos. 61/277,214 (filed Sep. 22, 2009), 61/277,900 (filed Sep. 30, 2009), 61/278,767 (filed Oct. 9, 2009), 61/289,094 (filed Oct. 16, 2009), 61/281,160 (filed Nov. 13, 2009), 61/283,780 (filed Dec. 9, 2009), 61/284,385 (filed Dec. 17, 2009) and 61/342,988 (filed Apr. 22, 2010), and which is a continuation-in-part of Nonprovisional patent application Ser. Nos. 12/885,450 (filed Sep. 18, 2010) and 12/476,952 (filed Jun. 2, 2009). The contents of the provisional patent applications and the nonprovisional patent applications that are identified above are hereby incorporated by reference in their entirety herein.

TECHNICAL FIELD

The disclosure herein relates generally to magnetic technologies. More specifically, but by way of example only, certain portions of the disclosure relate to production of magnetic structures. Yet more specifically, but by way of example but not limitation, certain portions of the disclosure relate to magnetic structures having tailored magnetic field characteristics attained by magnetically printing magnetic pixels (or maxels) onto magnetizable material.

SUMMARY

In one aspect, an example embodiment is directed to a method for printing maxels that may comprise: causing at least one magnetizable material and at least one magnetic print head to move relative to each other; and printing at least one maxel into the at least one magnetizable material using the at least one magnetic print head to produce at least one printed maxel at a surface of the at least one magnetizable material, the at least one printed maxel associated with a first polarity and a second polarity, wherein the first polarity associated with the at least one printed maxel is exposed at the surface of the at least one magnetizable material, but the second polarity associated with the at least one printed maxel is not exposed at the surface of the at least one magnetizable material.

In another aspect, an example embodiment is directed to an apparatus for printing maxels into magnetizable material, wherein the apparatus may comprise: at least one magnetic print head; circuitry for causing at least one magnetizable material and the at least one magnetic print head to move relative to each other; and circuitry for printing at least one maxel into the at least one magnetizable material using the at least one magnetic print head to produce at least one printed maxel at a surface of the at least one magnetizable material, the at least one printed maxel associated with a first polarity and a second polarity, wherein the first polarity associated with the at least one printed maxel is exposed at the surface of the at least one magnetizable material, but the second polarity associated with the at least one printed maxel is not exposed at the surface of the at least one magnetizable material.

In yet another aspect, an example embodiment is directed to an article of manufacture that may comprise: at least one magnetizable material including a surface, the at least one magnetizable material including multiple printed maxels that are printed into the at least one magnetizable material at the surface, the multiple printed maxels including a first printed maxel and a second printed maxel, wherein the second printed maxel at least partially overlaps the first printed maxel.

Additional aspects of example inventive embodiments are set forth, in part, in the detailed description, figures and any claims which follow, and in part will be derived from the detailed description, or can be learned by practice of described embodiments. It is to be understood that both the foregoing general description and the following detailed description comprise examples and are explanatory only and are not restrictive of claimed subject matter.

BRIEF DESCRIPTION OF THE DRAWINGS

A more complete understanding of described embodiments may be obtained by reference to the following detailed description when taken in conjunction with the accompanying drawings wherein:

FIG. 2E depicts example weighting factors used to define different magnetic field amplitudes for a grid of maxels as an example form of gray scaling of a printed magnetic image;

FIG. 2F depicts an example gray scale image of President Abraham Lincoln;

FIG. 2G depicts an example magnetic image corresponding to the gray scale image of FIG. 2F;

FIG. 2H depicts an example color image of President George Washington;

FIG. 2I depicts an example magnetic image corresponding to the color image of FIG. 2H;

FIG. 10 depicts example maxel printing voltage weighting factors used for the four different 3×3 maxel printing designs of FIGS. 1J, 7A, 8A, and 9A;

FIG. 15G depicts an example maxel printed into a conventionally magnetized first magnetizable material having beneath it a non-magnetized second magnetizable material;

FIG. 15H depicts an example maxel printed into a conventionally magnetized first magnetizable material having beneath it a conventionally magnetized second magnetizable material having the same polarity orientation as the first magnetizable material;

FIG. 15I depicts an example maxel printed into a conventionally magnetized first magnetizable material having beneath it a conventionally magnetized second magnetizable material having an opposite polarity orientation as the first magnetizable material;

FIG. 15J depicts an example maxel printed into a non-magnetized first magnetizable material having beneath it a non-magnetized second magnetizable material;

FIG. 15K depicts example coded maxels printed into a non-magnetized magnetizable material having beneath it a second magnetizable material having previously been printed with maxels having complementary coding;

FIG. 15L depicts example coded maxels printed into a non-magnetized magnetizable material having beneath it a second magnetizable material having previously been printed with maxels having anti-complementary coding;

FIG. 17C depicts a table showing example results of a study used in an example determination for a desired density of maxels printed into a magnetizable material;

FIG. 19A depicts an example outer layer of a magnetic print head;

FIG. 19B depicts an example inner layer of a magnetic print head;

FIG. 19C depicts an example non-conductive spacer of a magnetic print head;

FIG. 19D depicts an example weld joint between the outer layer of FIG. 19A beneath an inner layer of FIG. 19B;

FIG. 19E depicts an example first outer layer oriented such that its tab faces to the right;

FIG. 19F depicts an example first inner layer that is rotated 90 degrees relative to the first outer layer of FIG. 19E;

FIG. 19G depicts an example second inner layer that is rotated 180 degrees relative to the first outer layer of FIG. 19E;

FIG. 19H depicts an example second outer layer that is rotated 270 degrees relative to the first outer layer of FIG. 19E such that its tab faces upward;

DETAILED DESCRIPTION

Figure 1A:
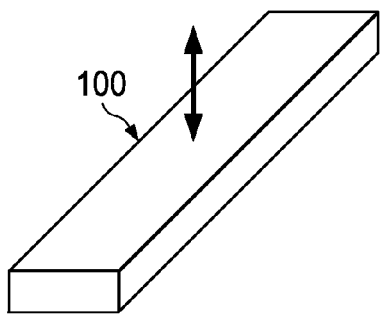
FIG. 1A depicts an oblique projection of an example rectangular block shaped magnetizable material that is non-magnetized.

Certain described embodiments may relate, by way of example but not limitation, to systems and/or apparatuses for producing magnetic structures, methods for producing magnetic structures, magnetic structures produced via magnetic printing, combinations thereof, and so forth.

Example realizations for such embodiments may be facilitated, at least in part, by the use of an emerging, revolutionary technology that may be termed correlated magnetics. This revolutionary technology referred to herein as correlated magnetics was first fully described and enabled in the co-assigned U.S. Pat. No. 7,800,471 issued on Sep. 21, 2010, and entitled "A Field Emission System and Method". The contents of this document are hereby incorporated herein by reference. A second generation of a correlated magnetic technology is described and enabled in the co-assigned U.S. Pat. No. 7,868,721 issued on Jan. 11, 2011, and entitled "A Field Emission System and Method". The contents of this document are hereby incorporated herein by reference. A third generation of a correlated magnetic technology is described and enabled in the co-assigned U.S. patent application Ser. No. 12/476,952 filed on Jun. 2, 2009, and entitled "A Field Emission System and Method". The contents of this document are hereby incorporated herein by reference. Another technology known as correlated inductance, which is related to correlated magnetics, has been described and enabled in the co-assigned U.S. patent application Ser. No. 12/322,561 filed on Feb. 4, 2009, and entitled "A System and Method for Producing an Electric Pulse". The contents of this document are hereby incorporated by reference.

Material presented herein may relate to and/or be implemented in conjunction with multilevel correlated magnetic systems and methods for producing a multilevel correlated magnetic system such as described in U.S. Pat. No. 7,982,568 issued Jul. 19, 2011 which is all incorporated herein by reference in its entirety. Material presented herein may relate to and/or be implemented in conjunction with energy generation systems and methods such as described in U.S. patent application Ser. No. 13/184,543 filed Jul. 17, 2011, which is all incorporated herein by reference in its entirety. Such systems and methods described in U.S. Pat. Nos. 7,681,256 issued Mar. 23, 2010, 7,750,781 issued Jul. 6, 2010, 7,755,462 issued Jul. 13, 2010, 7,812,698 issued Oct. 12, 2010, 7,817,002, 7,817,003, 7,817,004, 7,817,005, and 7,817,006 issued Oct. 19, 2010, 7,821,367 issued Oct. 26, 2010, 7,823,300 and 7,824,083 issued Nov. 2, 2011, 7,834,729 issued Nov. 16, 2011, 7,839,247 issued Nov. 23, 2010, 7,843,295, 7,843,296, and 7,843,297 issued Nov. 30, 2010, 7,893,803 issued Feb. 22, 2011, 7,956,711 and 7,956,712 issued Jun. 7, 2011, 7,958,575, 7,961,068 and 7,961,069 issued Jun. 14, 2011, 7,963,818 issued Jun. 21, 2011, and 8,015,752 and 8,016,330 issued Sep. 13, 2011 are all incorporated by reference herein in their entirety.

The number of dimensions to which coding may be applied to design correlated magnetic structures is quite high, which provides a correlated magnetic structure designer many degrees of freedom. By way of example but not limitation, a designer may use coding to vary magnetic source size, shape, polarity, field strength, location relative to other sources, any combination thereof, and so forth. These aspects may be varied in one, two, or three-dimensional space. Furthermore, if using e.g. electromagnets or electro-permanent magnets, a designer may change source characteristics in a temporal dimension using e.g. a control system. Various techniques may also be applied to achieve multi-level magnetism control. For example, interaction between two structures may be made to vary in at least partial dependence on their separation distance. The number of combinations is practically unlimited.

Certain described embodiments may pertain to producing magnetic structures having tailored magnetic field characteristics by magnetically printing magnetic pixels (or maxels) onto magnetizable material. Production of magnetic structures that include maxels may be enabled, for example, by a magnetizer that functions as a magnetic printer. For certain example implementations, a magnetic printer may cause a magnetizable material to move relative to a location of a print head (or vice versa) so that maxels may be printed in a prescribed pattern. Characteristics of a magnetic print head may be established to produce a specific shape or size of maxel, for instance, given a prescribed magnetization voltage and corresponding current for a given magnetizable material, wherein characteristics of the given magnetizable material may be taken into account as part of a printing process.

A magnetic printer may be configured to magnetize in a direction that is perpendicular to a magnetization surface, or a magnetic printer may alternatively be configured to magnetize in a direction that is not perpendicular to a magnetization surface. Example embodiments for a magnetic print head are described herein below with particular reference to FIGS. 19A-19P. Although not explicitly shown, a magnetizing printer may include circuitry to facilitate magnetic printing. Circuitry may include, by way of example but not limitation, mechanical apparatus, electronics, hardware, programmable hardware, firmware, at least one processor, code executing on at least one processor, a computer or computing apparatus, any combinations thereof, and so forth. Example embodiments for a magnetic printer and/or components thereof is described, by way of example but not limitation, in U.S. Nonprovisional patent application Ser. No. 12/895,589 (filed 30 Sep. 2010), including with particular reference to FIGS. 19A-20 thereof. U.S. patent application Ser. No. 12/895,589 is hereby incorporated by reference in its entirety herein. Example embodiments for magnetizing printers and/or components thereof are also described in U.S. Nonprovisional patent application Ser. No. 12/476,952 (filed 2 Jun. 2009), which is hereby incorporated by reference in its entirety herein.

A first example described embodiment may involve mapping a pattern to a surface of a magnetizable material and magnetically printing maxels based at least partly on the pattern. A second example described embodiment may involve amplitude modulation of a group of maxels to achieve composite magnetic characteristics that meet one or more criteria, such as a Gauss limit at some measurement location relative to a surface of a magnetized material. A third example described embodiment may involve presenting an image of magnetic fields that are produced by printed maxels that correspond to a pattern. These and other example embodiments, as well as combinations thereof, are described further herein below.

FIG. 1A depicts an oblique projection of an example rectangular block-shaped magnetizable material 100 that is non-magnetized. A magnetizable material may be any form of magnetizable material including, but not limited to, a permanent magnet material, a ferromagnetic material, a soft magnetic material, a superconductive magnetic material, any combination thereof, and so forth. In a particular embodiment, magnetic domains of a material may be aligned substantially perpendicular to a surface of the material on which maxels are to be printed, as indicated by the illustrated arrow. In an alternative embodiment, magnetic domains of a material may be aligned substantially non-perpendicular to a surface of the material on which maxels are to be printed.

Figure 1B:
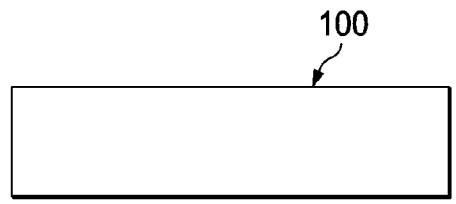
FIG. 1B depicts an example plan view of the magnetizable material of FIG. 1A.
Figure 1C:
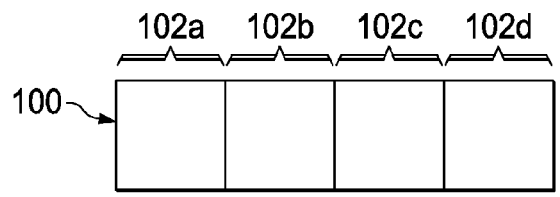
FIG. 1C depicts an example subdividing of the magnetizable material of FIG. 1B into four example portions.

FIG. 1B depicts an example plan view of the magnetizable material 100 of FIG. 1A. FIG. 1C depicts an example subdividing of the magnetizable material 100 of FIG. 1B into four example portions 102a, 102b, 102c, and 102d.

Figure 1D:
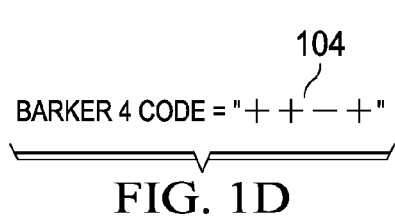
FIG. 1D depicts an example Barker 4 code as applied to a polarity pattern.
Figure 1E:
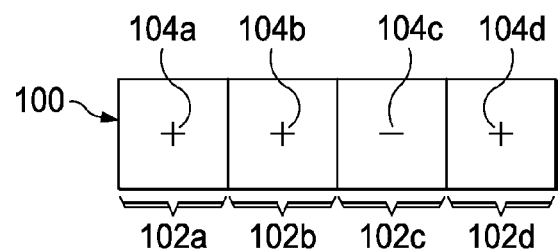
FIG. 1E depicts the example Barker 4 coded polarity pattern being mapped to the four portions of FIG. 1C.

FIG. 1D depicts an example Barker 4 code 104 as applied to a polarity pattern. Specifically, the Barker code '+1, +1, −1, +1' 104 may correspond to a polarity pattern of '++−+', which is shown in FIG. 1E as a polarity pattern of '++−+' 104a, 104b, 104c, and 104d. FIG. 1E depicts the Barker 4-coded polarity pattern 104a-104d being mapped to the four portions 102a-102d of FIG. 1C. As shown, each respective code element of the four code elements is mapped to a specific respective one of the four portions. In an example implementation, a single maxel may be printed within each portion 102 in accordance with a respective code element of the Barker 4 code 104.

Figure 1F:
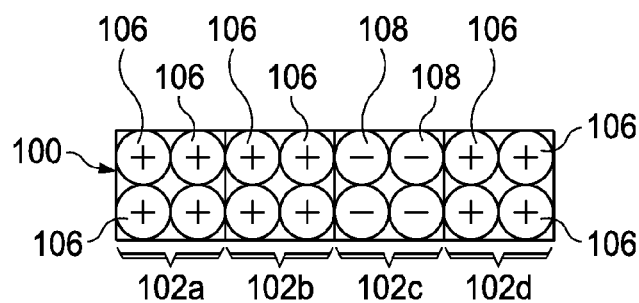
FIG. 1F depicts example locations of positive and negative 2×2 maxel groups within the four portions of FIG. 1C in accordance with the polarity pattern mapping of FIG. 1E.

FIG. 1F depicts locations of positive and negative example 2×2 maxel groups within the four portions 102a-102d of FIG. 1C in accordance with the polarity pattern mapping of FIG. 1E. A positive maxel 106 is indicated by a circle having a plus sign, and a negative polarity maxel 108 is indicated by a circle having a negative sign. Generally, for a given maxel shape and size, a plurality of maxels, or a maxel group or grouping, may be utilized to at least substantially 'fill' a defined region, such as one of the four portions 102a-102d.

Figure 1G:
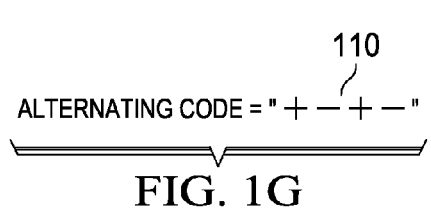
FIG. 1G depicts an example alternating polarity coded pattern.
Figure 1H:
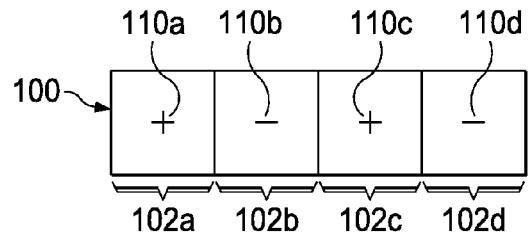
FIG. 1H depicts the example alternating polarity coded pattern being mapped to the four portions of FIG. 1C.
Figure 1I:
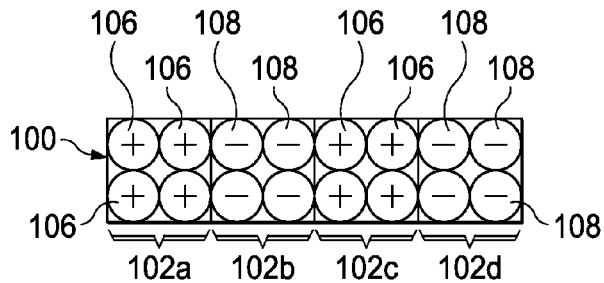
FIG. 1I depicts example locations of positive and negative 2×2 maxel groups intended to magnetically fill the four portions of FIG. 1C in accordance with the polarity pattern mapping of FIG. 1H.

FIG. 1G depicts an example alternating polarity coded pattern 110. Specifically, the illustrated alternating code '+1, −1, +1, −1' 110 may correspond to a polarity pattern of '+−+−', which is shown in FIG. 1H as a polarity pattern of '+−+−' 110a, 110b, 110c, 110d. FIG. 1H depicts the alternating polarity coded pattern 110a-110d being mapped to the four portions 102a-102d of FIG. 1C. FIG. 1I depicts locations of example positive and negative 2×2 maxel groups intended to at least partially magnetically fill the four portions 102a-102d of FIG. 1C in accordance with the polarity pattern mapping of FIG. 1H. However, some areas of a defined region may remain unfilled depending, for example, on sizes or shapes of the printed maxels, sizes or shapes of defined regions, whether overlapping of maxels is utilized, etc.

Figure 1J:
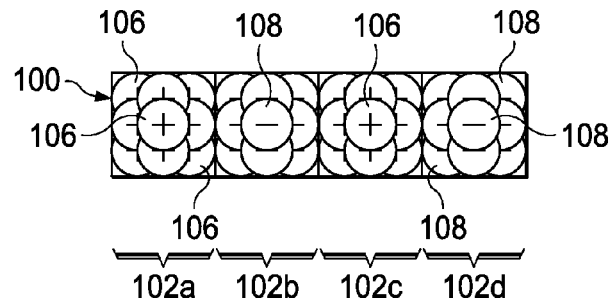
FIG. 1J depicts example locations of positive and negative 3×3 maxel groups intended to magnetically fill the four portions of FIG. 1C in accordance with the polarity pattern mapping of FIG. 1H.

FIG. 1J depicts locations of example positive and negative 3×3 maxel groups intended to at least partially magnetically fill the four portions 102a-102d of FIG. 1C in accordance with the polarity pattern mapping of FIG. 1H. As depicted in the example of FIG. 1J, the illustrated maxels 106 and 108 may overlap each other. However, a given pattern of maxels may not overlap depending on a size of a region and/or a size or a shape of the maxels forming the given pattern. Thus, some example implementations may include pattern designs having maxels that overlap each other, but other example implementations may have no overlapping maxels. Also, although FIG. 1J shows maxels that overlap within defined regions but not between or across regions, claimed subject matter is not so limited.

Figure 1K:
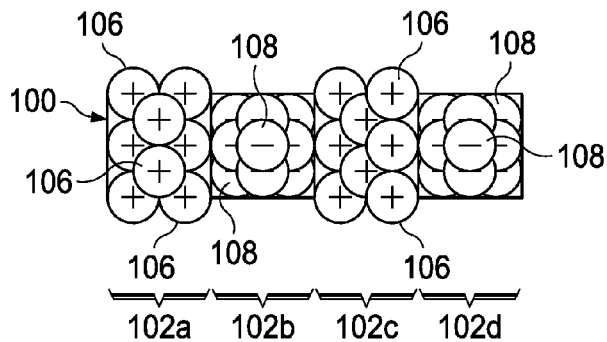
FIG. 1K depicts positive maxels begin located so that they overlap the edge of the magnetizable material in accordance with an example arrangement and also depicts two alternative example overlapping methods.

FIG. 1K depicts positive maxels 106 being located in an example arrangement such that they overlap an edge of the magnetizable material 100. FIG. 1K also depicts two example alternative overlapping methods for maxels 106. Although each example alternative includes eight maxels 106 arranged from left to right in a 3-2-3 column pattern, a temporal order of their printing or placement varies as indicated visually. In portion 102a, a middle two-maxel column is printed last. In portion 102c, the three columns are printed in a left-to-right order. Both portions 102a and 102c have maxels that overlap an edge of the magnetizable material. A result of overlapping an edge with a printed maxel may be that a partial maxel is produced where the overlapping portion extends beyond an edge of and therefore misses the magnetizable material (e.g., and is thus "lost"). Thus, some example implementations may include one or more maxels that overlap at least one edge of a magnetizable material, but other example implementations may not include a maxel that is overlapping an edge of a magnetizable material.

Figure 1L:
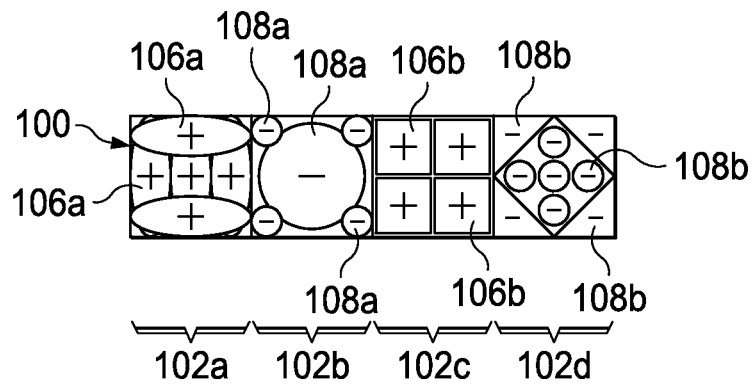
FIG. 1L depicts different example shapes and sizes of positive and negative maxels intended to magnetically fill the four portions of FIG. 1C in accordance with the polarity pattern mapping of FIG. 1H.

FIG. 1L depicts different example shapes and sizes of positive and negative maxels 106 and 108 intended to at least partially magnetically fill the four portions 102a-102d of FIG. 1C in accordance with the polarity pattern mapping 110a-110d of FIG. 1H. As shown, five example oval-shaped maxels 106a may be overlapped to at least partially fill the portion 102a, and an example combination of four relatively smaller round maxels and one relatively larger round maxel 108a may be used to at least partially fill the portion 102b. Also, four example square maxels 106b may be used to at least partially fill the portion 102c, and four example triangular maxels and five example round maxels may be used to at least partially fill the portion 102d. For certain example embodiments, maxels 106 or 108 may comprise maxels of any shape. Example shapes may include, but are not limited to, curved shapes (e.g., round maxels, oval maxels, ellipsoidal maxels, s-shaped maxels, combinations thereof, etc.), rectangular shapes (e.g., triangular maxels, square maxels, rectangle maxels, trapezoidal maxels, parallelogram maxels, hexagonal maxels, combinations thereof, etc.), and any combinations thereof, and so forth.

Figure 1M:
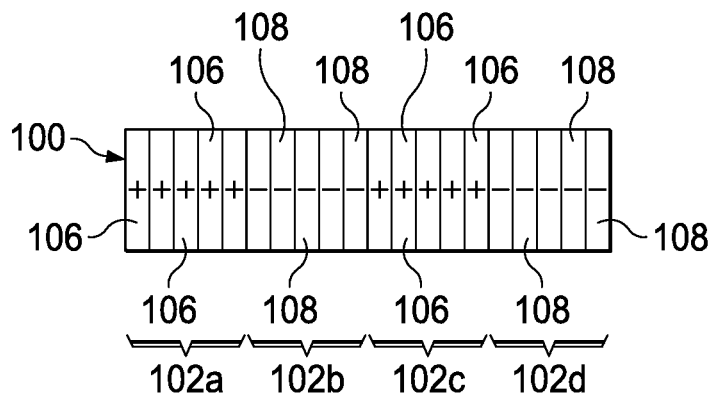
FIG. 1M depicts example rectangular positive and negative maxels intended to magnetically fill the four portions of FIG. 1C in accordance with the polarity pattern mapping of FIG. 1H.
Figure 1N:
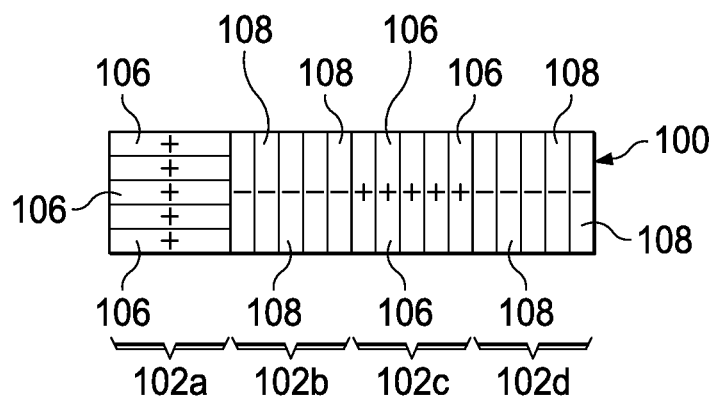
FIG. 1N depicts an example alternative arrangement of rectangular positive and negative maxels intended to magnetically fill the four portions of FIG. 1C in accordance with the polarity pattern mapping of FIG. 1H.

FIG. 1M depicts example rectangular positive and negative maxels 106 and 108 that are intended to magnetically at least partially fill the four portions 102a-102d of FIG. 1C in accordance with the polarity pattern mapping 110a-110d of FIG. 1H. As shown in the example arrangement of FIG. 1M, five vertically-oriented maxels 106, 108 may be used to at least partially fill each portion of the four portions 102a-102d. FIG. 1N depicts an alternative example arrangement of rectangular positive and negative maxels 106, 108 that are intended to magnetically at least partially fill the four portions 102a-102d of FIG. 1C in accordance with the polarity pattern mapping 110a-110d of FIG. 1H. As shown in the example arrangement of FIG. 1N, five horizontally-oriented maxels 106 may be used to at least partially fill portion 102a, and five vertically-oriented maxels 106, 108 may be used to at least partially fill each of the other three portions 102*b*-102*d*. Generally, different alternative arrangements of horizontally, vertically, and/or diagonally, etc. oriented maxels may be used to at least partially fill a region.

Figure 1O:
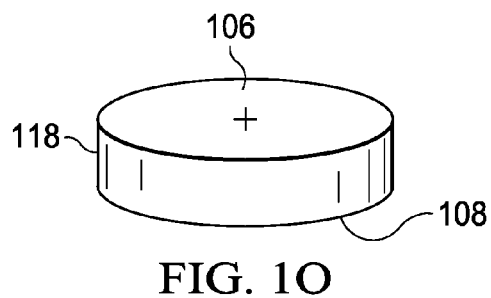
FIG. 1O depicts an oblique projection of an example disk-shaped magnetized material axially magnetized so as to be a conventional bipolar magnet having a positive polarity on one side and a negative polarity on the other side.
Figure 1P:
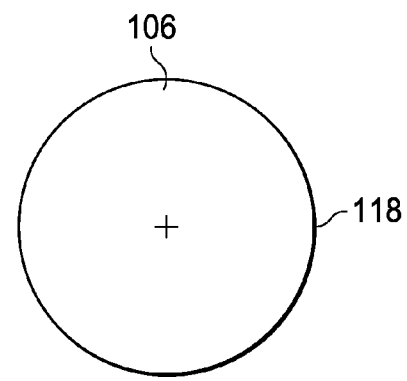
FIG. 1P depicts a plan view of the positive polarity side of the example disk-shaped magnet of FIG. 1O.

FIG. 1O depicts an oblique projection of an example disk-shaped magnetized material 118 that is axially magnetized so as to form or at least mimic a "conventional" bipolar magnet having a positive polarity maxel 106 on one side and a negative polarity maxel 108 on the other side. FIG. 1P depicts an example plan view of the side with the positive polarity maxel 106 of the disk-shaped magnet 118 of FIG. 1O.

Figure 1Q:
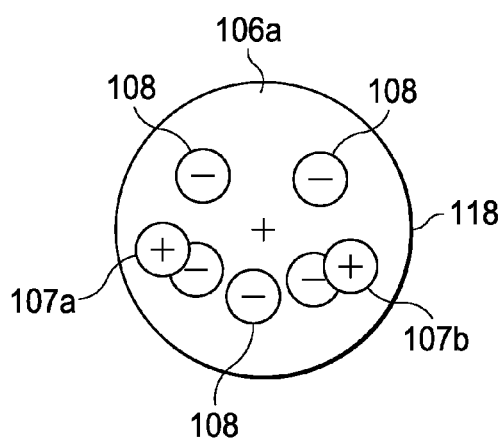
FIG. 1Q depicts example negative maxels printed onto the positive side of the disk-shaped magnet of FIG. 1P to produce an example happy face pattern.

FIG. 1Q depicts negative maxels 108 printed onto the positive side 106*a* of the disk-shaped magnet 118 of FIG. 1P to produce an example happy face pattern. Specifically, as shown, five negative polarity maxels 108 may be printed on a positive polarity surface 106*a* and then two positive polarity 'overwriting' maxels 107*a*, 107*b* may be printed to overwrite a portion of the negative polarity maxels 108 that make up the corners of the mouth of the happy face. After printing, the composite magnetic field of the face 106*a* may include negative polarity magnetic fields within an otherwise positive field. Consequently, the negative polarity magnetic fields may correspond to a pattern in which the negative polarity maxels in the corners of the mouth of the happy face may resemble a partial eclipse.

Figure 1R:
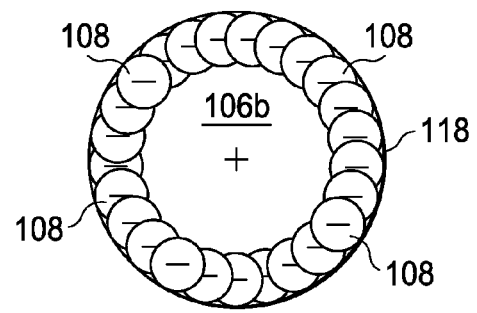
FIG. 1R depicts example overlapping negative maxels printed around the perimeter of the positive side of the disk shaped magnet of FIG. 1P to produce an example ring pattern.

FIG. 1R depicts overlapping negative maxels 108 printed around a perimeter of the positive side 106*b* of the disk-shaped magnet 118 of FIG. 1P to produce an example ring pattern. After printing, the composite magnetic field may thus have an outer negative polarity ring along with a positive polarity region inside the negative polarity ring. As depicted, the negative polarity maxels are overlapped arbitrarily. However, overlapping methods and/or an order in which maxels are printed may be varied and/or controlled to achieve one or more desired magnetic field characteristics.

Figure 1S:
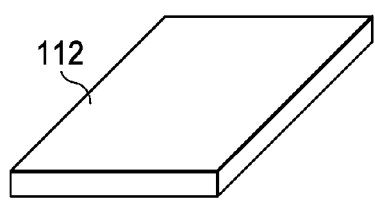
FIG. 1S depicts an oblique projection of an example panel-shaped magnetizable material that is non-magnetized.

FIG. 1S depicts an oblique projection of an example panel-shaped magnetizable material 112 that is non-magnetized. In certain example implementations, the panel 112 may be brought into proximity with a magnetic-field-sensitive solution or other substance (e.g., an iron oxide solution of superparamagnetic photonic crystals). Proximity may be achieved by, for example, suspending particles in a liquid or applying a solution to a surface of the panel 112 using, for instance, a paint having photonic crystals. In such example implementations, optical characteristics of photonic crystals may be controlled via a printing of a magnetic pattern—this may be referred to as a magnetic dichroic control.

Figure 1U:
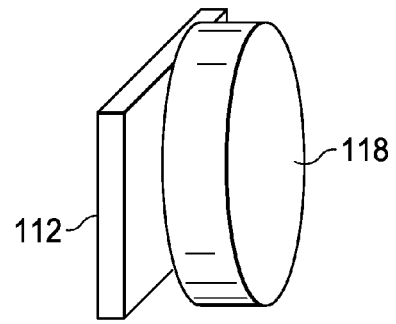
FIG. 1U depicts an example bias magnetic source being brought into proximity to a panel like the panel of FIG. 1S in an example approach to vary the coloring of the letters and the elephant image by effecting color characteristics of an example iron oxide solution of superparamagnetic photonic crystals in proximity to the panel.
Figure 1T:
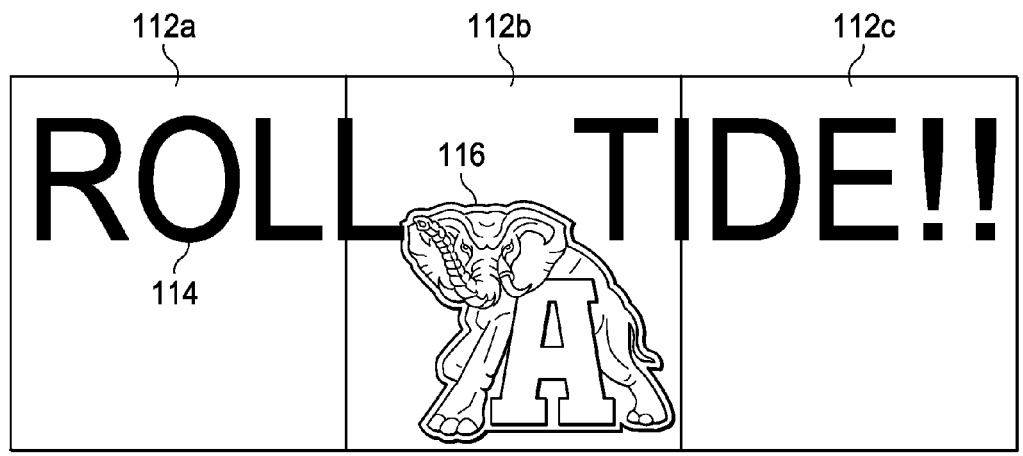
FIG. 1T depicts three panels like the panel of FIG. 1S having example letters and an example elephant image produced by printing maxels having polarities and field strengths in accordance with the lines and coloring of the letters and the elephant image.

FIG. 1T depicts three example panels 112*a*, 112*b*, and 112*c* that may be similar to panel 112 of FIG. 1S. As shown, panels 112*a*, 112*b*, and 112*c* may have letters 114 and/or an elephant image 116 produced thereon by printing maxels (not explicitly shown) having polarities and field strengths in accordance with the illustrated example lines and coloring of the letters 114 and the elephant image 116. Generally, for certain example implementations, a magnetic field created by one or more maxels may form a pattern that includes text (e.g., letters, numbers, symbols, other characters, some combination thereof, etc.) such as letters 114, a person-recognizable image (e.g., a face, an emblem or logo or trademark, a building, a plant or animal, a scenic vista, some combination thereof, etc.) such as elephant image 116, any combination thereof, and so forth. It should be noted that human perception may involve one or more tools to facilitate a visually-accessible representation of a magnetic field. Additionally and/or alternatively, field strengths may also be established in accordance with example color characteristics of an iron oxide solution of superparamagnetic photonic crystals that are to be brought into proximity with the panels 112*a*-112*c*.

FIG. 1U depicts an example bias magnetic source 118 being brought into proximity with a panel 112 like the panel of FIG. 1S so as to vary the coloring of the letters and the elephant image by effecting the color characteristics of an iron oxide solution of superparamagnetic photonic crystals that is in proximity to the panel 112. A bias source may comprise, by way of example but not limitation, a permanent magnet or an electromagnet. Additionally and/or alternatively, a bias source may comprise, also by way of example but not limitation, an array of permanent magnets having polarities and field strengths in accordance with a pattern or an array of electromagnets controlled to produce magnetic structures having polarities and field strengths in accordance with a pattern.

As described above, FIG. 1T illustrates text and an image produced on magnetizable surfaces. However, an ability to print magnetic patterns to produce prescribed magnetic fields and/or to produce such prescribed magnetic fields using an array of electromagnets enables numerous types of static or dynamic signage, artwork, and the like. In the case of electromagnets, for example, an image (e.g., a message, an animation, etc.) may be made to vary over time. FIGS. 2A-3M, which are described herein below, illustrate other examples of text and/or images being produced on magnetizable surfaces.

In an example implementation, a colored 'etch-a-sketch' like device may be realized using e.g. a soft ferrite material with electromagnetic solenoid brushes with different thicknesses. Pulse width control may provide intensity control for the brushes. Color mixing or half-toning may be achieved via ramp control of a solenoid. In an example implementation, use of electromagnetic arrays and/or by controlling magnetic dichroic effects, new types of television screens or other display screens (e.g., for computing, telecommunications, entertainment, etc. devices) may be produced.

In an example implementation, magnetizable paint having photonic crystals may be applied to an object (e.g., a T-shirt) that is placed over an electromagnetic array. Array elements of the electromagnetic array may be programmed to produce certain colors so as to effectively 'screen print' multiple colors in one application.

In an example implementation, a badge or other e.g. identification-related device having magnetic paint may be magnetized with a pattern that may then be optically recognized by a camera or other optical recognition device such as an infrared device. For example, a security guard may magnetize a pattern onto a badge when a person enters a facility, and then thereafter the person's badge may be recognized. The pattern may be randomized such that the badge may be changed how ever often it is desirable to change it. The pattern may, for example, be a reprogrammable multi-dimensional bar code.

In an example implementation, a tag comprising a layer of magnetizable material and having a coating of magnetic paint comprising photonic crystals may be used to provide information about an object via visualization of magnetic fields produced by magnetically printing maxels and varying their characteristics in multiple dimensions (e.g., x, y, color, etc.). A badge or a tag may comprise an electromagnetic array wherein information conveyed by visualization of magnetic fields may be changed over time, such as is described above with respect to signage. Additionally or alternatively, light sources may be controlled to cause different magnetic field attributes to appear or be enhanced.

In certain example embodiments, various reverse magnetization techniques may be employed to overwrite at least one printed maxel or a portion of a printed maxel, to lower the amplitude of a maxel (e.g., without changing its polarity), some combination thereof, and so forth. Similarly, various techniques may be used to demagnetize at least one maxel or a portion of a maxel, such as heating a location of a maxel with a laser to demagnetize that location.

In certain example embodiments, a magnetic printer may be configured to "over-magnetize" a maxel such that material forming the maxel becomes substantially fully saturated at a location of the maxel and such that additional magnetization beyond what it takes to saturate that location causes the maxel to expand in diameter. As such, a diameter of a maxel may be controllable. If preventing or at least retarding over-magnetization is desired, additional magnetizable material (e.g., a second piece of "sacrificial" material) may be placed beneath a given magnetizable material when printing a maxel onto the given magnetizable material such that all or at least some of the potential additional saturation spreads into the additional magnetizable material instead of expanding a diameter of the maxel being printed into the given magnetizable material.

In certain example embodiments, a magnetic printer may print maxels in a manner that is analogous to that of or having capabilities that are analogous to those of a dot matrix printer. Because of such analogous manners and/or capabilities, because of an ability to amplitude modulate printing of maxels, because a designer may overlap different sizes or shapes of maxels of the same or opposite polarity, and/or because a designer may take into account material saturation characteristics, a magnetizable material may be considered similar to a canvas, and a magnetic printer may be considered similar to a paint brush. Similarly, maxels may be considered as being analogous to pixels of a liquid crystal display (LCD) or other pixel-based display technology. As such, certain graphical techniques, computerized graphics software, strategies, combinations thereof, etc. may be applied to software and/or control systems that enable a magnetic graphical artist to design magnetic patterns and/or control magnetic printing of magnetizable material to produce desired patterns. Example of graphical techniques, computerized graphics software, strategies, etc. may include, but are not limited to, 3D modeling software; strategies to select a region or fill a selected region with a selected pattern; application of color palettes; use of predefined objects (e.g., squares, circles, fonts, stamps, etc.); implementation of shading; combinations thereof; and so forth.

In certain example embodiments, an automated and/or iterative measurement and/or redesign process may be implemented so that magnetic fields may be precisely prescribed. For example, a 'getting warmer—getting colder' algorithm may be used to systematically and precisely tailor magnetic fields to one or more desired field characteristics.

In certain example embodiments, any kind of image may be magnetically rendered in accordance with certain principles described herein. Images may include, but are not limited to, text, drawings, photographs, combinations thereof, and so forth. Company, school, or sport team logos may be rendered, for instance. As such, magnetic memorabilia may be produced in accordance with certain principles described herein. Additionally or alternatively, various other uses for magnetic imaging may be implemented, such as jewelry, awards, coinage, artwork, combinations thereof, and so forth. In example implementations, magnetic printing may be used for encrypting information in which a predetermined bias field is to be applied to decrypt the information.

Figure 2A:
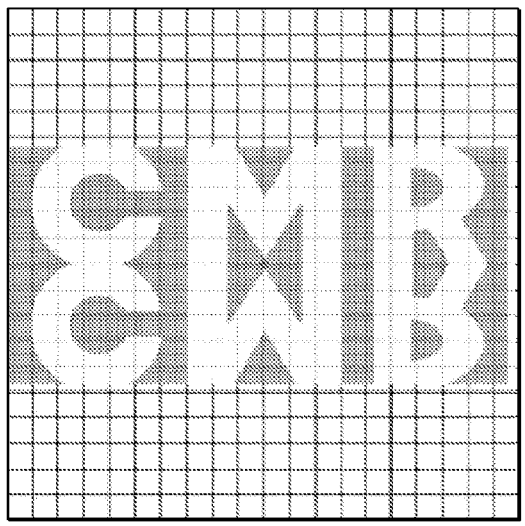
FIG. 2A depicts an example logo and an example grid overlay used to determine example locations of maxels to be printed onto a magnetizeable material in order to create an magnetic image corresponding to the logo.
Figure 2B:
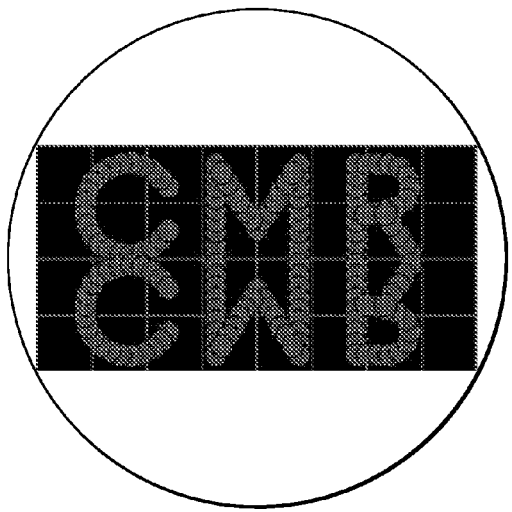
FIG. 2B depicts an example pattern of positive polarity maxels corresponding to the logo of FIG. 2A where the maxels have been printed inside letters making up the logo.

FIGS. 2A and 2B relate to a first example company logo. FIG. 2A depicts a first company logo and an example grid overlay that may be used to determine locations of maxels to be printed onto a magnetizable material in order to create a magnetic image corresponding to the first company logo.

FIG. 2B depicts an example pattern of positive polarity maxels corresponding to the first company logo of FIG. 2A. In the example pattern of FIG. 2B, the maxels are shown printed inside the letters forming the first company logo. Additionally or alternatively, letters may be formed from negative polarity maxels, or maxels may vary in polarity.

Figure 2C:
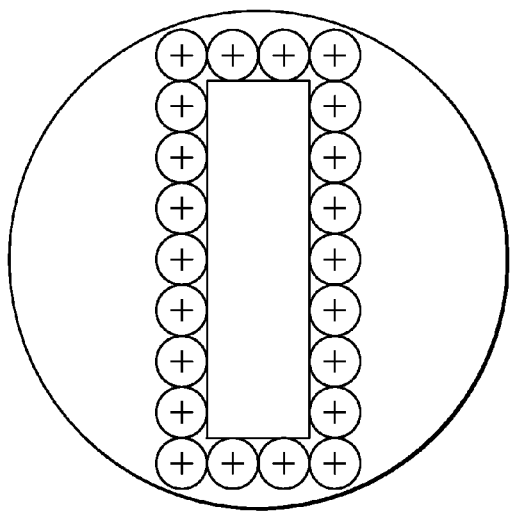
FIG. 2C depicts an example of maxels printed along the outside of a perimeter of a region instead of inside it.
Figure 2D:
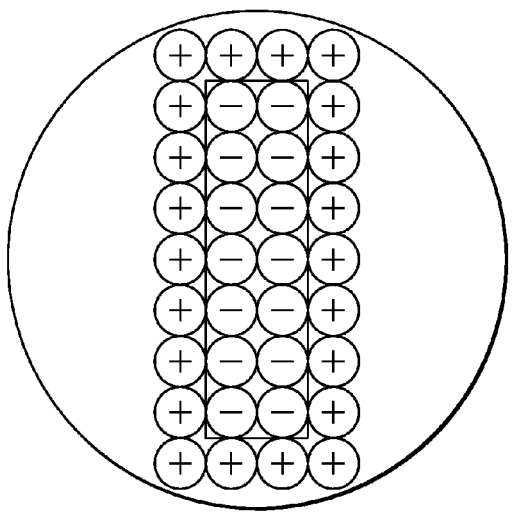
FIG. 2D depicts an example of negative polarity maxels printed inside a perimeter of a region and positive polarity maxels printed outside the perimeter of the region so as to create a field transition line when viewed with magnetic viewing film.

Additionally or alternatively, letters may be formed from or otherwise include maxels printed at different locations (e.g., filling an inside of letters, filling outside of letters, along a boundary of letters, just inside or just outside a boundary of letters, or any combination thereof, etc.). FIG. 2C depicts maxels printed along an example outside perimeter of a region (e.g., instead of inside of it). FIG. 2D depicts an example printing of negative polarity maxels inside a perimeter of the region (of FIG. 2C) and positive polarity maxels outside the perimeter of the region. Consequently, a field transition line may be created; a field transition line may be viewed with magnetic viewing film.

FIG. 2E depicts example weighting factors that may be used to define different magnetic field amplitudes for a grid of maxels as an example form of implementing gray scaling of a printed magnetic image. In certain example embodiments, maxel magnetic field amplitudes may be varied in order to produce a "magnetic gray scale image" of a source image. A source image may, for instance, be scanned by an optical scanning device. Generally, maxel magnetic field amplitudes may be varied in accordance with certain principles described herein so as to produce, e.g., a magnetic gray scale image corresponding to any given analog or digital data. Additionally or alternatively, in an inverse process, analog or digital data may be derived via measurements of a magnetic gray scale image that is produced in accordance with certain principles as described herein.

FIGS. 2F-2I illustrate various types of example images of presidents. FIG. 2F depicts an example gray scale image of President Abraham Lincoln.

FIG. 2G depicts an example magnetic image corresponding to the gray scale image of FIG. 2F. FIG. 2H depicts an example color image of President George Washington. FIG. 2I depicts an example magnetic image corresponding to the color image of FIG. 2H.

Figure 2J:
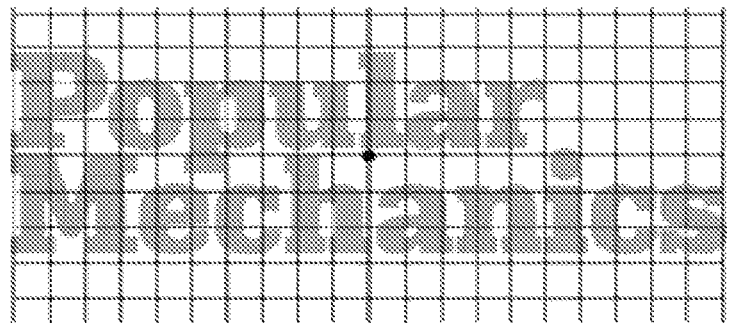
FIG. 2J depicts another example logo and a grid overlay used to determine example locations of maxels to be printed onto a magnetizeable material in order to create a magnetic image corresponding to the logo.
Figure 2K:
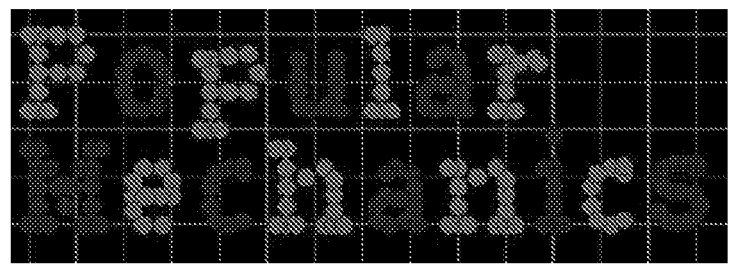
FIG. 2K depicts example patterns of positive and negative polarity maxels corresponding to the letters of the logo of FIG. 2J.
Figure 2L:
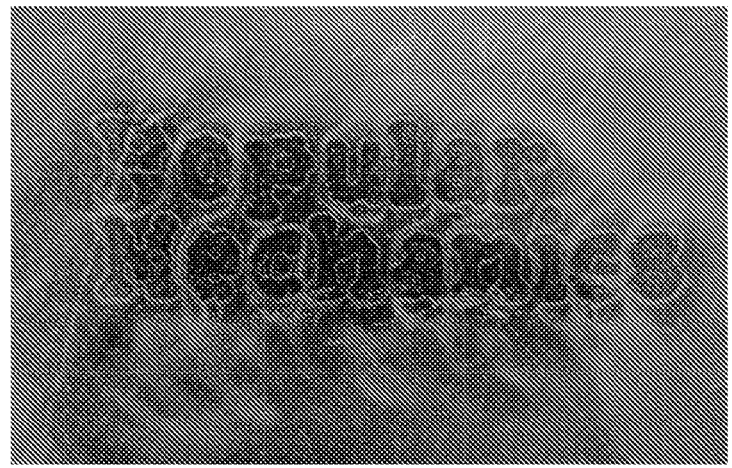
FIG. 2L depicts an example magnetic logo produced with the maxel patterns of FIG. 2K as viewed with magnetic viewing film.

FIGS. 2J-2L relate to a second example company logo. FIG. 2J depicts a second company logo and another example grid overlay that may be used to determine locations of maxels to be printed onto a magnetizeable material in order to create a magnetic image corresponding to the second company logo. FIG. 2K depicts example patterns of positive and negative polarity maxels corresponding to the letters of the second company logo of FIG. 2J. By way of example only, some maxels are shown as overlaid onto or overlapping other maxels so as to smooth the shapes of letters. FIG. 2L depicts an example magnetic version of the second company logo that is produced with maxel patterns of FIG. 2K as viewed with magnetic viewing film.

Figure 3A:
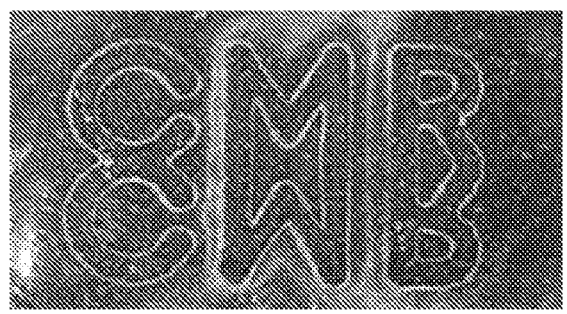
FIG. 3A depicts magnetic viewing film having been placed directly on top of magnetizable material having been de-magnetized and then magnetically printed with an example arrangement of positive polarity maxels in the logo pattern of FIG. 2B.
Figure 3B:
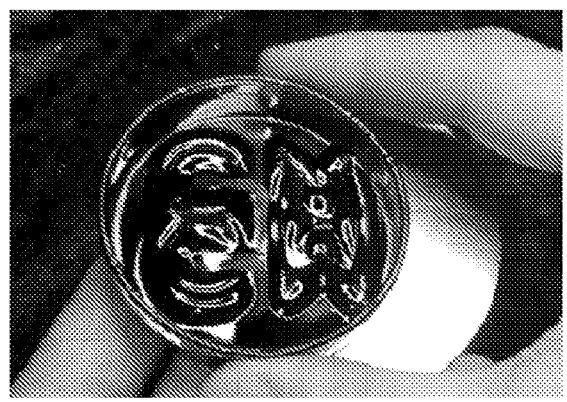
FIG. 3B depicts ferrofluid placed directly on top of magnetizable material having been de-magnetized and then magnetically printed with an example arrangement of positive polarity maxels in the logo pattern of FIG. 2B.

FIGS. 3A-3M relate to the first example company logo of FIG. 2B. FIG. 3A depicts an example of magnetic viewing film that is currently located directly on top of magnetizable material having been de-magnetized and then magnetically printed with example positive polarity maxels in accordance with the first company logo pattern of FIG. 2B. FIG. 3B depicts an example of ferrofluid that is currently located directly on top of magnetizable material having been de-magnetized and then magnetically printed with positive polarity maxels in accordance with the first company logo pattern of FIG. 2B. Specifically, a mirror image of the 'CM' letters is visible.

Figure 3C:
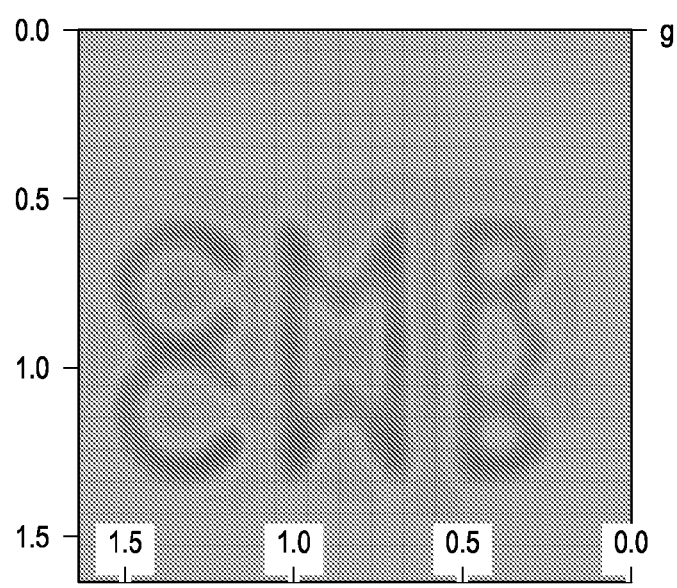
FIG. 3C depicts output of an example magnetic field scan at the surface of the magnetizable material after the logo pattern of FIG. 2B has been magnetically printed.
Figure 3D:
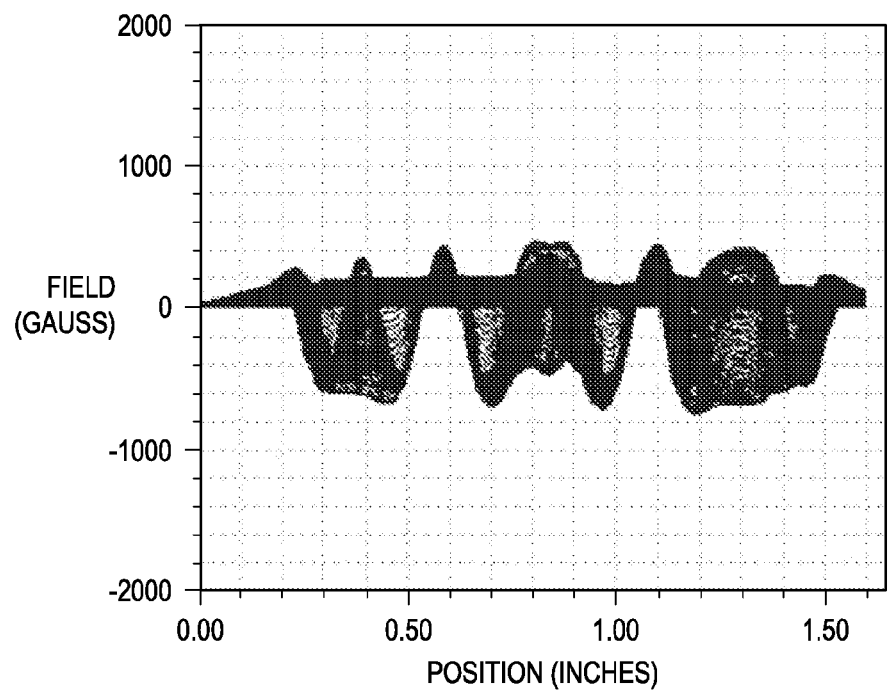
FIG. 3D depicts an example of overlaid peak field strength measurements at different widths across the length of magnetizable material after the logo pattern of FIG. 2B has been magnetically printed.
Figure 3E:
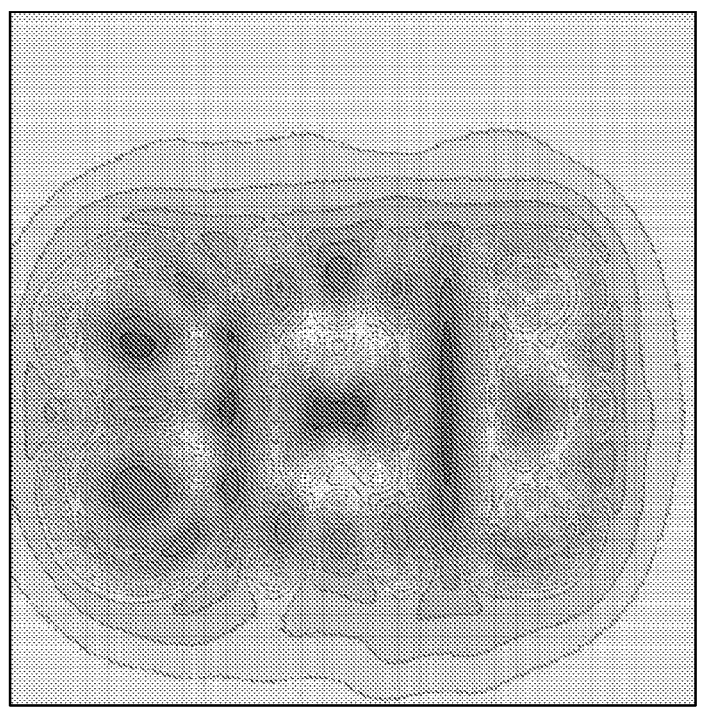
FIG. 3E depicts a plan view of an example contour plot of a magnetic field scan at the surface of the magnetizable material after the logo pattern of FIG. 2B has been magnetically printed.
Figure 3F:
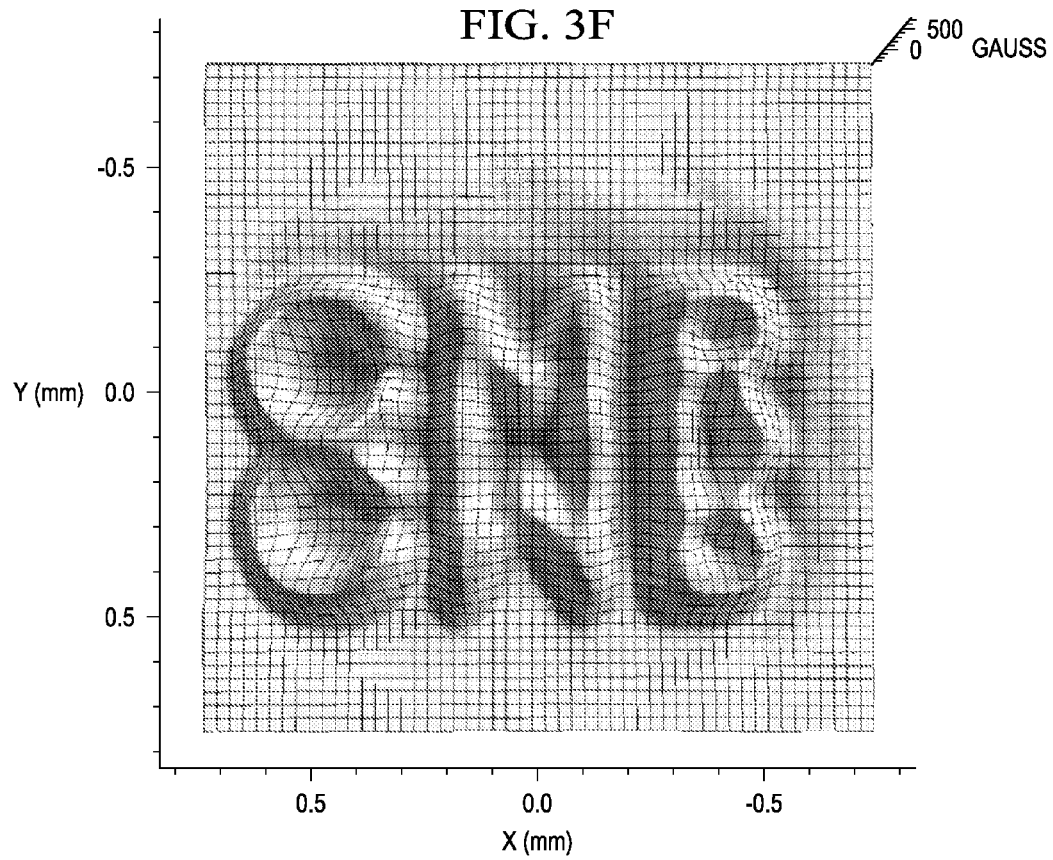
FIG. 3F depicts a plan view of an example surface plot of the magnetic field scan at the surface of the magnetizable material after the logo pattern of FIG. 2B has been magnetically printed.
Figure 3G:
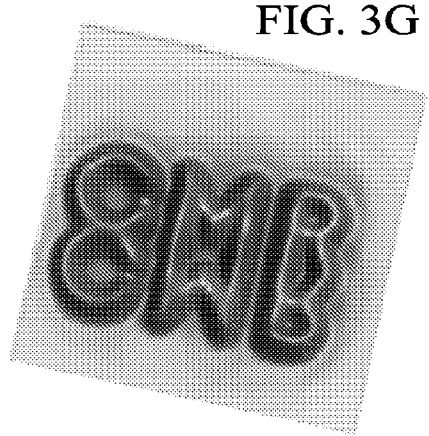
FIGS. 3G-3M depict different example views of a surface plot of a magnetic field scan at the surface of the magnetizable material after the logo pattern of FIG. 2B has been magnetically printed.
Figure 3H:
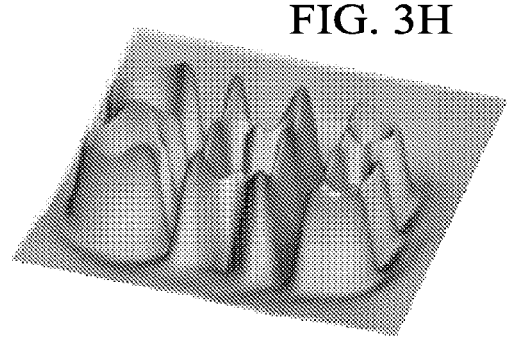
Figure 3I:
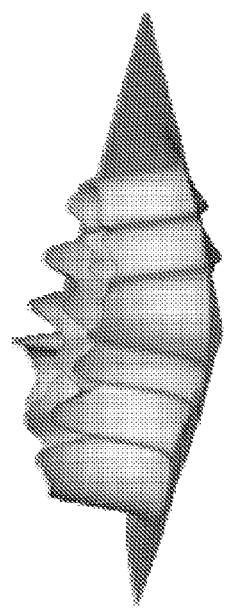
Figure 3J:
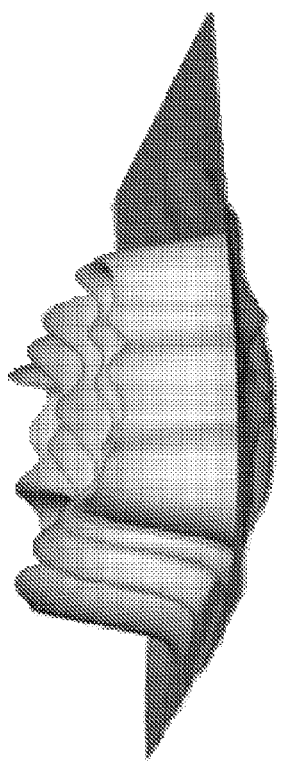
Figure 3K:
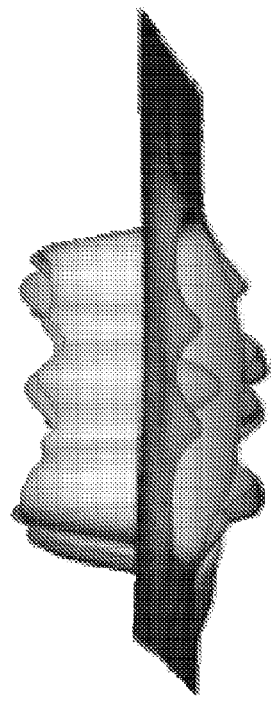
Figure 3L:
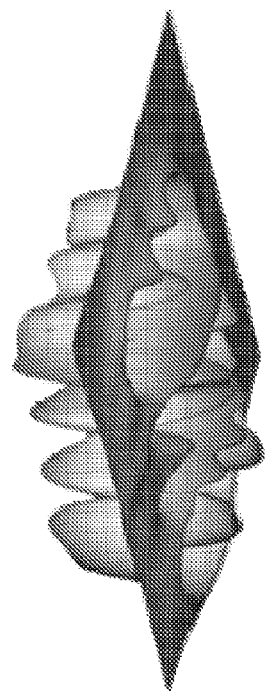
Figure 3M:
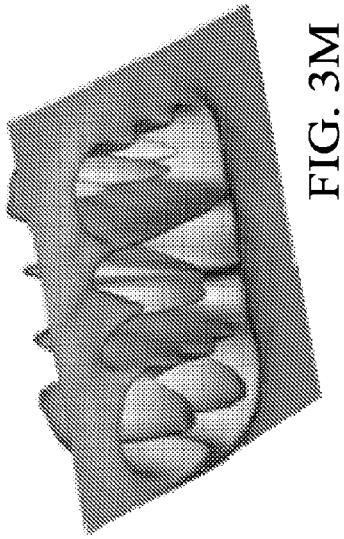

FIGS. 3C-3F relate to example magnetic field scans of the first company logo shown in FIG. 2B. FIG. 3C depicts output of an example magnetic field scan at a surface of magnetizable material after the first company logo has been magnetically printed onto the surface. FIG. 3D depicts an example set of overlaid peak field strength measurements at different widths across a length of the magnetizable material after the first company logo has been magnetically printed thereon. FIG. 3E depicts a plan view of an example contour plot of a magnetic field scan at the surface of the magnetizable material after the first company logo has been magnetically printed on it. FIG. 3F depicts a plan view of an example surface plot of a magnetic field scan at the surface of the magnetizable material after the first company logo has been magnetically printed on its surface.

FIGS. 3G-3M depict different views of one or more example surface plots of a magnetic field scan at a surface of a magnetizable material after the first company logo has been magnetically printed on the surface. By programmatically varying the view point and rendering the resulting image, an animation may be produced in which the rendered magnetic field image appears to rotate.

Figure 4A:
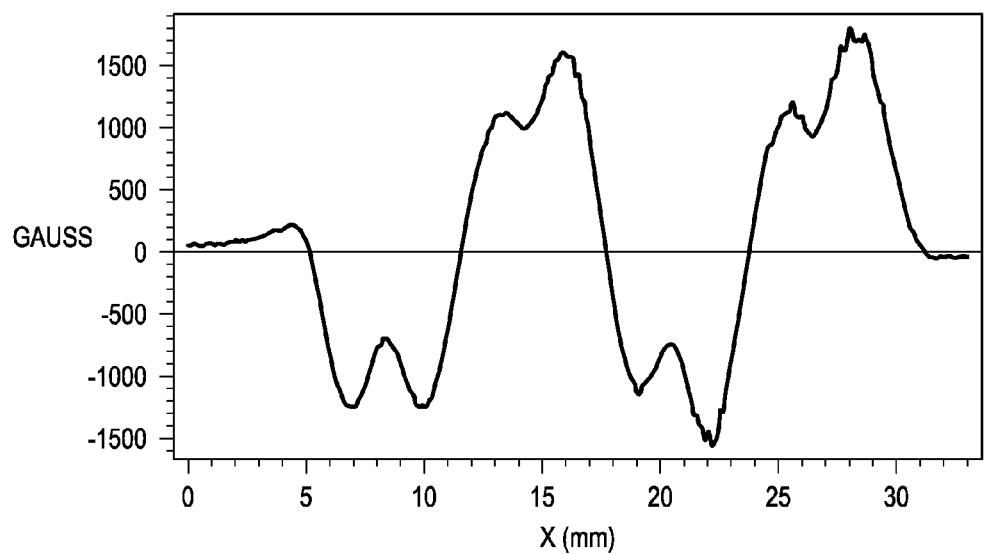
FIG. 4A depicts an example peak field strength of a magnetic field scan across a length of a magnetizable material having been magnetically printing with the 2×2 maxel pattern shown in FIG. 1I.
Figure 4B:
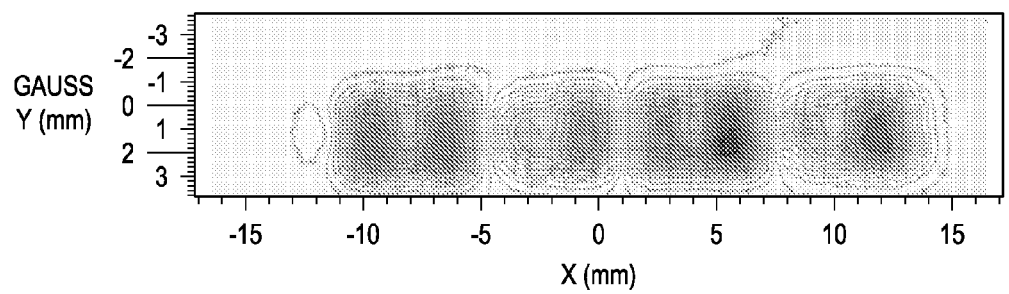
FIG. 4B depicts an example contour plot of the magnetic field scan of FIG. 4A.
Figure 4C:
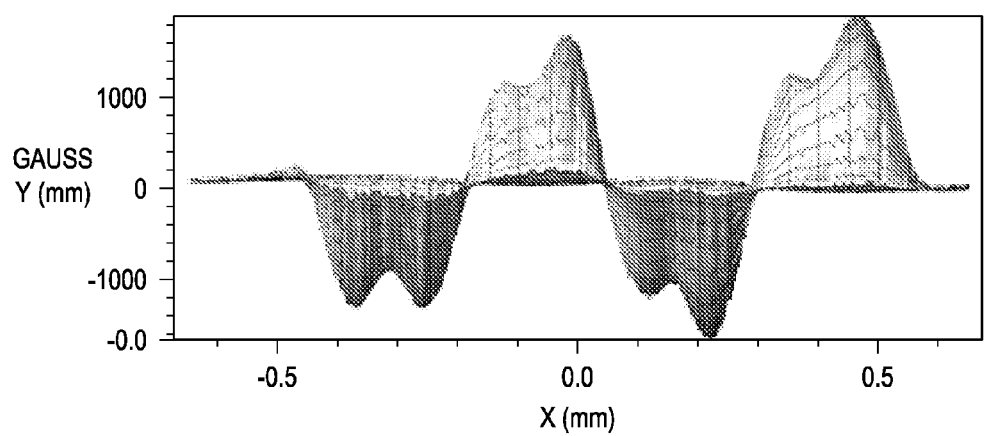
FIG. 4C depicts an example surface plot of the magnetic field scan of FIG. 4A.

FIGS. 4A-10 serve to illustrate example embodiments for achieving a desired magnetic field. FIG. 4A depicts an example peak field strength of a magnetic field scan across a length of a magnetizable material having been magnetically printed with an example 2×2 maxel pattern as shown in FIG. 1I. For the illustrated example, each of the (e.g., sixteen) maxels are printed using the same voltage. As may be apparent from a visual review of the illustrated peak field strength, the spacing of the maxels in the example 2×2 pattern can result in irregular composite magnetic fields that resemble mountain peaks. FIG. 4B depicts an example contour plot of the magnetic field scan of FIG. 4A. FIG. 4C depicts an example surface plot of the magnetic field scan of FIG. 4A. Two "mountain peaks" are visible as corresponding to each maxel.

Figure 5A:
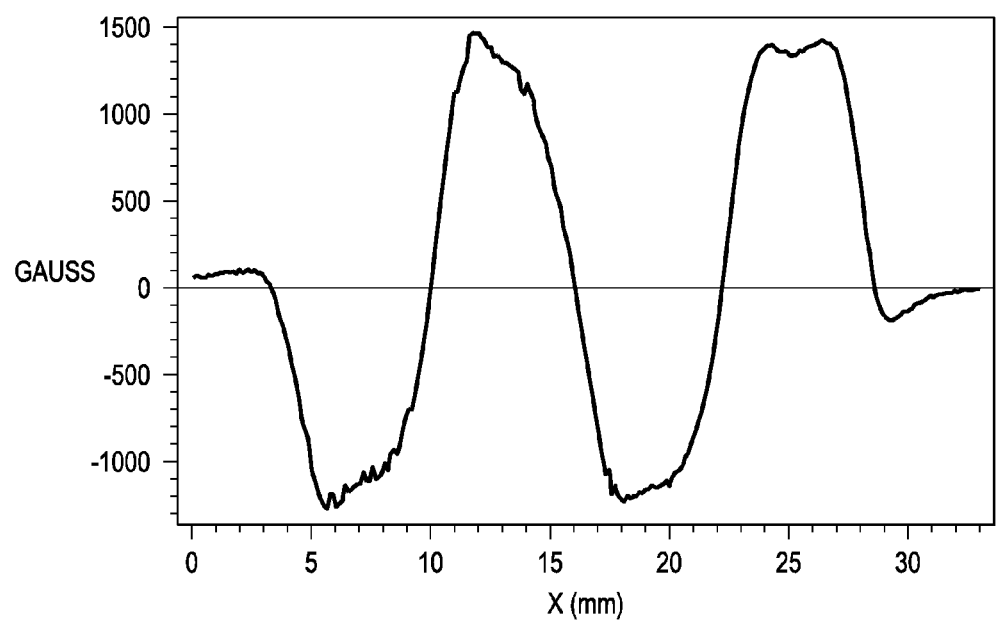
FIG. 5A depicts an example peak field strength of a magnetic field scan across the length of a magnetizable material having been magnetically printing with the 3×3 maxel pattern shown in FIG. 1J.
Figure 5B:
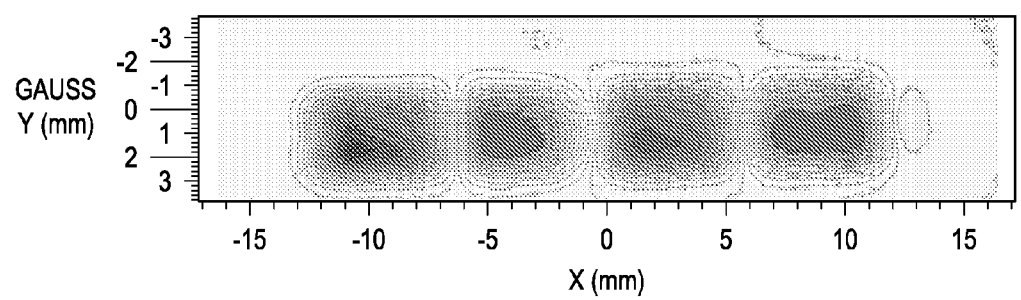
FIG. 5B depicts an example contour plot of the magnetic field scan of FIG. 5A.
Figure 5C:
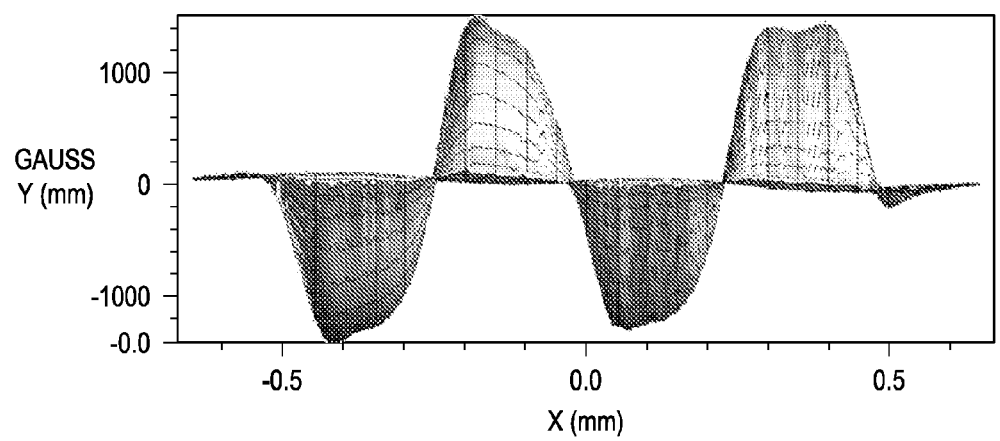
FIG. 5C depicts an example surface plot of the magnetic field scan of FIG. 5A.

FIG. 5A depicts an example peak field strength of a magnetic field scan across a length of a magnetizable material having been magnetically printed with an example 3×3 maxel pattern as shown in FIG. 1J. As may be evident from a visual review of the illustrated peak field strength, the additional maxels (e.g., five additional maxels per code region) of the 3×3 maxel pattern provide a denser or more complete 'filling' within a given region as compared to a 2×2 maxel pattern. FIG. 5B depicts an example contour plot of the magnetic field scan of FIG. 5A. FIG. 5C depicts an example surface plot of the magnetic field scan of FIG. 5A. Relative to FIGS. 4A-4C, FIGS. 5A-5C exhibit a single "mountain peak" corresponding to each maxel.

Figure 6A:
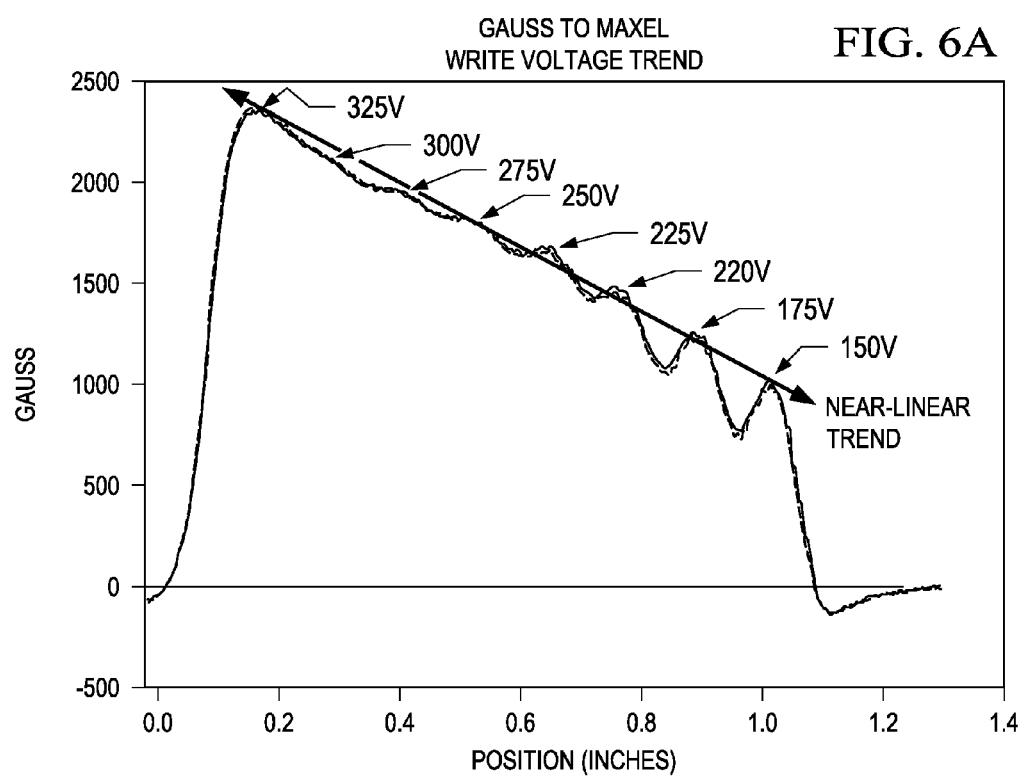
FIG. 6A depicts an example peak field strength of a magnetic field scan across a length of an example magnetizable material having been magnetically printed with equally spaced maxels having substantially linearly decreasing magnetic field strengths which corresponds to an example Gauss versus maxel write voltage trend analysis that can be used to determine magnetic field amplitude modulation weighting factors.
Figure 6B:
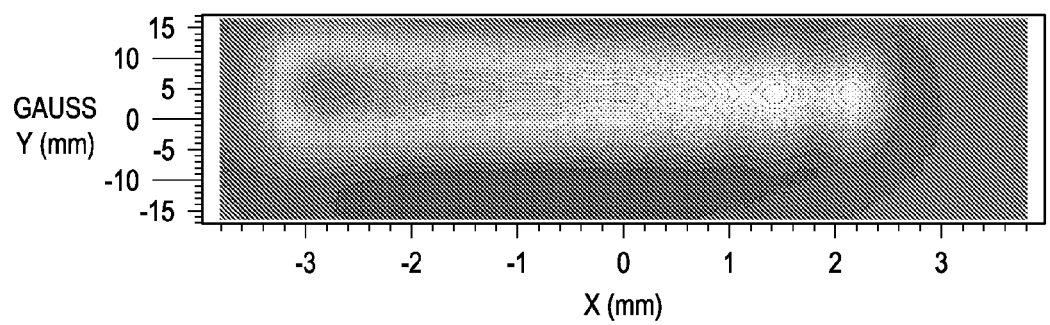
FIG. 6B depicts an example contour plot of the magnetic field scan of FIG. 6A.
Figure 6C:
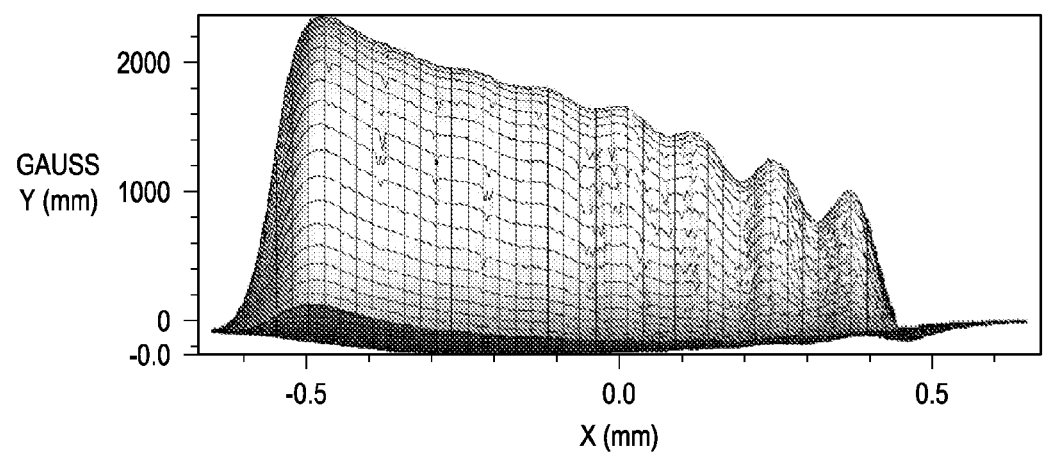
FIG. 6C depicts an example surface plot of the magnetic field scan of FIG. 6A.

FIG. 6A depicts an example peak field strength of a magnetic field scan across a length of a magnetizable material having been magnetically printed with substantially equally-spaced maxels having substantially linearly decreasing magnetic field strengths. This may correspond to an example Gauss versus maxel-write-voltage trend analysis that can be used to determine magnetic field amplitude modulation weighting factors. A review of the graph of FIG. 6A reveals that in this example maxels printed with relatively lower voltages (e.g., those on the right) at a given spacing produce fields resembling the mountain peaks described above in relation to FIG. 4A. In contrast, maxels printed with relatively higher voltages (e.g., those on the left) tend to blend together with a given spacing. FIG. 6B depicts an example contour plot of the magnetic field scan of FIG. 6A. FIG. 6C depicts an example surface plot of the magnetic field scan of FIG. 6A.

Figure 7A:
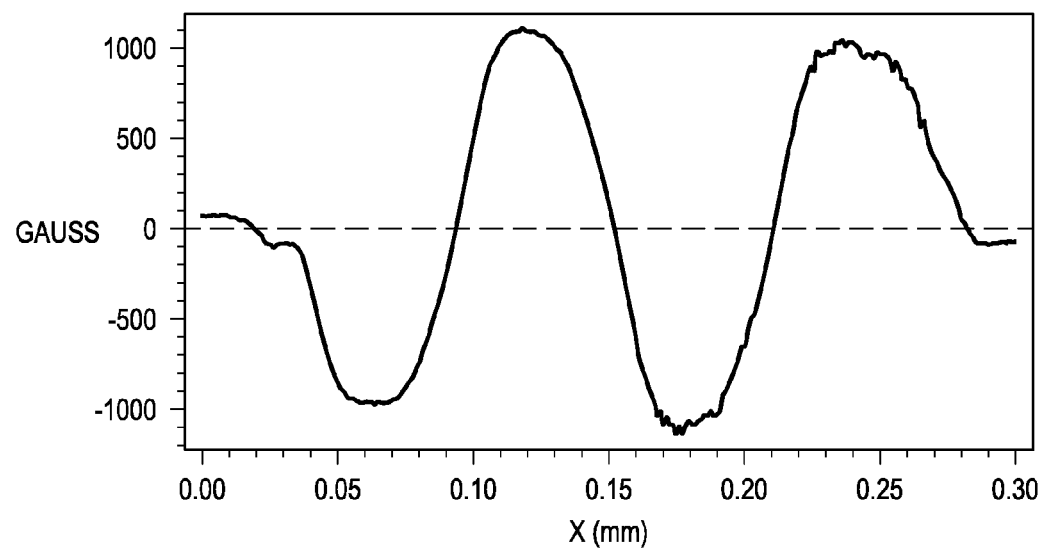
FIG. 7A depicts an example peak field strength of a magnetic field scan across the length of a magnetizable material having been magnetically printing with the 3×3 maxel pattern shown in FIG. 1J where the maxels have been amplitude modulated in an example first iterative attempt to smooth the shapes of the composite magnetics fields.
Figure 7B:
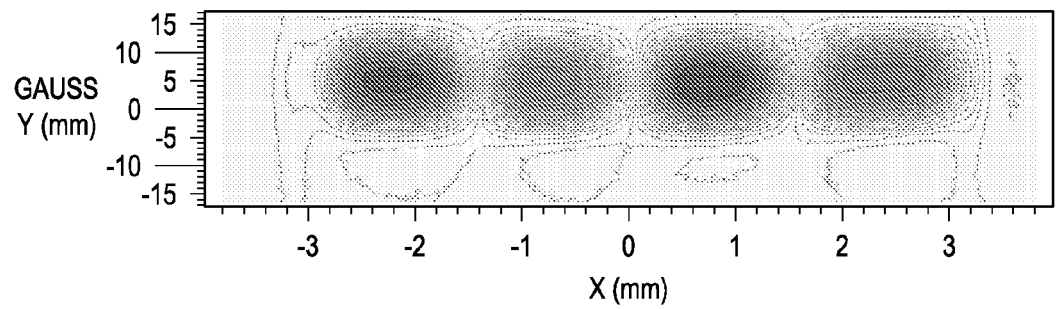
FIG. 7B depicts an example contour plot of the magnetic field scan of FIG. 7A.
Figure 7C:
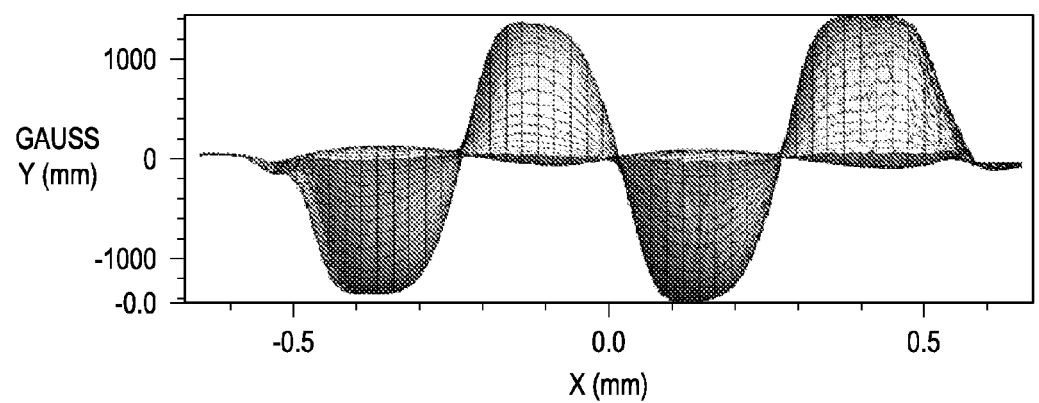
FIG. 7C depicts an example surface plot of the magnetic field scan of FIG. 7A.

FIG. 7A depicts an example peak field strength of a magnetic field scan across a length of a magnetizable material having been magnetically printed with the 3×3 maxel pattern shown in FIG. 1J. In this example, maxels are amplitude modulated in a first iterative attempt to smooth the shapes of resulting composite magnetics fields. FIG. 7B depicts an example contour plot of the magnetic field scan of FIG. 7A. FIG. 7C depicts an example surface plot of the magnetic field scan of FIG. 7A. A comparison of FIGS. 7A-7C to FIGS. 5A-5C reveals that some smoothing is accomplished as a result of a first iteration of amplitude modulation.

Figure 8A:
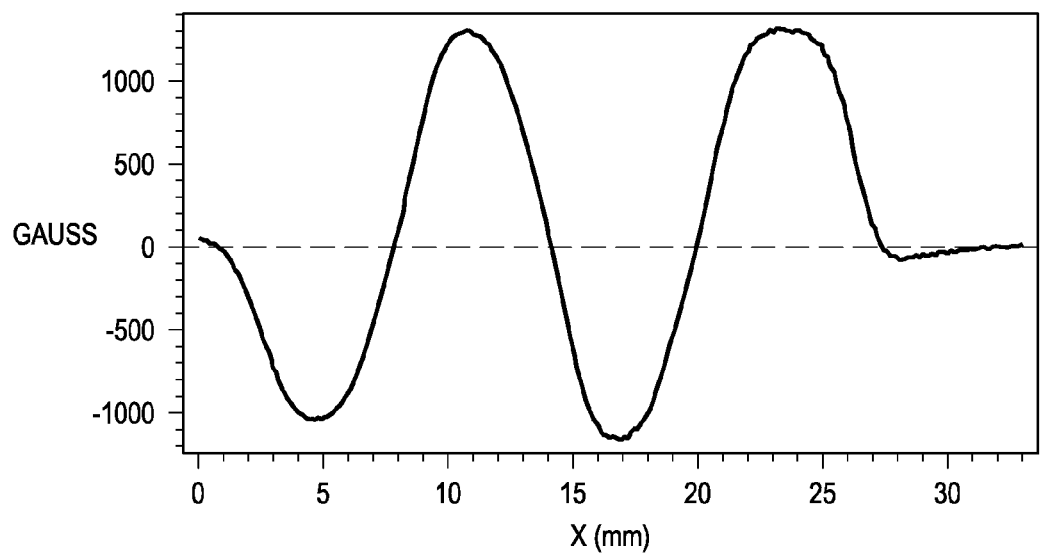
FIG. 8A depicts an example peak field strength of a magnetic field scan across the length of a magnetizable material having been magnetically printing with the 3×3 maxel pattern shown in FIG. 1J where the maxels have been amplitude modulated in an example second iterative attempt to smooth the shapes of the composite magnetics fields.
Figure 8B:
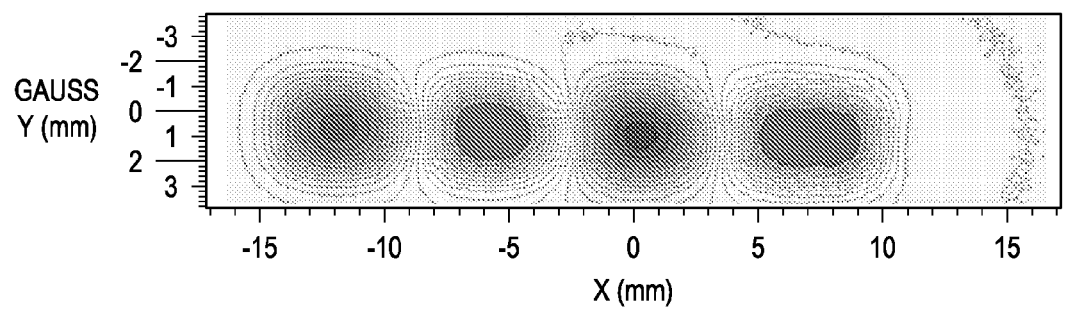
FIG. 8B depicts an example contour plot of the magnetic field scan of FIG. 8A.
Figure 8C:
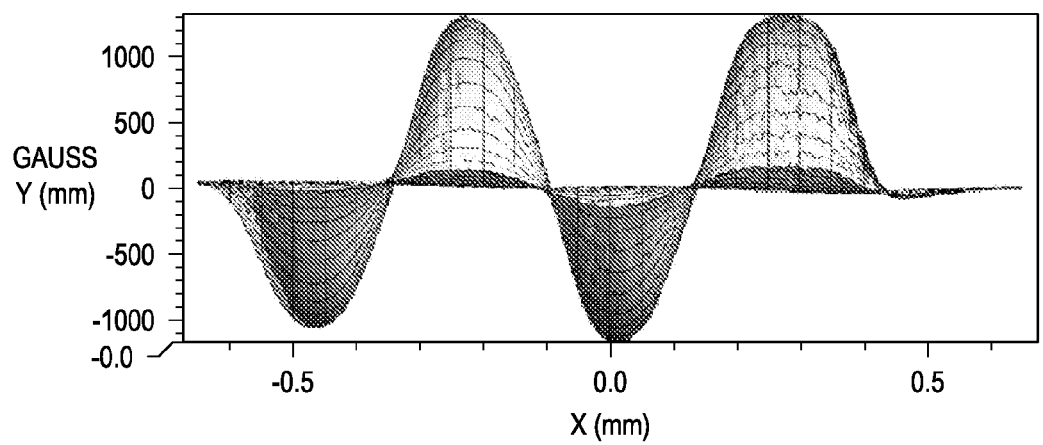
FIG. 8C depicts an example surface plot of the magnetic field scan of FIG. 8A.

FIG. 8A depicts an example peak field strength of a magnetic field scan across a length of a magnetizable material having been magnetically printed with the 3×3 maxel pattern shown in FIG. 1J. In this example, maxels are amplitude modulated in a second iterative attempt to smooth the shapes of the composite magnetics fields. FIG. 8B depicts an example contour plot of the magnetic field scan of FIG. 8A. FIG. 8C depicts an example surface plot of the magnetic field scan of FIG. 8A. A comparison of FIGS. 8A-8C to FIGS. 7A-7C reveals that additional smoothing is accomplished as a result of a second iteration of amplitude modulation.

Figure 9A:
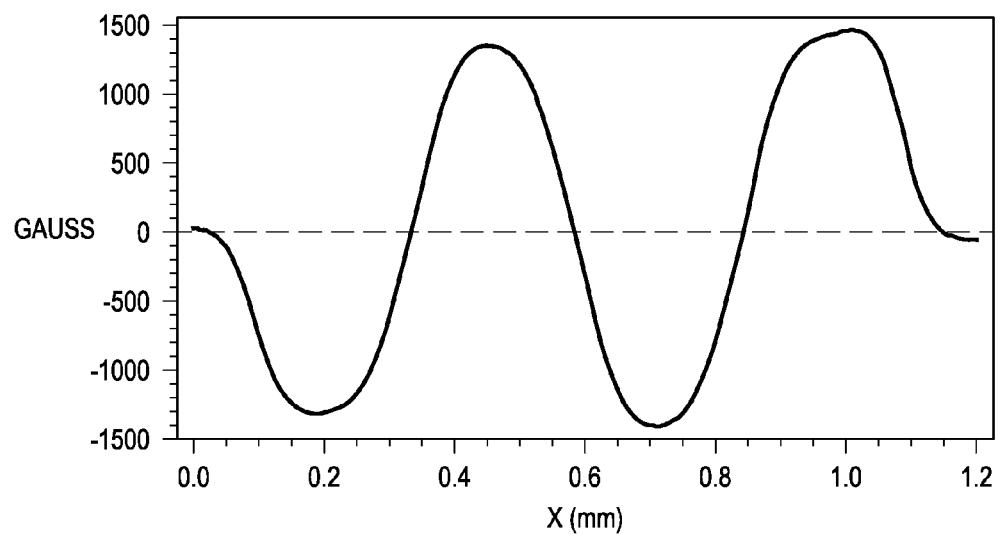
FIG. 9A depicts an example peak field strength of a magnetic field scan across the length of a magnetizable material having been magnetically printing with the 3×3 maxel pattern shown in FIG. 1J where the maxels have been amplitude modulated by scaling the weighting factors used in the second iterative attempt upward so as to meet example Gauss targets.
Figure 9B:
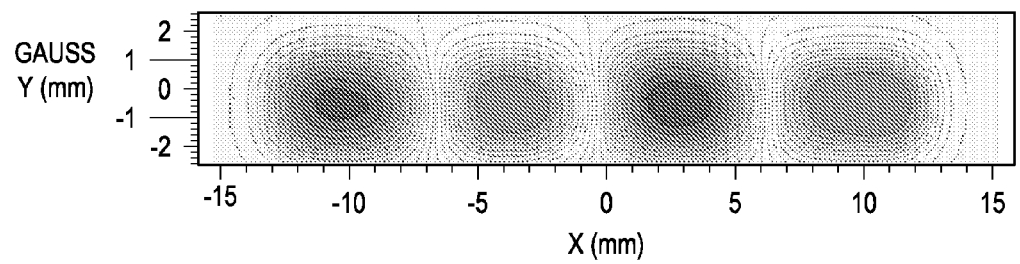
FIG. 9B depicts an example contour plot of the magnetic field scan of FIG. 9A.
Figure 9C:
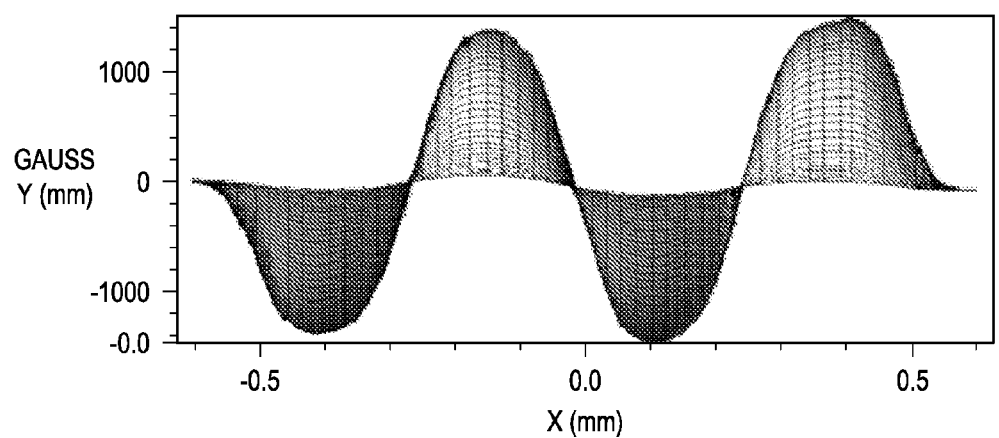
FIG. 9C depicts an example surface plot of the magnetic field scan of FIG. 9A.

FIG. 9A depicts an example peak field strength of a magnetic field scan across a length of a magnetizable material having been magnetically printed with the 3×3 maxel pattern shown in FIG. 1J. In this example, maxels are amplitude modulated by scaling weighting factors used in the second iteration (of FIGS. 8A-8C) upward so as to meet selected Gauss targets. FIG. 9B depicts an example contour plot of the magnetic field scan of FIG. 9A. FIG. 9C depicts an example surface plot of the magnetic field scan of FIG. 9A. A comparison of FIGS. 9A-9C to FIGS. 8A-8C reveals that additional smoothing is accomplished as a result of upward scaling from the second iteration of amplitude modulation.

FIG. 10 depicts example maxel printing voltage weighting factors used for four different 3×3 maxel printing designs that correspond to the 3×3 maxel pattern shown in FIG. 1J. FIG. 10 depicts the 3×3 maxel pattern of FIG. 1J in a first and far-left column set (with no heading) that is composed of 36 circles representing 36 maxels (e.g., four sets of 3×3 maxels). Example weighting factors for the 3×3 maxel printing design associated with FIGS. 5A-5C are presented in a second set of columns with an "Initial" heading. Example weighting factors for the 3×3 maxel printing design associated with FIGS. 7A-7C are presented in a third and middle set of columns with an "Iteration 1" heading. Example weighting factors for the 3×3 maxel printing design associated with FIGS. 8A-8C are presented in a fourth set of columns with an "Iteration 2" heading. Example weighting factors for the 3×3 maxel printing design associated with FIGS. 9A-9C are presented in a fifth and far-right column set with a "Final with scale factor" heading. Although not explicitly shown in FIG. 10, different initial values, additional iterations, additional scaling, different intermittent and/or "final" values, etc. may be employed in other implementations.

Figure 11A:
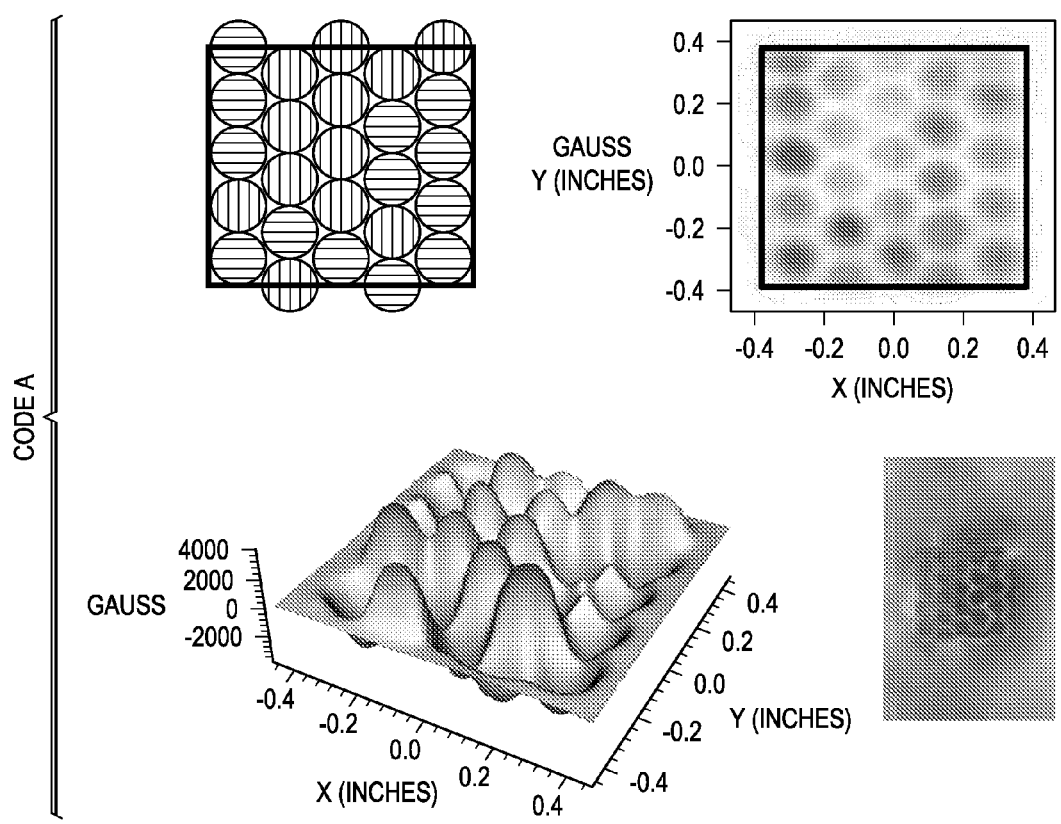
FIGS. 11A and 11B depict example magnetic field scans of two example complementary coded magnets where a shortest path effect is evident.
Figure 11B:
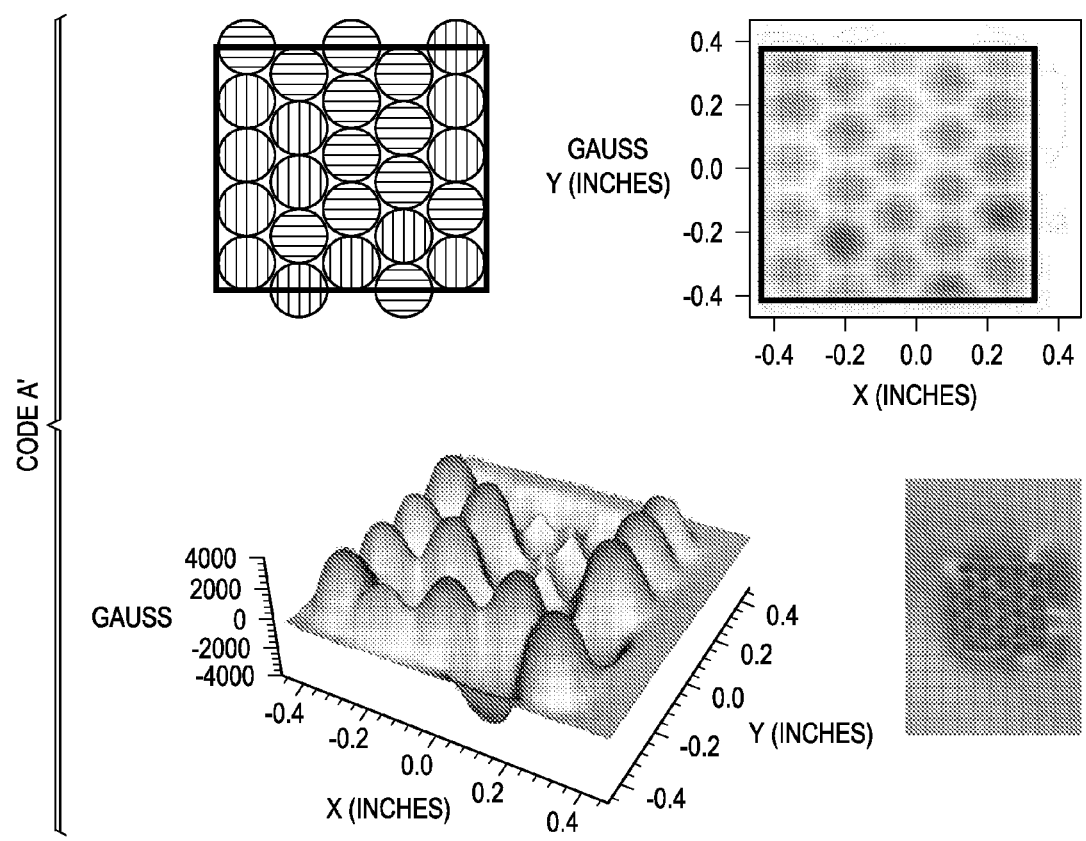

FIGS. 11A and 11B depict magnetic field scans of two example complementary coded magnets in which a "shortest path effect" is evident. With a shortest path effect, near field strengths may be increased between opposite polarity maxels. FIG. 11A corresponds to an example Code A, and FIG. 11B corresponds to an example complementary-coded Code A'. Each illustrates, from top left going clockwise, a schematic diagram of a number of magnetic sources (e.g., maxels), a magnetic field scan of the magnetic sources, a magnetic field thereof as detected via magnetic viewing film, and a surface plot of the magnetic field scan. Illustrated sizes, values, measurements, etc. are provided by way of example but not limitation. As may be seen in FIGS. 11A and 11B, maxel(s) of one polarity having relatively more surrounding maxels of an opposite polarity have a stronger field strength at a surface of a magnetizable material relative to those maxel(s) that are not surrounded by opposite-polarity maxels (or that are surrounded by fewer opposite-polarity maxels). This is further evident from a review of the illustrated example 3D surface plots of the two complementary coded magnets. The shortest path effect may be taken into account when designing magnetic structures as described, by way of example but not limitation, in U.S. patent application Ser. No. 12/895,589 (filed 30 Sep. 2010), including with particular reference to FIGS. 33-36 thereof. U.S. patent application Ser. No. 12/895, 589 is hereby incorporated by reference herein in its entirety.

Figure 12A:
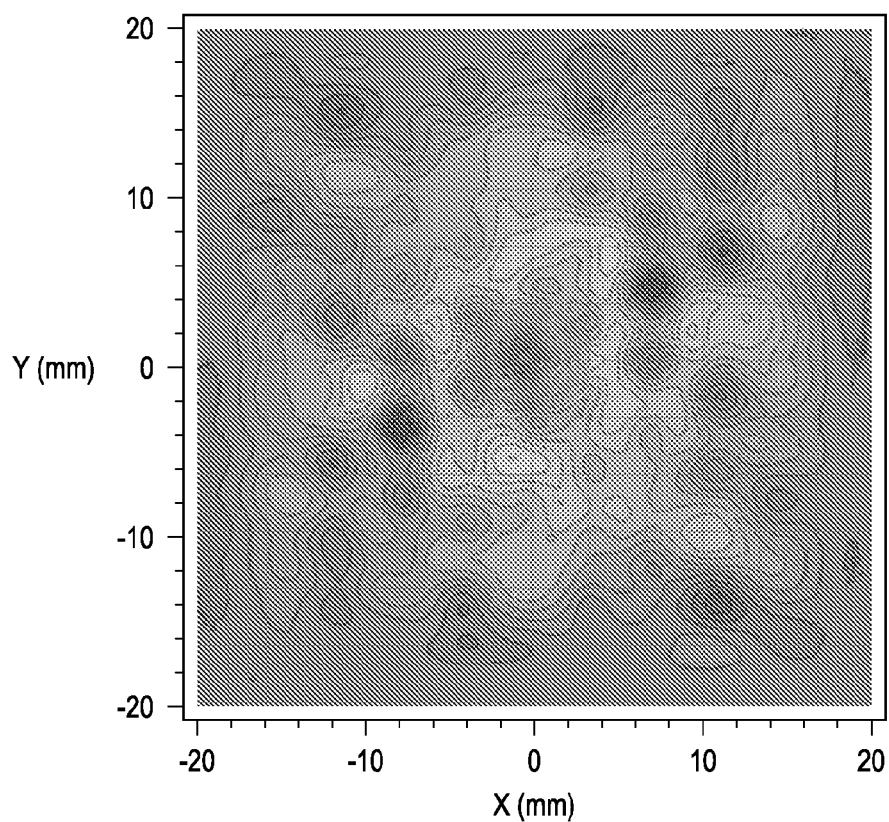
FIG. 12A depicts an example contour plot of a force scan between two example complementary-coded correlated magnetic structures.
Figure 12B:
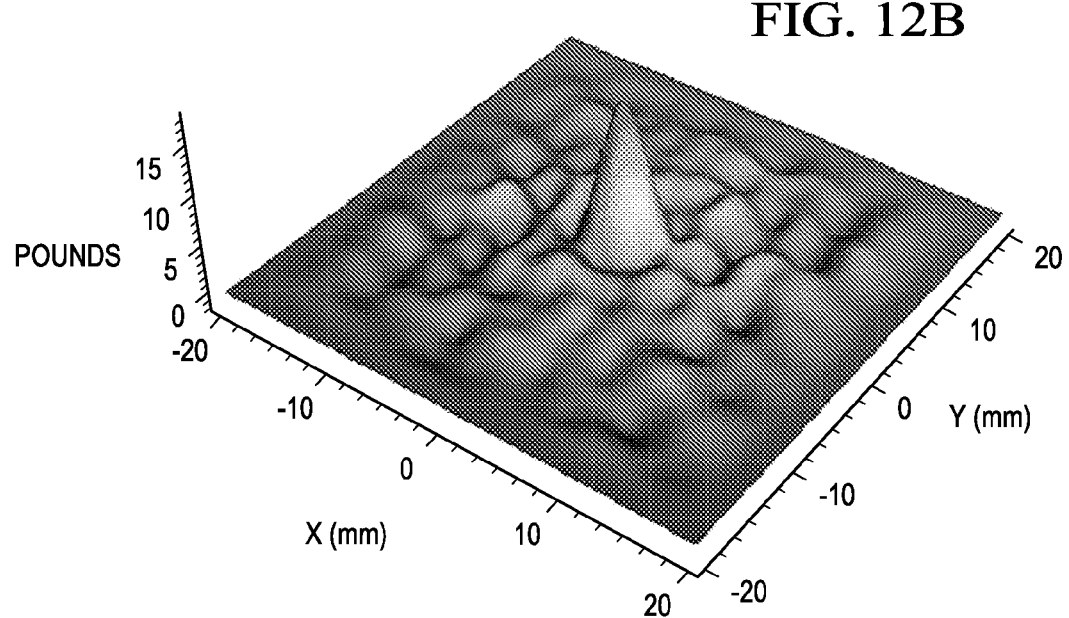
FIG. 12B depicts an example surface plot of a force scan between two example complementary-coded correlated magnetic structures.

FIGS. 12A and 12B relate to two example complementary-coded correlated magnetic structures. FIG. 12A depicts an example contour plot of a force scan between two complementary-coded correlated magnetic structures. FIG. 12B depicts an example surface plot of a force scan between two complementary-coded correlated magnetic structures.

In certain example implementations, complementary magnetically printed patterns may be used as a form of verification or authentication. Additionally or alternatively, complementary magnetically printed patterns may be used for keying locks or for identifying that two objects belong together. Structures having complementary magnetically printed patterns may generally represent togetherness or "a match"—"his and hers" complementary magnetic structures may be created, for example.

For certain example embodiments, information may be conveyed by magnetically printing maxels into magnetic structures with the maxels representing the information. Spatial force functions of the maxels may be measured to recapture the information, and the measurements may be presented to present the information. Thus, magnetic field measurements may be used to determine information conveyed by magnetically printing maxels into magnetic structures. In certain example implementations, images or other information may be created or encoded by varying maxel properties. Examples of maxel properties that may be varied may include, but are not limited to: (1) polarity, which provides two states that enable digital encoding or analog two-color images; (2) field direction; (3) field strength (e.g., 100 volt maxel=binary 00, 150 volt maxel=01, 200 volt maxel=10, 250 volt maxel=11); (4) density, where spacing may convey digital or analog information; (5) phase (e.g., an offset from a regular grid position); (6) relative placement or location (e.g., of individual or sets of maxels); (7) any combination thereof; and so forth.

In certain example implementations, images or other information may be reconstructed using a magneto-optical effect. A surface of a diamagnetic, paramagnetic, ferromagnetic, etc. liquid may be used as a reflector of a high-intensity light source if, for example, a magnetic structure is immersed below the surface of the liquid. The light source may be projected onto a screen for viewing. This may, however, produce a distorted image of a magnetic field of a magnetic structure. Because some reconstruction methods naturally differentiate an image (e.g., a 2D high-pass filter) or distort it in other ways, one may compensate for a given distortion method. By way of example but not limitation, an image may be intentionally preprocessed (e.g., using a compensating filter) to affect (e.g., control, alleviate, ameliorate, any combination thereof, etc.) any undesired 'filtering' effect of a reconstruction. Other signal processing, such as deconvolution or channel coding (e.g., compression, forward error correction (FEC), combinations thereof, etc.) may be applied to maxel data. Some types of signal processing, such as convolution and/or deconvolution, may be used to implement encryption. Furthermore, amplitude modulation may be used and/or a bias frequency arithmetically added in manner(s) analogous to that of analog magnetic tape recorders to take advantage of reconstruction methods that are non-linear.

Figures 13, 14A:
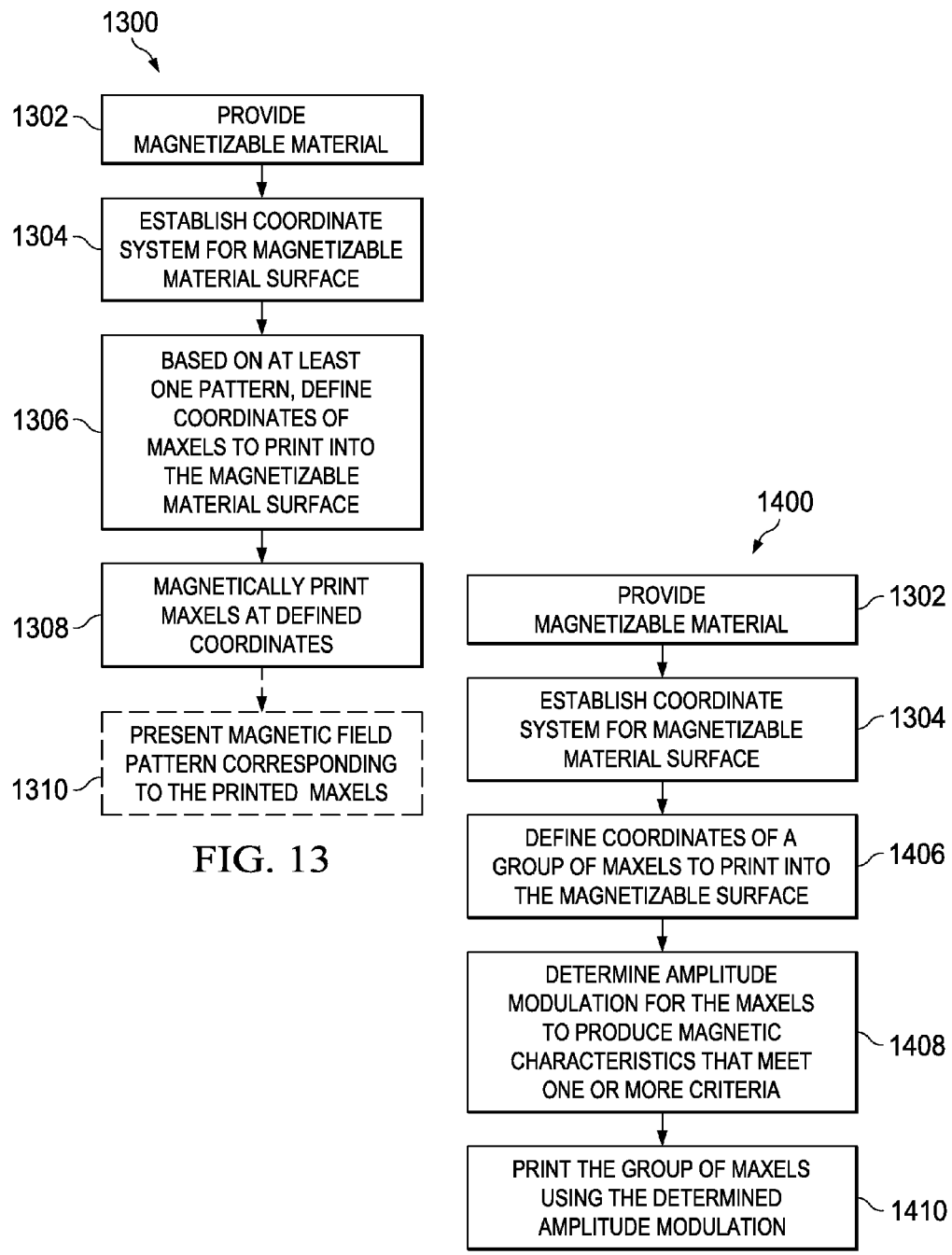
FIG. 13 depicts a flow diagram of an example method for printing maxels in accordance with at least one pattern.
FIG. 14A depicts a flow diagram of an example method for printing a group of maxels using amplitude modulation to produce magnetic characteristics that meet one or more criteria.

FIG. 13 depicts a flow diagram 1300 of an example method for printing maxels in accordance with at least one pattern. As shown, the flow diagram 1300 may include, for example, four to five operations. Although operations are shown in a particular order in the flow diagram 1300, embodiments may be performed in different orders and/or with one or more operations fully or partially overlapping with other operation(s). Moreover, a different number of operations (e.g., more or fewer) may alternatively be implemented.

For certain example embodiments of flow diagram 1300, at operation 1302, a magnetizable material may be provided. At operation 1304, a coordinate system for a surface of the magnetizable material may be established. At operation 1306, based at least partially on at least one pattern, coordinates of maxels to print into the surface of the magnetizable material may be defined. At operation 1308, maxels may be magnetically printed at defined coordinates based, at least in part, coordinate system established for the surface of the magnetizable material. At operation 1310, a magnetic field pattern corresponding to the printed maxels may be presented.

FIG. 14A depicts a flow diagram 1400 of an example method for printing a group of maxels using amplitude modulation to produce one or more magnetic characteristics that meet one or more criteria. As shown, the flow diagram 1400 may include, for example, five operations. Although operations are shown in a particular order in the flow diagram 1400, embodiments may be performed in different orders and/or with one or more operations fully or partially overlapping with other operation(s). Moreover, a different number of operations (e.g., more or fewer) may alternatively be implemented.

For certain example embodiments of flow diagram 1400, operations 1302 and 1304 may be at least similar to the operations 1302 and 1304 of flow diagram 1300 of FIG. 13. At operation 1406, coordinates of a group of maxels to print into a surface of a magnetizable material may be defined. At operation 1408, at least one amplitude modulation for the maxels to be printed that is to produce one or more magnetic characteristics that meet one or more criteria may be determined. At operation 1410, the group of maxels may be printed using the determined at least one amplitude modulation based, at least in part, on the defined coordinates for the group of maxels and/or the coordinates established for the magnetizable material.

Figure 14B:
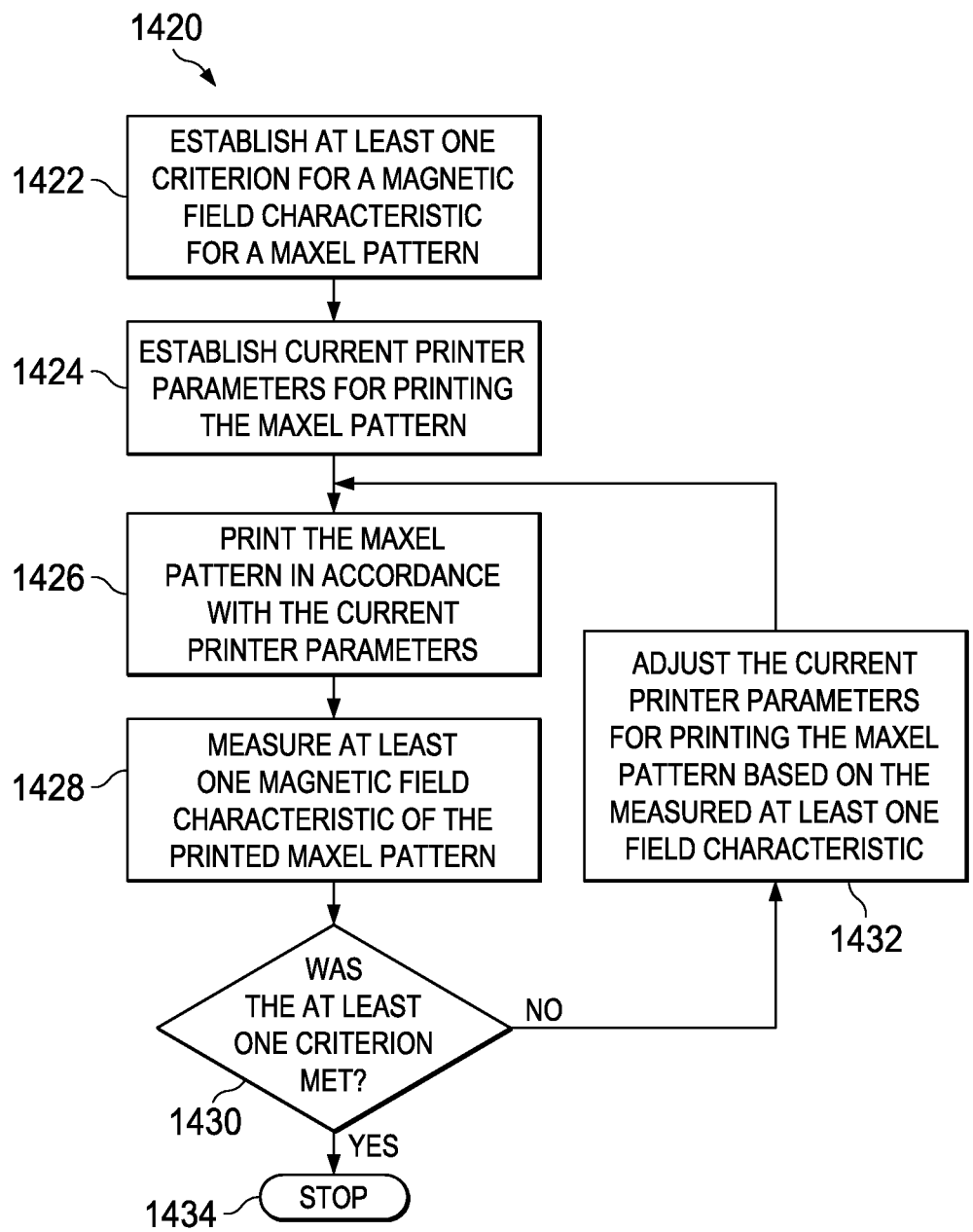
FIG. 14B depicts a flow diagram of another example method for printing a group of maxels using amplitude modulation to produce magnetic characteristics that meet one or more criteria.

FIG. 14B depicts a flow diagram 1420 of another example method for printing a group of maxels using amplitude modulation to produce one or more magnetic characteristics that meet one or more criteria. As shown, the flow diagram 1420 may include, for example, six to seven operations. Although operations are shown in a particular order in the flow diagram 1420, embodiments may be performed in different orders and/or with one or more operations fully or partially overlapping with other operation(s). Moreover, a different number of operations (e.g., more or fewer) may alternatively be implemented. Furthermore, methods that are described herein (including but not limited to those of FIG. 14B) may be realized, at least in part, with one or more processors, at least one memory, computer(s), combinations thereof, etc. using one or more processor-executable instructions (e.g., stored software, code, logic modules, programmed processor(s), combinations thereof, etc.) that are configured at least partially in accordance with one or more described flow diagrams, for instance. Such processor-executable instructions may be executed and/or may be maintained on one or more tangible media, such as memory, firmware, combinations thereof, and so forth.

For certain example embodiments of flow diagram 1420, at operation 1422, at least one criterion for at least one magnetic field characteristic for a maxel pattern may be established. A magnetic field characteristic may, by way of example but not limitation, correspond to a field measurement by a field sensor, a force measurement by a force sensor, any combination thereof, and so forth. At operation 1424, one or more current printer parameters for printing the maxel pattern may be established. By way of example only, a printer parameter may correspond to voltage setting(s) that determine an amount of voltage used to charge capacitor(s) of a magnetic printer used to print each maxel that is to form a maxel pattern. At operation 1426, a maxel pattern in accordance with the one or more current printer parameters may be printed. For example, a maxel pattern in accordance with the one or more current printer parameters may be printed based, at least in part, on the maxel pattern. At operation 1428, at least one magnetic field characteristic of the printed maxel pattern may be measured.

At operation 1430, it may be determined if the at least one established criterion has been met. Such a determination may be based at least partly on, for example, at least one comparison between the at least one measured magnetic field characteristic and the at least one established criterion for a magnetic field characteristic. At least one established criterion may be met, by way of example but not limitation, if the at least one measured magnetic field characteristics is equal to (or exceeds, or falls under, etc.) the at least one established criterion for a magnetic field characteristic, if such a criterion is matched by a measured characteristic, if such a criterion is matched by a measured characteristic to a stipulated degree, if such a criterion is matched by a measured characteristic to a stipulated degree within a preset time period, if such a criterion is approached and then other iterations diverge from an approaching measured value, any combination thereof, and so forth. If the at least one established criterion has been met, then the current printer parameters may be considered appropriate for printing the maxel pattern. At operation 1434, the method may be stopped. Additionally and/or alternatively, the current printer parameter(s) may be used to print the maxel pattern on a magnetizable material one or more times. If, on the other hand, the at least one established criterion has not been met (as determined at operation 1430), then at operation 1432 current printer parameters for printing the maxel pattern may be adjusted based, at least in part, on the at least one measured magnetic field characteristic. After one or more current printer parameter adjustments, the method of flow diagram 1420 may continue with operation 1426. Thus, operations 1426-1432 may be repeated until current printer parameters result in a printed maxel pattern having at least one measured magnetic field characteristic that meets the at least one established criterion for a magnetic field characteristic for a maxel pattern. For an adjustment stage (e.g., of operation 1432), one skilled in the art will understand that varying printer parameters may involve any one or more of many different types of search algorithms. By way of example only, parameters corresponding to a given maxel or maxel pattern may be varied systematically to find one or more printer parameter settings that most closely match or that match to a stipulated degree or precision at least one established criterion. Print settings for multiple maxels of a maxel pattern may be varied one maxel at a time or by multiple maxels each time. It should be understood that because maxels can affect each other, a given search algorithm may iterate repeatedly without converging on printer parameter(s) that completely match a given criterion, but at least one established criterion may nevertheless be considered to have been met as described above. Additionally or alternatively, measured data may be deconvolved to produce clearer output that may be used as part of a search process.

An example implementation of a method comporting with flow diagram 1420 is described below by way of clarification but not limitation. It may be desired to print a maxel pattern comprising N maxels having N different maxel coordinates within a coordinate system mapped to a surface of a magnetizable material. An example established criterion may require that each of the N maxels have a corresponding one of N magnetic field strengths measured substantially close to the surface of the magnetizable material above each of the N different maxel coordinates, where the N magnetic field strengths are selected to produce a desired magnetic image. The N maxels may or may not overlap, and the maxel coordinates may be uniform or may be non-uniform. Thus, some maxels may overlap when printed, depending on a design of a maxel pattern. After printing, certain overlapping maxels may have different field strengths that involve varying printer parameters to achieve. By systematically varying printer parameters, an appropriate set of printer parameters may be determined that result in a maxel pattern printed into a magnetizable material meeting the established criterion.

Figure 15A:
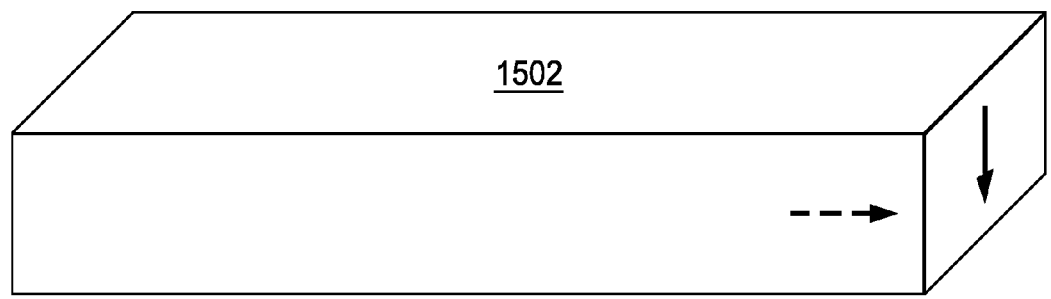
FIG. 15A depicts an example non-magnetized block of magnetizable material.

FIG. 15A depicts an example non-magnetized block of magnetizable material 1502. Magnetizable material 1502 may be manufactured so as to be conventionally magnetized through an example thickness of the block as indicated by the (solid) downward arrow. Alternatively, a block of magnetizable material may be manufactured so as to be conventionally magnetized differently, such as through an example length of the block as indicated by the (dashed) rightward arrow. Circular, ring-shaped, etc. magnetizable material may be manufactured to be axially, diametrically, radially, etc. magnetized. One skilled in the art will recognize that for a given shape of magnetizable material, the material may be manufactured to be magnetized from a particular direction (e.g., axially, diametrically, etc.) or from multiple directions (e.g., radially, etc.).

Figure 15B:
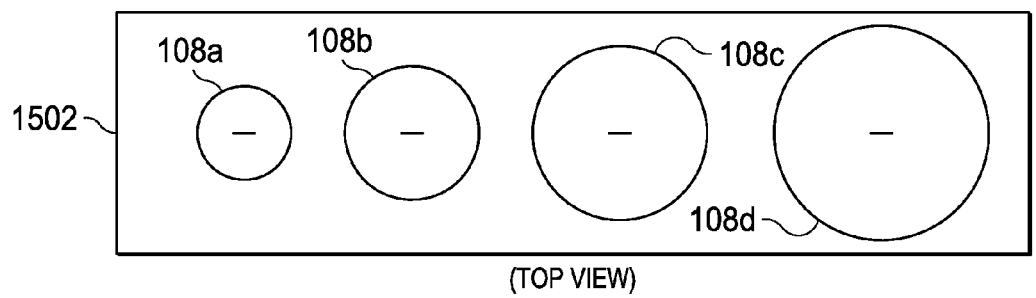
FIGS. 15B and 15C depict top and side views of four example maxels having four different sizes printed into the non-magnetized block of magnetizable material of FIG. 15A.
Figure 15C:
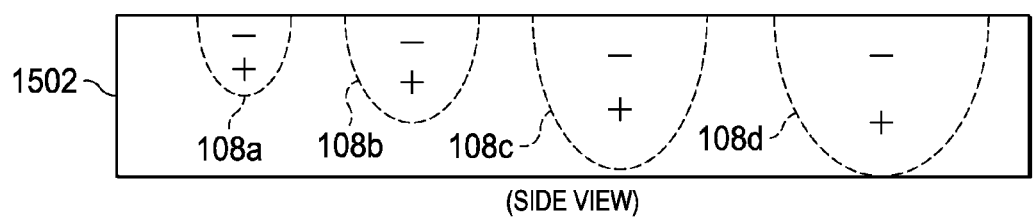

FIGS. 15B and 15C depict example top and side views, respectively, of four example maxels 108a, 108b, 108c, and 108d having four different sizes printed into the non-magnetized block of magnetizable material 1502 of FIG. 15A. By way of example but not limitation, a printed maxel in certain implementations may be considered a dipole magnet having a positive pole and a negative pole. For example, a printed maxel may be associated with a first polarity and a second polarity (e.g., as shown in FIG. 15C). The first polarity may be exposed at a surface of a magnetizable material 1502 (e.g., for an example negative polarity as shown in FIG. 15B), but the second polarity may not be exposed at the surface of the magnetizable material 1502 (e.g., for an example positive polarity as shown in FIG. 15B (by way of it absence from the top view) and FIG. 15C).

As illustrated, maxels 108a-108d may have a substantially round or circular shape from a surface perspective of a top view of FIG. 15B. From an interior perspective of a side view of FIG. 15C, maxels 108a-108d as illustrated may have a substantially parabolic or Gaussian shape. However, it should be understood that illustrated shapes of maxels are by way of example, clarification, and/or explanation, and not by way of limitation. More specifically, illustrated shapes of maxels (e.g., the maxels 108a-108d in various FIGURES) are intended to only be a symbolic shape to generally indicate that because a maxel is printed at a given surface from a side of a material (e.g., into a surface thereof) that a field strength of the maxel is typically strongest at the surface on the side from which it is printed. An actual shape of a maxel may vary substantially depending on, for example, characteristics of a magnetic printer, magnetization methods used to print the maxel, characteristics of the magnetizable material, combinations thereof, and other factors. For example, a maxel shape may be elongated by increasing a number of turns in a magnetic print head and/or be otherwise shaped by using "sacrificial" material and/or other maxel shaping methods, as is described further herein below. It should be noted that maxels may be magnetically printed in a same direction that a magnetizable material is manufactured to be conventionally magnetized, or maxels may be printed in one or more different directions. Additionally and/or alternatively, actual polarities of maxels may differ from those that are illustrated for example implementation and/or descriptive purposes.

Figure 15D:
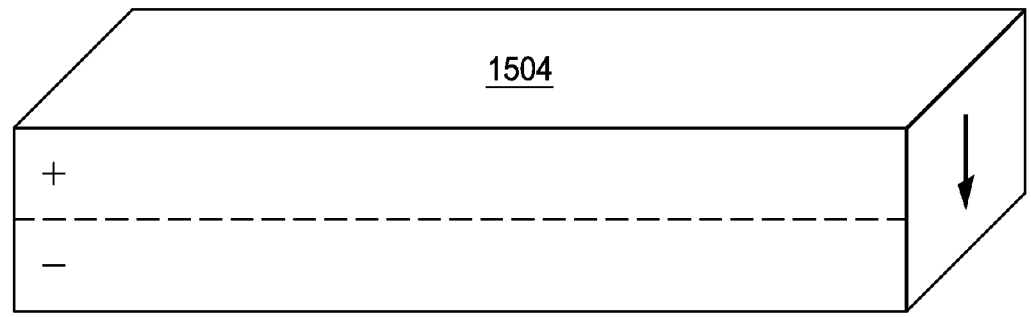
FIG. 15D depicts an example conventionally magnetized block of magnetizable material.

FIG. 15D depicts an example conventionally-magnetized block of magnetizable material 1504 having been magnetized through a thickness as intended during its manufacturing. As illustrated, a top half of the magnetizable material (which is shown as a conventional dipole magnet) has a positive polarity and a bottom half has a negative polarity as indicated by positive (+) and negative (−) signs, respectively.

Figure 15E:
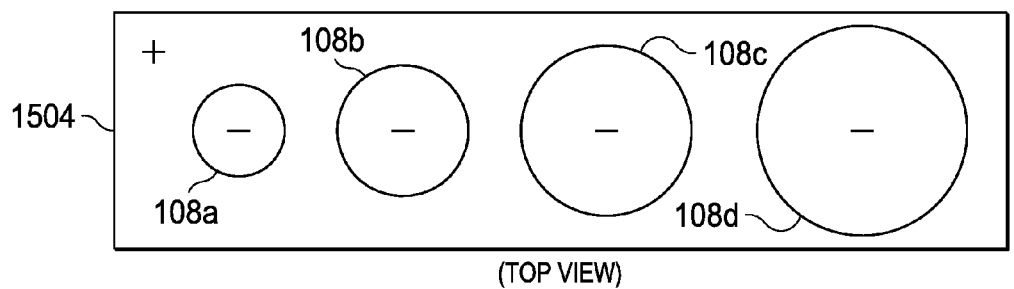
FIGS. 15E and 15F depict top and side views of four example maxels having four different sizes printed into the magnetized block of magnetizable material of FIG. 15D.
Figure 15F:
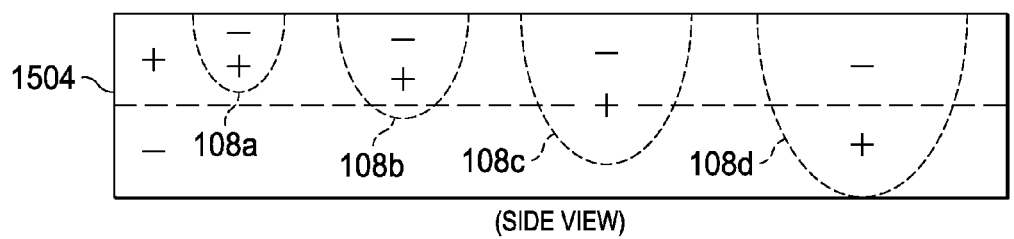

FIGS. 15E and 15F depict example top and side views, respectively, of four example maxels 108a-108d having four different sizes as printed into a magnetized block of the magnetizable material 1504 of FIG. 15D. As explained herein above, shapes of depicted printed maxels 108a-108d are merely symbolic throughout the FIGURES, unless context dictates otherwise. Because magnetic printing of maxels re-magnetizes (or overwrites) portions of a magnetizable material corresponding to each maxel, a shape or a resulting printed maxel may vary significantly depending on any one or more of a number of factors. Factors may include, by way of example but not limitation, a depth that a given maxel extends into a previously conventionally-magnetized magnetizable material, a direction of printing of a maxel, a polarity of a maxel relative to a direction that a magnetizable material was manufactured to be conventionally magnetized, combinations thereof, and so forth. For certain example implementations, a printed maxel may be associated with a first field strength at a surface at which it is printed of the magnetizable material 1504 (e.g., as shown in the top view of FIG. 15E for the example illustrated polarities) and may be associated with a second field strength at the opposite surface of the magnetizable material (e.g., as indicated at the bottom portion of the side view of FIG. 15F). A magnetic field strength of a printed maxel is typically greater at the surface at which it is printed. Accordingly, in such example situations, the first field strength may be greater than the second field strength. Moreover, the first field strength may be substantially greater (e.g., at least one order of magnitude or 10× greater) than the second field strength. Although first and second field strengths are here described with reference to a conventionally-magnetized magnetizable material 1504, they may also be applicable with regard to non-magnetized magnetizable material 1502.

FIG. 15G depicts an example maxel 108 printed into a conventionally-magnetized first magnetizable material 1504 having beneath it a non-magnetized second magnetizable material 1502. As shown for an illustrated example implementation, a maxel 108 may extend into the second magnetizable material 1502 and be printed in the same direction that the magnetizable material(s) are manufactured to be conventionally magnetized as indicated by the downward arrows. The non-magnetized second magnetizable material 1502 may be considered a "sacrificial" material in that it receives some of the magnetization of the maxel, which may affect a shape of (at least a portion of) the maxel remaining in the first magnetizable material 1504, even after it is removed from the (otherwise) non-magnetized second magnetizable material 1502. In certain example implementations, use of a sacrificial material while printing a maxel may result in a rounded or pointed portion (e.g., part of the vertex portion of an example parabolic shape) of the printed maxel being accepted by the sacrificial material and thus being omitted or missing from the magnetizable material into which the maxel is printed. Consequently, the effective cross-sectional shape of the printed maxel may become, on average, wider to thereby more closely resemble a vertical cross-section of a cylinder.

For certain example embodiments, a sacrificial material may be placed or otherwise located in proximity with a magnetizable material that is to receive one or more maxels. A sacrificial material may be considered proximate or in proximity to, by way of example but not limitation, if it is in contact with the magnetizable material, if it is sufficiently close to absorb at least a portion of magnetization from a maxel being printed, if it is sufficiently close to affect at least a portion of a magnetization of a maxel being printed, some combination thereof, and so forth.

Generally, a sacrificial material may be manufactured to be magnetized in any direction relative to magnetizable material into which a maxel is being printed whereby a shape of the resulting printed maxel may depend at least in part on a printing direction versus one or more directions that the two magnetizable materials 1502 and 1504 are manufactured to be magnetized. A sacrificial material may be capable of being sacrificed after one or more maxels have been printed. By way of example only, a sacrificial material may be removed from proximity with a magnetizable material into which maxels have been printed and then discarded, used for other purposes, reused, re-magnetized, any combination thereof, and so forth.

FIG. 15H depicts an example maxel 108 printed into a conventionally-magnetized first magnetizable material 1504a having beneath it a conventionally-magnetized second magnetizable material 1504b having a same polarity orientation as the first magnetizable material 1504a. As shown for an illustrated example implementation, a maxel 108 may extend into the second magnetizable material 1504b and be printed in a same direction that the magnetizable materials are manufactured to be conventionally magnetized as indicated by the downward arrows. The magnetized second magnetizable material 1504b may also be considered a sacrificial material in that it receives some of the magnetization of the maxel, which may affect a shape of (at least a portion of) the maxel remaining in the first magnetizable material 1504a, including after it is removed from the magnetized second magnetizable material 1504b. As described in relation to FIG. 15G, a shape of a resulting maxel for an implementation like that of FIG. 15H may depend at least in part on a printing direction versus the directions that the two magnetized magnetizable materials 1504a and 1504b are conventionally magnetized.

FIG. 15I depicts an example maxel 108 printed into a conventionally-magnetized first magnetizable material 1504a having beneath it a conventionally-magnetized second magnetizable material 1504b having an opposite polarity orientation as compared to that of the first magnetizable material 1504a. Again, the conventionally-magnetized second magnetizable material 1504b may act as a sacrificial material that impacts a shape of a resulting printed maxel remaining in the conventionally-magnetized first magnetizable material 1504a, wherein a shape of the resulting printed maxel may depend at least in part on a printing direction versus the directions that the two magnetized magnetizable materials 1504a and 1504b are conventionally magnetized.

FIG. 15J depicts an example maxel 108 printed into a non-magnetized first magnetizable material 1502a having beneath it a non-magnetized second magnetizable material 1502b. Generally, the non-magnetized second magnetizable material 1502b may act as a sacrificial material similar to those described above with particular reference to FIGS. 15G through 15I. In this illustrated example implementation, however, there is no effect due to prior magnetization of either the first or the second magnetizable material 1502a or 1502b. Nevertheless, a shape of the resulting printed maxel may depend at least in part on a printing direction versus the directions that the two non-magnetized magnetizable materials 1502a and 1502b are manufactured to be conventionally magnetized.

FIG. 15K depicts example coded maxels 106 and 108 corresponding to a first magnetic structure printed into a first non-magnetized magnetizable material 1502a having beneath it a second magnetizable material 1502b having previously been printed with example maxels 106 and 108, which correspond in this illustrated example to a second magnetic structure having complementary coding to the first magnetic structure. An example maxel pattern in a bottom of the first material 1502a may thus correlate with an example maxel pattern in a top of the second material 1502b to produce a peak attractive force if the two magnetic structures are aligned. As shown for an illustrated example implementation, the two magnetizable materials 1502a and 1502b both have maxels printed in the same direction in which the materials are manufactured to be conventionally magnetized. But, as described herein above, one or both of the magnetizable materials may be manufactured to be conventionally magnetized in a direction or direction that is or are different from the direction in which the maxels are printed. Additionally or alternatively, one or both blocks may be formed from material that is conventionally-magnetized.

FIG. 15L depicts example coded maxels 106 and 108 corresponding to a first magnetic structure printed into a non-magnetized magnetizable material 1502a having beneath it a second magnetizable material 1502b having previously been printed with example maxels 106 and 108 corresponding to a second magnetic structure having anti-complementary coding to the first magnetic structure. An example maxel pattern in a bottom of the first material 1502a may therefore anti-correlate with an example maxel pattern in a top of the second material 1502b to produce a peak repel force if the two magnetic structures are aligned. As shown for an illustrated example implementation, and like that of FIG. 15K, the two magnetizable materials 1502a and 1502b of FIG. 15L both have maxels printed in a same direction in which the materials are manufactured to be conventionally magnetized. However, in alternative implementations, maxels may be printed in other direction(s). Generally, maxel patterns in the sacrificial materials 1502b of FIGS. 15K and 15L may affect shapes of the maxels that are printed in the first magnetizable materials 1502a.

Figure 15M:
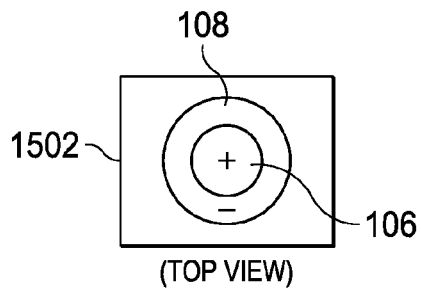
FIGS. 15M and 15N depict top and side views of a magnetizable material and an example first maxel having a first polarity being printed inside a previously printed example second maxel having a second polarity that is opposite the first polarity.
Figure 15N:
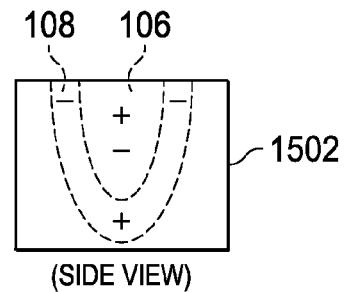

FIGS. 15M and 15N depict example top and side views, respectively, of a non-magnetized magnetizable material 1502 and an example first maxel 106 having a first polarity being printed inside an example previously-printed second maxel 108 having a second polarity that is opposite the first polarity. Such maxel printing may be considered, by way of example only, a nested printing of maxels. As shown for an illustrated example implementation, a positive polarity maxel 106 may be printed inside a negative polarity maxel 108. However, in alternative implementations, a negative polarity maxel 108 may be printed inside a positive polarity maxel 106. Additionally or alternatively, nested maxels may be printed into material that is conventionally-magnetized.

Figure 15O:
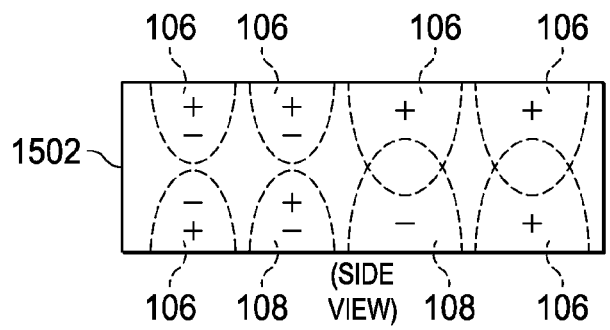
FIG. 15O depicts example maxels being printed from two sides of a magnetizable material.

FIG. 15O depicts example maxels 106 and 108 that are printed from two example sides of a magnetizable material 1502. As shown for an illustrated example implementation, one or more maxels may be printed from two or more sides or surfaces (e.g., opposite or opposing sides or surfaces) of a magnetizable material, e.g. such that the maxels are complementary to each other or anti-complementary to each other. Moreover, complementary maxels and/or anti-complementary maxels may be printed such that they overlap (e.g., at least partially overwrite each other) or such that they do not overlap. Complementary maxels and/or anti-complementary maxels may additionally or alternatively be printed simultaneously.

Figure 16A:
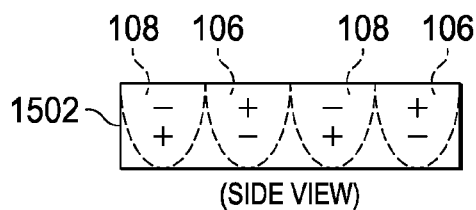
FIG. 16A depicts example maxels in an alternating polarity pattern where the maxels do not overlap each other.

FIG. 16A depicts in a side view example maxels 106 and 108 in an alternating polarity pattern printed into a non-magnetized magnetizable material 1502 such that the maxels 106 and 108 do not overlap each other. As noted herein above, illustrated shapes of maxels is symbolic; moreover, it should be understood that utilizing a concept of overlapping maxels may involve defining one or more maxels in terms of portion(s) of an underlying magnetizable material having some magnetic field strength that matches (e.g., that is greater than, greater than or equal to, etc.) at least one desired appreciable value.

Figure 16B:
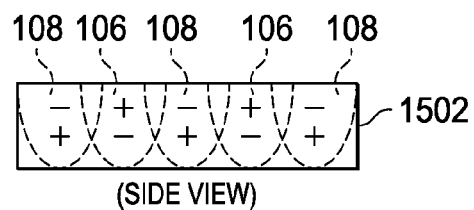
FIG. 16B depicts example maxels in an alternating polarity pattern where the maxels partially overlap.

FIG. 16B depicts in a side view maxels 106 and 108 in an alternating polarity pattern printed into a non-magnetized magnetizable material 1502 such that the maxels 106 and 108 partially overlap. By way of example only, overlapping maxels may be produced by at least partially overwriting at least one maxel with at least one other maxel. Maxels may be printed one at a time in some desired order, may be printed in groups in some desired order, may be printed in total together, may otherwise be printed fully or partially at least substantially simultaneously, any combination thereof, and so forth. As illustrated in FIG. 16B to diagrammatically clarify an example of overlapping maxels, dashed lines representing example maxels are shown as crossing each other, which does not necessarily indicate any particular temporal ordering of the maxel printing. Additionally or alternatively, overlapping maxels may be printed into material that is conventionally-magnetized (e.g., a conventionally-magnetized magnetizable material 1504).

Figure 16C:
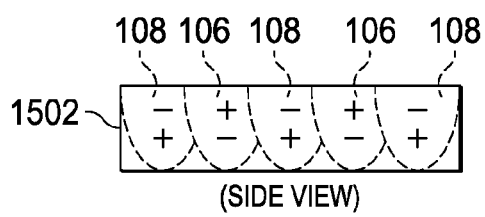
FIG. 16C depicts the maxels of FIG. 16B after printing and the overwriting of example overlapped maxels printed sequentially from left to right.

FIG. 16C depicts the maxels 106 and 180 of FIG. 16B after an example printing sequentially from left to right and a resulting overwriting of overlapped maxels. As alternatively illustrated in FIG. 16C to diagrammatically clarify an example of overlapping maxels, dashed lines representing example maxels are shown without crossing each other, which may further indicate an example temporal ordering of the printing of the maxels. By comparing FIG. 16C to FIG. 16A, it may be seen that substantially more of the underlying magnetizable material is (at least appreciably) magnetized if maxels are printed such that they overlap one another.

Figure 16D:
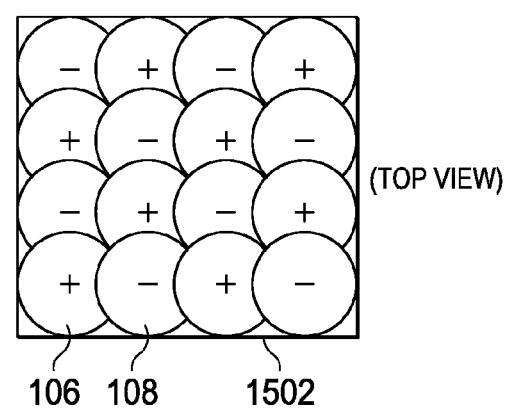
FIG. 16D depicts a top view of an example two-dimensional array of alternating polarity maxels printed from left to right in rows from top to bottom of the magnetizable material.

FIG. 16D depicts an example top view of an example two-dimensional array of alternating polarity maxels 106 and 108 that are printed in an example order from left to right along rows and from top to bottom of a magnetizable material 1502. An overlapping of maxels may define or at least partially establish, for example, a maxel density. By way of example but not limitation, a maxel density may be considered a number of maxels printed for a given print area, wherein a maxel spacing may comprise a difference between an approximate center (e.g., a center point, a centroid, etc.) of the printed maxels. As shown for an illustrated example implementation, maxel spacing may be substantially the same for both dimensions (e.g., left-to-right and top-to-bottom); alternatively, they may differ.

For certain example embodiments, a determined maxel size, spacing, and/or density, etc. may be ascertained for a given magnetizable material having a given thickness in order to meet one or more criteria. Examples of criteria may include, but are not limited to, a maximum tensile force strength, a maximum shear force strength, or some combination thereof, etc. between two complementary magnetic structures, between a magnetic structure and a metal surface, or between other structures. Maxel size and/or shape may be affected by various techniques as described herein. However, for a given print head having one or more certain print head characteristics (e.g., a number of turns, a hole size, etc.), a diameter and/or a depth of a maxel may be controlled by controlling an amount of voltage used to charge capacitor(s) of a magnetic printer prior to printing a given maxel (or, e.g., by an amount of time a voltage is applied to capacitor(s)). By increasing a charging voltage, a current passing through a print head may be increased, which may increase a strength of a magnetic field produced by a print head as it prints a maxel into a magnetizable material.

Figures 17A, 17B:
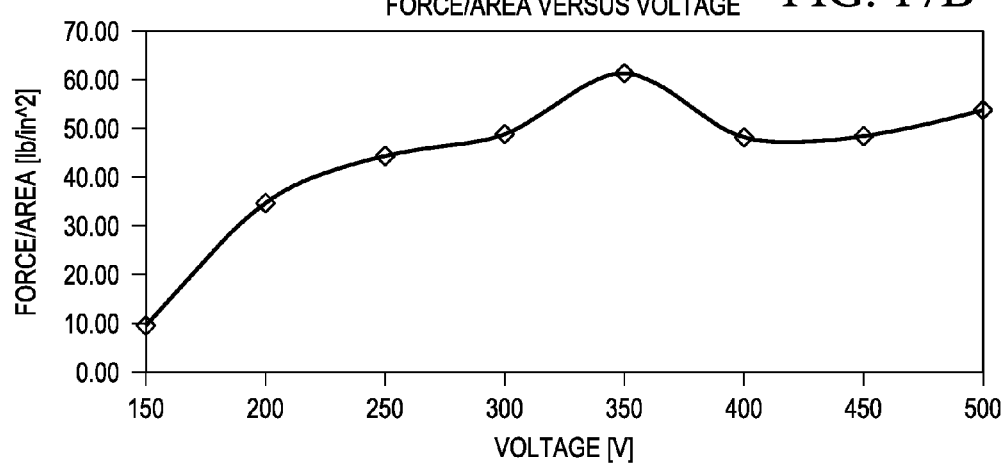
FIG. 17A depicts a table showing example results of a study used in an example determination of a desired voltage for use to charge capacitors of a magnetic printer used to print maxels in a magnetizable material.
FIG. 17B depicts a line graph of the results of the example study of FIG. 17A.

FIGS. 17A and 17B illustrate results of an example study of different charging voltages. FIG. 17A depicts a table showing example results of a study used to determine a desired voltage to employ to charge e.g. multiple capacitors of a magnetic printer used to print maxels into a magnetizable material. Different voltages, different maxel diameters, different maxel areas, etc. are shown with respect to resulting pull force, force per unit of area, etc. FIG. 17B depicts an example line graph of the results of the study of FIG. 17A. In the line graph, voltage versus force per unit of area is diagrammed. As shown for an example implementation in the table and the graph of FIGS. 17A and 17B, respectively, as a voltage used to charge capacitors of magnetic printer is increased from 150 volts to 500 volts, a maxel diameter increased from 2.93 mm to 6.36 mm. Also shown is that a force produced between two complementary maxels achieves a peak force per unit area ratio at 350 volts.

Figure 17D:
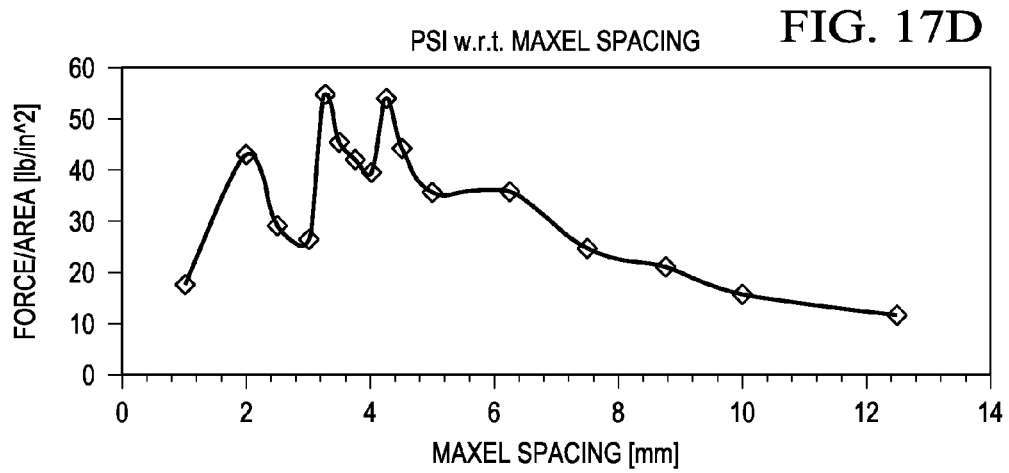
FIG. 17D depicts an example line graph of the results of the study of FIG. 17C.

FIGS. 17C and 17D illustrate results of an example study of different maxel densities. FIG. 17C depicts a table showing example results of a study used to determine a desired density of maxels printed into a magnetizable material. Columns for area, pattern size, maxel spacing, force, and force per unit of area are shown. FIG. 17D depicts an example line graph of the results of the study of FIG. 17C. In the line graph, maxel spacing versus force per unit of area is diagrammed. As shown for an example implementation, in the table and in the graph, a force per unit area increases with maxel density until a particular point, and after that particular point, maxel density becomes "too dense", and the force per unit area drops significantly. Because effects of a magnetization process, including but not limited to an ordering of the printing of maxels, are non-linear and complex, the results of this example study may likewise be considered interesting and complex. However, it is apparent from the study that at least in certain example implementations maxel density may affect a resulting force per unit area of a printed magnetic structure.

Figure 18:
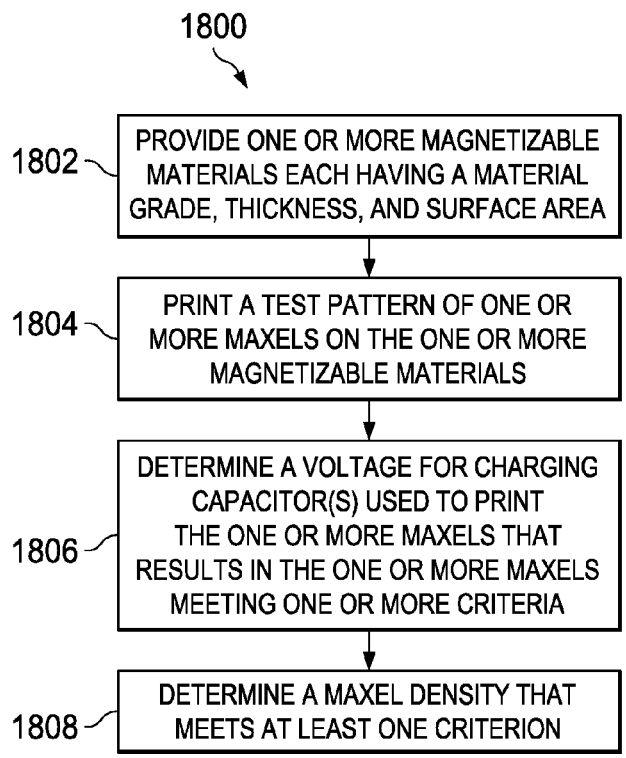
FIG. 18 depicts a flow diagram of an example method for determining a voltage for charging capacitors of a magnetic printer that results in printed maxels meeting one or more criteria and a desired maxel density that meets one or more criteria.

FIG. 18 depicts a flow diagram 1800 of an example method for determining a voltage for charging capacitors of a magnetic printer that results in printed maxels meeting one or more criteria and/or for determining a desired maxel density that meets one or more criteria. As shown, the flow diagram 1800 may include, for example, four operations. Although operations are shown in a particular order in the flow diagram 1800, embodiments may be performed in different orders and/or with one or more operations fully or partially overlapping with other operation(s). Moreover, a different number of operations (e.g., more or fewer) may alternatively be implemented.

For certain example embodiments of flow diagram 1800, at operation 1802, one or more magnetizable materials each having at least one material grade, at least one thickness, and/or at least one magnetically printable surface area may be provided. At operation 1804, a test pattern of one or more maxels may be printed into at least one surface of the one or more magnetizable materials. At operation 1806, a voltage for charging capacitor(s) used to print the one or more maxels that results in the one or more maxels meeting one or more criteria may be determined. At operation 1808, a maxel density that meets one or more criteria may be determined. Determination(s) corresponding to operation 1806 and/or 1808 may be performed, for example, iteratively with measuring and comparing operations between successive iterations. The one or more criteria may comprise, by way of example but not limitation, a maximum peak force per unit area ratio, wherein the peak force may correspond to a tensile force, a shear force, some combination thereof, and so forth.

In certain example embodiments, for a given magnetizable material, one or more maxel printing parameters may be ascertained relative to one or more criteria by varying e.g. one parameter while keeping one or more other parameters constant. For example, for a given material grade, print area surface, material thickness, and/or printing configuration (e.g., in which a printing configuration may include, but is not limited to, a print head hole size, a print voltage level, combinations thereof, etc.), a maxel density may be varied to meet one or more criteria. Additionally and/or alternatively, a print voltage level may be varied while one or more other parameters are maintained constant. In additional and/or alternative example embodiments, two or more printing parameters may be varied simultaneously while one or more other parameters are kept constant.

Magnetic printers having one or more example print heads, which may also be referred to as an inductor coil, are described in U.S. patent application Ser. No. 12/476,952 (filed 2 Jun. 2009), which is entitled "A Field Emission System and Method" and which is hereby incorporated by reference herein. Example alternative print head designs are described in U.S. patent application Ser. No. 12/895,589 (filed 30 Sep. 2010), which is entitled "System and Method for Energy Generation" and is hereby incorporated by reference herein. Other example alternative print head designs are described herein below with particular reference to FIGS. 19A-19P and 22.

Figure 19K:
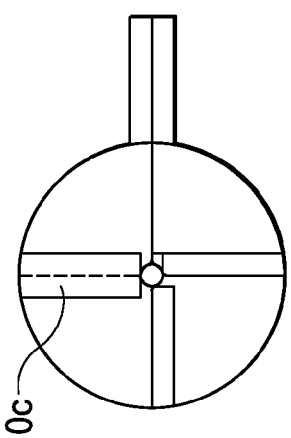
FIG. 19K depicts an example third weld joint between the second inner layer of FIG. 19G and the second outer layer of FIG. 19H.
Figure 19J:
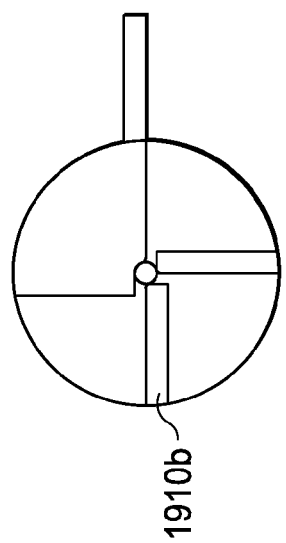
FIG. 19J depicts an example second weld joint between the first inner layer of FIG. 19F and the second inner layer of FIG. 19G.
Figure 19I:
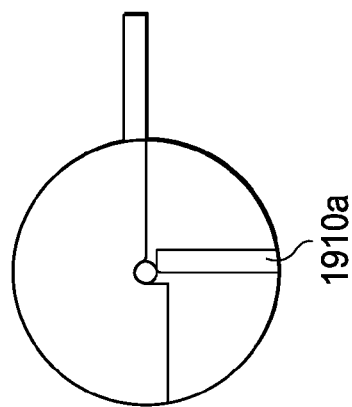
FIG. 19I depicts an example first weld joint between the first outer layer of FIG. 19E and the first inner layer of FIG. 19F.
Figure 19N:
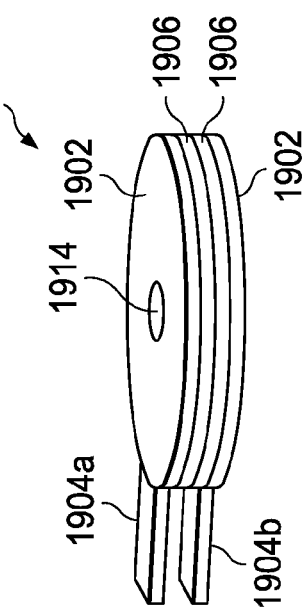
FIG. 19N depicts an example assembled four layer magnetic print head.
Figure 19M:
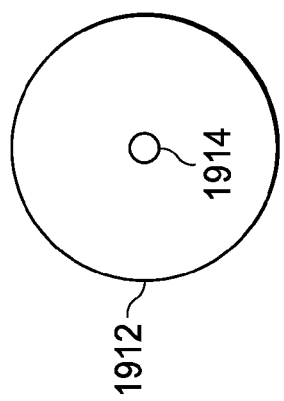
FIGS. 19L and 19M depict example print head backing layers.
Figure 19L:
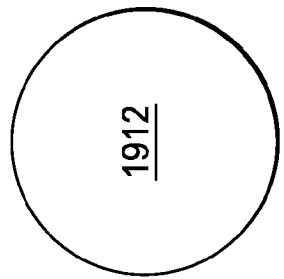
Figure 19O:
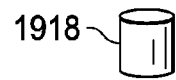
FIG. 19O depicts example magnetizable material that can be placed in the hole of print head.
Figure 19P:
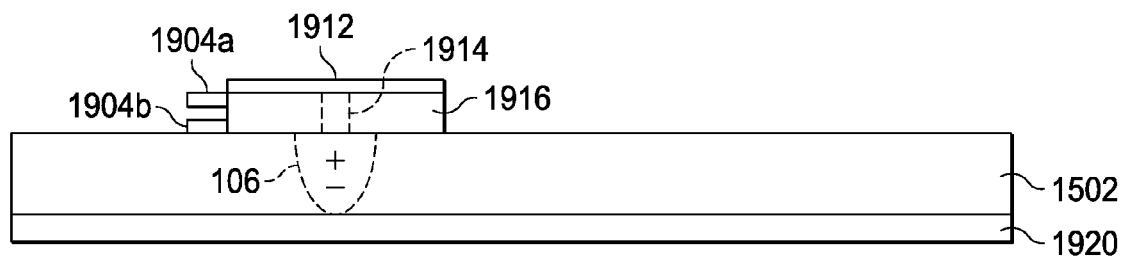
FIG. 19P depicts an example magnetizable material backing layer.

FIGS. 19A-19P depict different aspects of an example print head design for a maxel-printing magnetic printer. It should be understood that more or fewer parts than those described and/or illustrated may alternatively comprise a magnetic print head. Similarly, parts may be modified and/or combined in alternative manners that differ from those that are described and/or illustrated. For certain example embodiments, FIG. 19A depicts an example outer layer 1902 of a magnetic print head. Referring to FIG. 19A, the outer layer 1902 may comprise a thin metal (e.g., 0.01" thick copper) having a generally round or circular shape (e.g., with a 16 mm diameter) and having substantially one-fourth of the circular shape removed or otherwise not present. The outer layer 1902 may include a tab 1904 for receiving an electrical connection.

The outer layer 1902 may define or include at least part of a hole portion that, when combined with one or more other layers, may result in a hole (e.g., with a 1 mm diameter) in an approximate center of the print head. As shown for an example implementation, outer layer 1902 may be formed at least partially from a substantially flat plate. An arrow is illustrated on the outer layer 1902 to indicate that a current received from the tab 1904 may traverse around a three-quarter moon portion of the outer layer 1902. It should be noted that sizes, material types, shapes, etc. of component parts are provided by way of example but not limitation; other sizes, material types, shapes, etc. may alternatively be utilized and/or implemented.

For example implementations, a diameter of one or more of the layers of a print head, which may be a shape other than round (e.g., oval, rectangular, elliptical, triangular, hexagonal, etc.), may be selected to be large enough to handle a load of a current passing through the print head layers and also large enough to substantially ensure no appreciable reverse magnetic field is produced near a hole where the print head produces a maxel. Although a hole is also shown to comprise a substantially circular or round shape, this is by way of example only. The hole may alternatively comprise other shapes as described previously with regard to maxel shapes, including but not limited to, oval, rectangular, elliptical, triangular, hexagonal, and so forth. Moreover, a size of the hole may correspond to a desired maxel resolution, whereby a given print head may have a different sized hole so as to print different sized maxels. Example diameter sizes of holes of print heads may include, but are not limited to, 0.7 mm to 4 mm. However, diameter sizes of holes may alternatively be smaller or larger, depending on design and/or application.

FIG. 19B depicts an example inner layer 1906 of a magnetic print head. The inner layer 1906 may be similar to the outer layer 1902, except that it does not include a tab (e.g., a tab 1904 of FIG. 19A). As shown for an example implementation, current may traverse around the three-quarter moon portion of the inner layer 1906.

FIG. 19C depicts an example non-conductive spacer 1908 for a magnetic print head. The spacer 1908 may be designed (e.g., in terms of size, shape, thickness, a combination thereof, etc.) to fill a portion of the outer layer 1902 and/or the inner layer 1906 such that the layers have a conductive and a non-conductive portion, In an example implementation, the outer and inner layers 1902 and 1906 may still provide complete circular structures such that if they are stacked, they have no air regions other than the central hole. (As is described further herein below, the central hole may also be filled with a magnetizable material.) Although shown as occupying one-quarter of a circle, a spacer 1908 may alternatively by shaped differently. If a spacer 1908 is included in a print head design, a rigidity of an assembled print head may be made more rigid and therefore more robust and/or stable to thereby increase its lifecycle.

FIG. 19D depicts an example weld joint 1910 between the outer layer 1902 of FIG. 19A and the inner layer 1906 of FIG. 19B. As shown for an example implementation, the outer and inner layers 1902 and 1906 may overlap to form the weld joint 1910. The weld joint may comprise an area that is used for attaching two layers via some attachment mechanism including, but not limited to, welding (e.g., heliarc welding), soldering, adhesive, any combination thereof, and so forth.

For an example assembly procedure, prior to attaching the two layers 1902 and 1906 that are electrically conductive, an insulating material (e.g., Kapton) may be placed on top of the outer layer 1902 (and/or beneath the inner layer 1906) so as to insulate one layer from the other. After welding, the insulating material may be cut away or otherwise removed from the weld joint 1910, which enables the two conductor portions to be electrically attached thereby producing one and one-half turns of an inductor coil. Alternatively, an insulating material may be preformed to be placed against a given layer (e.g., outer or inner) such that it insulates the given layer from an adjoining layer except for a portion corresponding to the weld joint between the two adjoining layers. During an example operation, an insulating material may prevent current from passing between the layers except at the weld joint thereby resulting in each adjoining layer acting as three-quarters of a turn of an inductor coil (e.g., of a print head) if using example layer designs as illustrated in FIGS. 19A and 19B.

FIGS. 19E-19H illustrate four example layers for an example print head where the layers are oriented such that they can be placed on top of each other (e.g., from left to right) and welded together (e.g., with one or more insulating material layers) so as to construct a print head having an example three turns. Shown on each of the four layers are arrows denoting the direction current may traverse through the various layers as the current passes through the print head for a given polarity. For an opposite polarity, current may be made to traverse through the four layers oppositely to the illustrated direction. For other example implementations, more or fewer inner layers may be used to construct a print head having more or fewer than three turns.

FIG. 19E depicts an example first outer layer 1902 oriented such that its tab 1904 faces to the right. At least one spacer 1908 is shown in FIG. 19E and each of FIGS. 19F-19H. FIG. 19F depicts an example first inner layer 1906 that is rotated 90 degrees relative to the first outer layer 1902 of FIG. 19E with respect to the one-quarter-sized gaps in the substantially circular shapes.

FIG. 19G depicts an example second inner layer 1906 that is rotated 180 degrees relative to the first outer layer 1902 of FIG. 19E with respect to the one-quarter-sized gaps in the substantially circular shapes. FIG. 19H depicts an example second outer layer 1902 that is turned upside down or flipped relative to the first outer layer 1902 of FIG. 19E such that a tab 1904 of the second outer layer 1902 of FIG. 19H points to the right, but the weld joint is at the top of the second outer layer 1902. As shown for an example implementation, a design of the first outer layer 1902 of FIG. 19E and the second outer layer 1902 of FIG. 19H may be at least substantially identical. If so, there may be an "extra" amount of metal, which is to the right of the dashed line in FIG. 19H, that may not be used to produce the inductor coil. This metal may be cut away (or otherwise removed) or ignored. (Alternatively, "extra" material of a second inner layer 1906 (of FIG. 19G) may be removed or ignored.)

FIG. 19I depicts an example first weld joint 1910*a* between the first outer layer 1902 of FIG. 19E and the first inner layer 1906 of FIG. 19F. An insulating material may be placed between the two layers as described herein above to produce one and one-half turns of an example inductor coil. FIG. 19J depicts an example second weld joint 1910*b* between the first inner layer 1906 of FIG. 19F and the second inner layer 1906 of FIG. 19G, with the first inner layer 1906 of FIG. 19F being welded to the first outer layer 1902 of FIG. 19E (as shown in FIG. 19I). An insulating material may be placed between the first and second inner layers 1906 (of FIGS. 19F and 19G) as described herein above to add three-quarters of a turn to the example inductor coil and to attain two and one-quarter turns overall.

FIG. 19K depicts an example third weld joint 1910*c* between the second inner layer 1906 of FIG. 19G and the second outer layer 1902 of FIG. 19H, with the second inner layer 1906 of FIG. 19G being welded to the first inner layer 1906 of FIG. 19F (as shown in FIG. 19J), which is welded to the first outer layer 1902 of FIG. 19E. As described herein above, an insulating material may be placed between the second inner layer 1906 of FIG. 19G and the second outer layer 1902 of FIG. 19H to add three-quarters of a turn to the example inductor coil and to attain three turns overall.

FIGS. 19L and 19M depict example print head backing layers 1912, which may be placed on a "back" side of a print head, with a "front" side of the print head comprising a side that may be placed against a magnetizable material when printing a maxel. A print head backing layer 1912 may comprise, by way of example but not limitation, a conductive ferromagnetic material, a non-conductive ferromagnetic material, a conductive non-ferromagnetic material (e.g., copper or silver), some combination thereof, and so forth. A print head backing layer may be thick or thin, may have a single layer or multiple layers, may be formed from a same material or from different materials, or any combination thereof, and so forth. As depicted for example implementations, a print head backing layer 1912 may not include a hole (e.g., as shown in FIG. 19L) or may include a hole 1914 (e.g., as shown in FIG. 19M) that corresponds to a hole 1914 of a print head (e.g., as shown in FIG. 19P). The print head backing layers 1912 are shown to be the same width (e.g., diameter) as the circular portion of the various print head layers by way of example only. Print head backing layers may alternatively be of a different size (e.g., a smaller or a larger size) than the print head layers and/or may be of a different shape than the e.g. circular portion of the print head layers.

FIG. 19N depicts an example assembled four-layer magnetic print head 1916. For certain example embodiments, a number of turns in a print head may affect a shape of a printed maxel. Although, two outer layers 1902 and two inner layers 1906 are used in the example print head 1916, fewer or additional ones of at least the inner layers 1906 may alternatively be employed to produce a print head 1916. For example, if four inner layers are used, a print head may include four and one-half turns, and if six inner layers are used, a print head may include six turns, and so on. Additionally, although the example inner and outer print head layers of FIGS. 19A-19K each serve to provide three quarters of a turn, alternative layer geometries may be employed that produce different amounts of a turn (e.g., one-half, two-thirds, one-and-a-quarter, etc.) per layer or plane. Additionally and/or alternatively, different layer sizes may be combined as desired. Furthermore, although print head layers are illustrated as being circular, other shapes (e.g., rectangular, oval, square, pentagonal, etc.) may alternatively be employed.

As shown in FIGS. 19A-19K and particularly in FIGS. 19N and 19P, one or more turns (e.g., inductive turns) of a print head may define a hole 1914 that establishes an air gap. FIG. 19O depicts an example of magnetizable material 1918 that may be placed in a hole 1914 of a print head to fill all or at least a portion of an air gap.

FIG. 19P depicts an example magnetizable material backing layer 1920 that is beneath and at least proximate to a magnetizable material 1502 with a maxel 106 being printed by a print head 1916. For example implementations, print head 1916 may define at least one hole 1914 and may include a first tab 1904*a* and a second tab 1904*b*. As with the print head backing layer 1912, a magnetizable material backing layer 1920 may affect characteristics of printed maxels. The magnetizable material backing layer 1920 may comprise, by way of example but not limitation, a conductive ferromagnetic material, a non-conductive ferromagnetic material, a conductive non-ferromagnetic material (e.g., copper or silver), any combination thereof, and so forth. In an example implementation, a magnetizable material backing layer 1920 may comprise steel or a steel alloy that provides shielding that is capable of substantially limiting an amount of magnetic flux able to exit a bottom portion of the magnetizable material on which maxels are being printed.

Figure 20A:
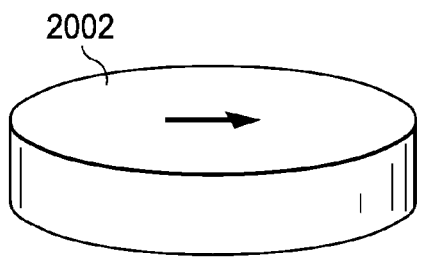
FIGS. 20A and 20B depict an example cylindrically shaped magnetizable material manufactured to be conventionally magnetized diametrically and example weighting factors intended to produce maxels having consistent field strength.
Figure 20B:
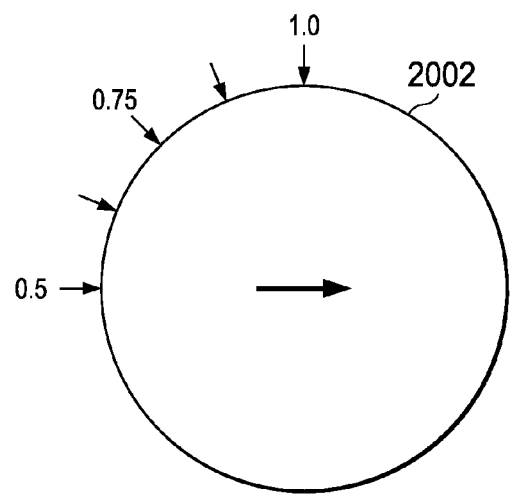

FIGS. 20A and 20B depict an example cylindrically-shaped magnetizable material 2002 that may be manufactured to be conventionally magnetized diametrically. Example weighting factors that may produce maxels having a consistent field strength are shown in FIG. 20B. For certain example embodiments, an angle between a direction that a maxel is printed relative to a direction that a conventional magnet is manufactured to be magnetized (e.g., axial or diametric) may be used at least in part to determine weighting factors. Weighting factors may be used, for example, to scale maxel printing voltages so that the resulting printed maxels have uniform or at least more uniform field strengths, to scale printing voltages to that the resulting printed maxels have a targeted strength, any combination thereof, and so forth. As depicted, if a maxel is printed in a same direction as a conventional magnetization, it may have a greater (e.g., a twice greater) field strength for a given print voltage (and resulting current through the print head) than if the maxel is printed perpendicular to the direction that the magnetizable material is manufactured to be magnetized. For example implementations, weighting factors such as those shown in FIG. 20B may be used to vary voltage(s) used to charge a magnetic printer's one or more capacitors in order to achieve uniform maxel field strength, for instance, around a curved surface. Hence, a voltage used to charge capacitor(s) to print a maxel that is aligned with a conventional magnetization may have a 0.5 weighting factor applied, and a voltage used to charge capacitor(s) to print a maxel that is un-aligned by 90 degrees with a conventional magnetization may have a 1.0 weighting factor applied. Other alignment angles may have other weighting factors applied.

For certain example embodiments, a magnetizing field created by a magnetic print head may be constrained to a geometry at or around a point of contact with a material to be magnetized in order to produce a maxel that is sharply defined to a desired degree. Two principles may be considered if realizing a magnetic circuit and/or a magnetic printing head in one or more of certain example implementations as described herein. First, magnetizable materials may acquire their "permanent" magnetic polarization rapidly, for example, in microseconds or even nanoseconds for some materials. Second, Lenz's Law indicates that conductors may exclude rapidly changing magnetic fields; in other words, rapidly changing magnetic fields may not penetrate a good conductor by a depth termed its "skin depth". At least partly because of these two principles, for an example implementation, a magnetizing circuit used with a print head as described herein may create a large current pulse of 0.8 milliseconds duration that has a bandwidth of about 1250 KHz, which yields a calculated skin depth of about 0.6 millimeters (mm). As is described above, print heads may be designed to produce differently-sized maxels having different maxel widths (e.g., widths of 4 mm, 3 mm, 2 mm, 1 mm, etc., but a maxel width may alternatively be greater than 4 mm or smaller than 1 mm).

In an example implementation, a print head as described above may have a hole in its approximate center or centroid about 1 mm in diameter and with a thickness of a print head assembly of about 1 mm. Thus, during a printing of a maxel, a majority of field lines are forced to traverse the hole rather than permeate through the plates or layers (e.g., which may comprise copper or another material as described herein above) that form the print head assembly. This combination of magnetization pulse characteristics and print head geometry may create a magnetizing field having a high magnetic flux density in and/or near the 1 mm hole in the print head and a low magnetic flux elsewhere to thereby generate or otherwise produce a sharply defined maxel having approximately a 1 mm diameter. Certain example values (e.g., time, bandwidth, distance, etc.) are given above by way of example only; other values may alternatively be used.

For certain example embodiments, at least part of a maxel having a first polarity may be purposely overwritten by printing a maxel of a second (e.g., opposite) polarity. In an example implementation, a maxel having a first polarity may be purposefully completely, or at least substantially completely, overwritten by printing a maxel of a second (e.g., opposite) polarity.

For certain example embodiments, one or more maxel parameters may be dithered. In an example implementation, dithering may be performed randomly based at least partly on a variable number, for example a pseudo random number. Dithering may be additionally and/or alternatively performed in accordance with a code. Dithering may be used, for example, to reduce periodicity in a structure. However, dithering may be performed for other reasons, for example whereby a predetermined dithering pattern is used that may be subtracted out of or otherwise mathematically removed from a measured result. In example implementations, a uniform grid spacing may be provided for a maxel pattern, but an actual location of each maxel may be dithered such that their spacing is no longer uniform. Dithering may additionally and/or alternatively be applied to other maxel properties (e.g., maxel field strength amplitude), maxel printing parameters, combinations thereof, and so forth.

Figure 21A:
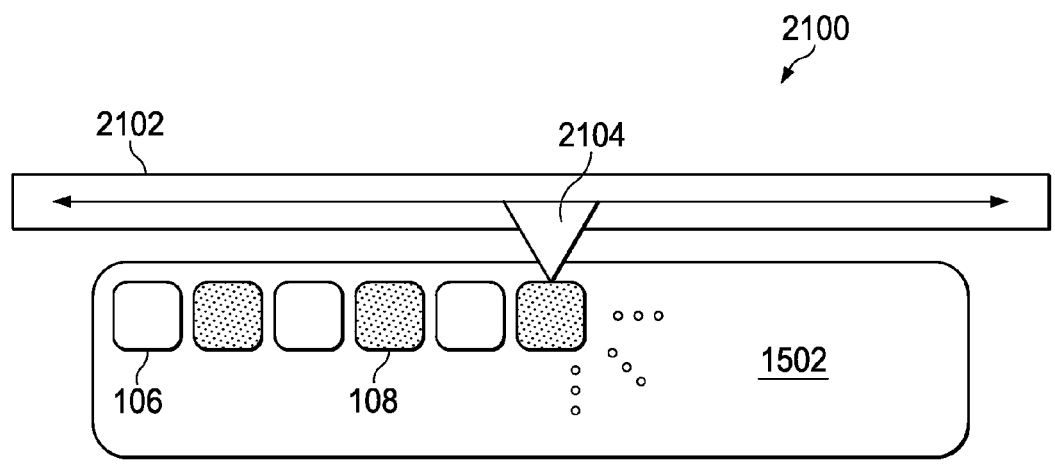
FIG. 21A depicts an example magnetic printer.

FIG. 21A depicts an example magnetic printer 2100. For certain example embodiments, a magnetizing magnetic printer 2100 may include a movement handler 2102 and a magnetizer magnetic print head 2104. In an example operation, magnetic printer 2100 may print maxels 106 and/or 108 into a magnetizable structure 1502 (e.g., or a magnetizable structure 1504). Although not explicitly shown in FIG. 21A, magnetic printer 2100 may include circuitry to facilitate magnetic printing of maxels. Circuitry may include, by way of example but not limitation, electro-mechanical apparatus, electronics, hardware, programmable hardware, firmware, at least one processor, code executing on at least one processor, a computer, any combinations thereof, and so forth.

For certain example embodiments, magnetic printer 2100 may be capable of causing magnetic print head 2104 to move relative to magnetizable structure 1502. For example, movement handler 2102 may be capable of moving magnetic print head 2104 around magnetizable structure 1502, which may remain fixed. However, movement handler 2102 may alternatively be capable of moving magnetizable structure 1502 while magnetic print head 2104 remains fixed. Furthermore, movement handler 2102 may be capable of moving both magnetizable structure 1502 and magnetic print head 2104 in order to print maxels 106, 108 at desired locations. Movement handler 2102 may include, by way of example but not limitation, one or more of supporting structures, motors, gears, belts, conveyor belts, fasteners, circuitry to control movement, any combinations thereof, and so forth.

Example embodiments for magnetic print heads 2104 are described herein as print head 1916 (above with particular reference to FIGS. 19A-19P), and print head 2200 (below with particular reference to FIG. 22), combinations thereof, and so forth. Additional and/or alternative example embodiments for magnetic printers 2100, magnetic print heads 2104, etc. are described in U.S. patent application Ser. No. 12/476, 952, filed 2 Jun. 2009, which is hereby incorporated by reference in its entirety herein. More specifically, example monopolar magnetizing circuits and bipolar magnetizing circuits are shown and described. Circular conductors that may be used to produce at least one high voltage inductor coil are also shown and described. Magnetizing inductors from round wires, flat metal, combinations thereof, etc. are shown and described. Other example aspects for printing maxels onto magnetizable materials are disclosed in the aforementioned application Ser. No. 12/476,952. Although example designs for magnetic print heads 2104 are described and/or referenced herein, alternative designs may be employed without departing from claimed subject matter.

Figure 21B:
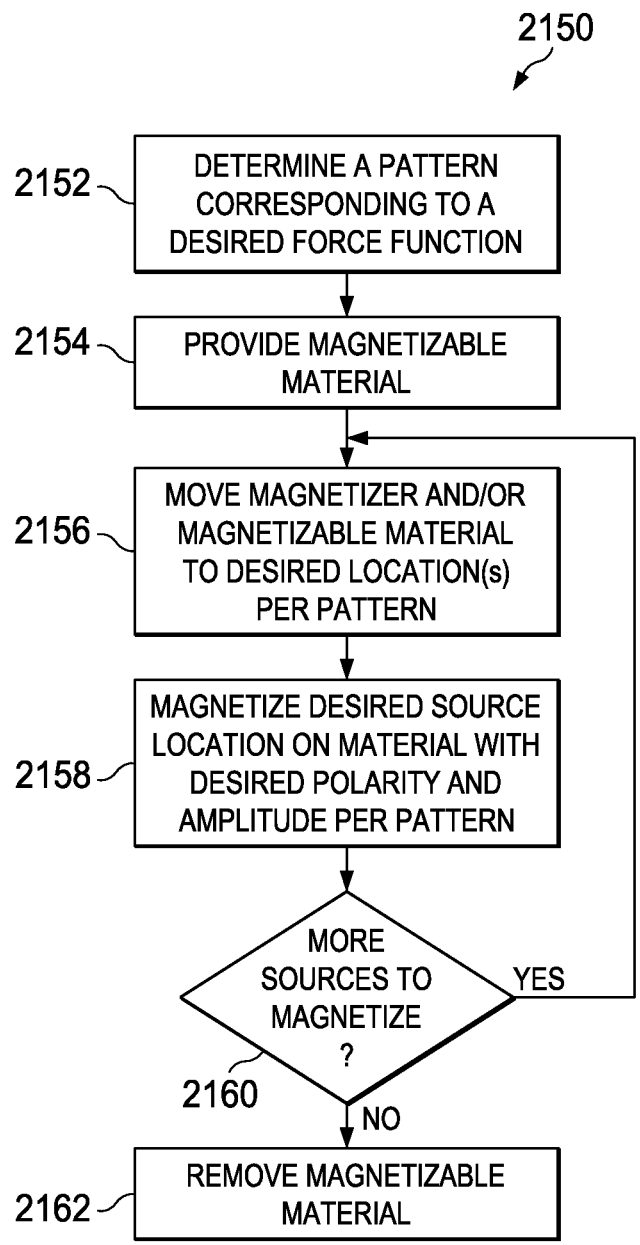
FIG. 21B depicts a flow diagram illustrating example methods relating to magnetic printers.

FIG. 21B depicts a flow diagram 2150 illustrating example methods relating to magnetic printers. As shown, flow diagram 2150 may include six operations 2152-2162. Although operations are shown in a particular order in flow diagram 2150, embodiments may be performed in different orders and/or with one or more operations fully or partially overlapping with other operation(s). Moreover, a different number of operations (e.g., more or fewer) may alternatively be implemented.

More specifically, flow diagram 2150 depicts an example patterned magnetic structure manufacturing method. A patterned magnetic structure may comprise multiple different magnetic polarities on a single side. A patterned magnetic structure may include magnetic sources that alternate, that are randomized, that have predefined codes, that have correlative codes, some combination thereof, and so forth. The magnetic sources may be discrete ones that are combined/amalgamated to form at least part of a magnetic structure (e.g., that have one or more maxels printed on discrete magnetic sources before, during, or after a combination/amalgamation), may be integrated ones that are printed onto a magnetizable material to create a patterned magnetic structure, some combination thereof, and so forth. For certain example embodiments, at a operation 2152, a pattern corresponding to a desired force function (or image) may be determined. A desired force function may comprise, for example, a spatial force function, an electromotive force function, a force function that provides for many different transitions between positive and negative polarities (and vice versa) with respect to a proximate coil that is in motion relative thereto, some combination thereof, and so forth.

At operation 2154, a magnetizable material may be provided to a magnetizing apparatus (e.g., to a magnetic printer 2100). At operation 2156, a magnetizer (e.g., a magnetic print head 2104) of the magnetizing apparatus and/or the magnetizable material (e.g., magnetizable structure 1502) to be magnetized may be moved so that a desired location on the magnetizable material can be magnetized in accordance with the determined pattern. At operation 2158, a desired source location on the magnetizable material may be magnetized such that the source has a desired polarity, field amplitude (or strength), shape, and/or size (e.g., area on the magnetizable material), or some combination thereof, etc. as defined by the pattern to print a maxel into the magnetizable material. At operation 2160, it may be determined whether additional magnetic sources remain to be magnetized. If there are additional sources to be magnetized, then the flow diagram may return to operation 2156. Otherwise, at operation 2162, the magnetizable material (which is now magnetized in accordance with the determined pattern) may be removed from the magnetizing apparatus.

Figure 22:
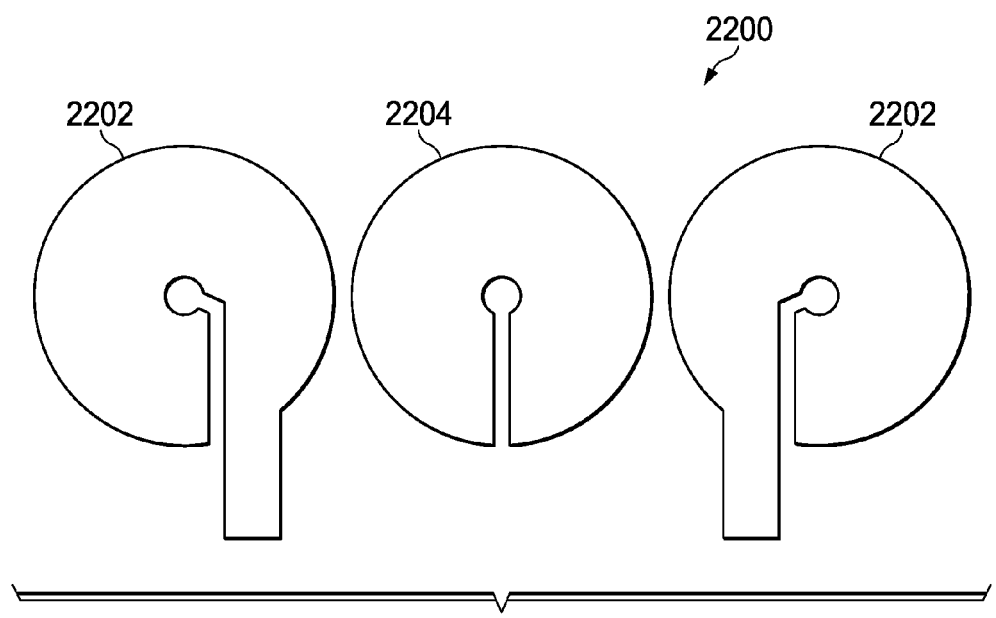
FIG. 22 depicts an example design of multiple layers of a magnetic print head.

FIG. 22 depicts an example design of multiple layers of a magnetic print head 2200. As noted above, examples of magnetic print heads of a magnetic printer have been described, for example, in U.S. application Ser. No. 12/476,952 as well as herein above. For certain example embodiments as described herein, a magnetic print head 2200 may be substantially circular with a diameter of approximately 16 mm and a central hole of approximately 3 mm. Generally, each layer may be relatively thin. By way of example but not limitation, and for certain example implementations, each metallic (e.g., copper) layer may be manufactured to be as thin as is feasible. By one example standard, each layer may be made as thin as is possible so long as it is still capable of handling a current that is to be applied during magnetization without experiencing damage (e.g., without coming apart during use). By way of example only, metal (e.g., Cu) layers 2202 having a thickness of approximately 0.015 inches, and insulating layers 2204 (e.g., of Kapton) having a thickness of approximately 0.001 inches may be employed in a magnetic print head 2200. In another example implementation, instead of soldering the layers, the layers may be welded (e.g., tig welded), which may make them more durable. Although particular example measurements, component materials, etc. are provided above for purposes of explanation or clarification, claimed subject matter is not so limited.

In accordance with one example implementation for creating a magnet having multiple magnet polarities on a single side, a magnetic structure may be produced by magnetizing one or more magnetic sources having a first polarity onto a side of a previously magnetized magnet having an opposite polarity. Alternatively, a magnetic printer may be used to re-magnetize a previously-magnetized material having one polarity per side (e.g., originally) and having multiple sources with multiple polarities per side (e.g., afterwards). For example, a checkerboard pattern (e.g., alternating polarity sources) may be magnetized onto an existing magnet such that the remainder of the magnet (e.g., the non re-magnetized portion) acts as a bias. In another example, a pattern (e.g., including a code, image, etc.) other than a checkerboard pattern may be used to magnetize an existing magnet such that the remainder of the magnet (e.g., the non re-magnetized portion) acts as a bias.

In accordance with other example approaches for forming magnetic structures, a containment vessel may act as a mold for receiving magnetizable material while in a moldable form. Such a containment vessel may serve both as a mold for shaping the material and also as a protective device to provide support to the resulting magnetic structure so as to retard breakage, deformation, etc. If the magnetizable material is to be sintered, the containment vessel may comprise a material, e.g., titanium, that can withstand the heat used to sinter the magnetizable material. Should a binder be used to produce the magnets with the mold/containment vessel, other forms of material, such as a hard plastic may be used for the mold/containment vessel. Generally, various types of molds may be used to contain magnetizable material and may be used later to support and protect the magnetic structure (e.g., with patterning) once the material it contains has been magnetized.

Although multiple example embodiments are illustrated in the accompanying Drawings and described in the foregoing Detailed Description, it should be understood that claimed subject matter is not limited to the disclosed embodiments, but is capable of numerous rearrangements, modifications, substitutions, etc. without departing from subject matter as set forth and defined by the following claims.

The invention claimed is:

1. A method comprising:
providing a magnetic print head including a plurality of layers of a flat metal conductor configured to produce a plurality of inductive turns about a hole, said magnetic print head generating a magnetizing field having a high magnetic flux density in and/or near said hole and a low magnetic flux density elsewhere when a current is applied to said magnetic print head;
causing at least one of a magnetizable material or said magnetic print head to move to position said hole of said magnetic print head adjacent to a first location at a surface of said magnetizable material where a maxel is to be printed; and
printing a first maxel into said magnetizable material using said magnetic print head to produce a first printed maxel at said first location at the surface of said magnetizable material, the first printed maxel being associated with a first polarity and a second polarity, wherein the first polarity associated with the first printed maxel is substantially exposed at the surface of said magnetizable material, but the second polarity associated with the first printed maxel is not substantially exposed at the surface of said magnetizable material.

2. The method of claim 1, wherein said printing comprises:
printing a second maxel into said magnetizable material using said magnetic print head to produce a second printed maxel at the surface of said magnetizable material such that the second printed maxel at least partially overlaps the first printed maxel.

3. The method of claim 1, further comprising:
causing at least one of said magnetizable material or said magnetic print head to move to position said hole of said magnetic print head adjacent to a second location at the surface of said magnetizable material where a maxel is to be printed, said second location being less than a width of the first printed maxel away from said first; and
printing a second maxel into said magnetizable material using said magnetic print head to produce a second printed maxel at said second location at the surface of said magnetizable material.

4. The method of claim 1, wherein said printing comprises:
printing a second maxel into said magnetizable material using said magnetic print head to produce a second printed maxel at the surface of said magnetizable material such that the second printed maxel is nested within the first printed maxel.

5. The method of claim 1, further comprising:
repeating said causing and said printing to at least partially fill a defined region of the surface of said magnetizable material with multiple printed maxels.

6. The method of claim 5, wherein said repeating comprises:
at least partially overwriting at least a portion of the multiple printed maxels with one or more printed maxels.

7. The method of claim 5, wherein said repeating comprises:
substantially filling the defined region of the surface of said magnetizable material with multiple printed maxels.

8. The method of claim 1, wherein said printing comprises:
printing a second maxel into said magnetizable material using said magnetic print head to produce a second printed maxel at the surface of said magnetizable material such that a portion of the magnetizing field having a high magnetic flux density in and/or near said hole of said magnetic print head extends beyond an edge of said magnetizable material.

9. The method of claim 1, wherein said printing comprises:
printing said first maxel into said magnetizable material using said magnetic print head to produce the first printed maxel at said first location at the surface of said magnetizable material while a sacrificial material is sufficiently close to said magnetizable material to absorb at least a portion of the magnetizing field used to produce the first printed maxel.

10. The method of claim 1, wherein said printing comprises:
printing said first maxel into said magnetizable material using said magnetic print head to produce the first printed maxel at said first location at the surface of said magnetizable material while a sacrificial material is sufficiently close to said magnetizable material to affect at least a portion of the magnetizing field used to produce the first printed maxel.

11. The method of claim 10, wherein the sacrificial material includes one or more printed maxels.

12. The method of claim 1, further comprising:
prior to said printing, causing a sacrificial magnetizable material to be placed in proximity to another surface of said magnetizable material, the other surface of said magnetizable material being located opposite the surface of said magnetizable material.

13. The method of claim 1, wherein said printing comprises:
printing multiple maxels into said magnetizable material using said magnetic print head to produce multiple printed maxels at the surface of said magnetizable material, the multiple printed maxels having at least one magnetic field that forms a pattern.

14. The method of claim 13, wherein the pattern includes at least one of text or a person-recognizable image.

15. The method of claim 1, wherein said printing comprises:
printing multiple maxels into said magnetizable material using said magnetic print head to produce multiple printed maxels at the surface of said magnetizable material, the multiple printed maxels having one or more composite magnetic fields; and
applying one or more voltage weighting factors to at least one voltage supplied to said magnetic print head so as to smooth at least one shape corresponding to the one or more composite magnetic fields.

16. The method of claim 1, further comprising:
establishing a coordinate system for said magnetizable material; and
defining coordinates for multiple maxels based on a pattern,
wherein said printing includes printing the multiple maxels into said magnetizable material using said magnetic print head to produce multiple printed maxels at the surface of said magnetizable material based on the established coordinate system and the defined coordinates.

17. The method of claim 1, further comprising:
establishing a coordinate system for said magnetizable material;
defining coordinates for a group of maxels; and
determining one or more amplitude modulations for the group of maxels to produce one or more magnetic characteristics in accordance with one or more criteria and based at least partly on the defined coordinates,
wherein said printing includes printing the group of maxels into said magnetizable material using said magnetic print head to produce a group of printed maxels at the surface of said magnetizable material based on the established coordinate system and the one or more amplitude modulations.

18. The method of claim 1, wherein said printing includes printing multiple maxels into said magnetizable material using said magnetic print head of a magnetic maxel printer with one or more current printer parameters to produce a printed maxel pattern at the surface of said magnetizable material; and wherein said method further comprises:
measuring at least one magnetic field characteristic of the printed maxel pattern;
determining if at least one criterion is met by the at least one measured magnetic field characteristic; and
if the at least one measured magnetic field characteristic is not determined to meet the at least one criterion:
adjusting the one or more current printer parameters of the magnetic maxel printer; and
repeating said causing, said printing, said measuring, and said determining using the adjusted one or more current printer parameters.

19. The method of claim 1, wherein said printing includes printing multiple maxels into said magnetizable material using said magnetic print head and one or more charging capacitors to produce a printed maxel pattern at the surface of said magnetizable material; and wherein said method further comprises:
determining at least one voltage for the one or more charging capacitors that produces the printed maxel pattern that meets one or more criteria.

20. The method of claim 1, wherein said printing includes printing multiple maxels into said magnetizable material using said magnetic print head to produce a printed maxel pattern associated with at least one particular maxel density at the surface of said magnetizable material; and wherein said method further comprises:
determining the at least one particular maxel density that meets at least one criterion.

21. The method of claim 1, wherein said magnetic print head further includes magnetic material that at least partially fills said hole.

* * * * *

UNITED STATES PATENT AND TRADEMARK OFFICE
CERTIFICATE OF CORRECTION

PATENT NO. : 8,648,681 B2  
APPLICATION NO. : 13/240335  
DATED : February 11, 2014  
INVENTOR(S) : Mark D. Roberts et al.

Page 1 of 1

It is certified that error appears in the above-identified patent and that said Letters Patent is hereby corrected as shown below:

On the title page:
Item (60) at Lines 6-7, replace "provisional application No. 61/289,094, filed on Dec. 22, 2009," with --provisional application No. 61/279,094, filed on Oct. 16, 2009,--.

Signed and Sealed this
First Day of July, 2014

Michelle K. Lee
*Deputy Director of the United States Patent and Trademark Office*